(12) United States Patent
Koshi et al.

(10) Patent No.: US 8,913,833 B2
(45) Date of Patent: Dec. 16, 2014

(54) IMAGE PROCESSING APPARATUS, IMAGE ENLARGING APPARATUS, IMAGE CODING APPARATUS, IMAGE DECODING APPARATUS, IMAGE PROCESSING SYSTEM AND MEDIUM STORING PROGRAM

(75) Inventors: Yutaka Koshi, Kanagawa (JP); Shunichi Kimura, Kanagawa (JP); Ikken So, Kanagawa (JP); Masanori Sekino, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 2041 days.

(21) Appl. No.: 11/797,332

(22) Filed: May 2, 2007

(65) Prior Publication Data

US 2007/0258661 A1    Nov. 8, 2007

(30) Foreign Application Priority Data

| May 8, 2006 | (JP) | ................................ 2006-128915 |
| Nov. 30, 2006 | (JP) | ................................ 2006-323459 |
| Feb. 14, 2007 | (JP) | ................................... 2007-33022 |
| Apr. 4, 2007 | (JP) | ................................ 2007-098258 |

(51) Int. Cl.
| G06K 9/32 | (2006.01) |
| G06K 9/34 | (2006.01) |
| G06K 15/02 | (2006.01) |
| H04N 1/40 | (2006.01) |

(52) U.S. Cl.
CPC .................................. *H04N 1/40068* (2013.01)
USPC ............ 382/190; 382/177; 382/182; 382/225; 358/1.11

(58) Field of Classification Search
USPC .......... 382/177, 298, 182, 190, 225, 266, 275; 358/1.11
See application file for complete search history.

(56) References Cited

U.S. PATENT DOCUMENTS

| 3,601,802 | A | * | 8/1971 | Nakagome et al. ............ 382/226 |
| 5,428,458 | A | * | 6/1995 | Aiba et al. ...................... 358/434 |
| 6,069,978 | A | * | 5/2000 | Peairs ............................ 382/254 |
| 6,285,804 | B1 | | 9/2001 | Crinon et al. |
| 6,804,419 | B1 | | 10/2004 | Miyake |
| 7,519,221 | B1 | * | 4/2009 | Nicholson ...................... 382/181 |
| 2004/0013319 | A1 | | 1/2004 | Wenstrand et al. |
| 2004/0096105 | A1 | * | 5/2004 | Holtsberg ...................... 382/186 |
| 2006/0133690 | A1 | * | 6/2006 | Bloomberg et al. ........... 382/269 |
| 2008/0063277 | A1 | * | 3/2008 | Vincent et al. ................. 382/182 |

FOREIGN PATENT DOCUMENTS

| JP | A-5-130384 | 5/1993 |
| JP | A-06-225122 | 8/1994 |
| JP | A-06-311351 | 11/1994 |
| JP | A-08-310057 | 11/1996 |

(Continued)

OTHER PUBLICATIONS

S. C. Park et al., "Super-Resolution Image Reconstruction: A Technical Overview", Signal Processing Magazine, IEEE, vol. 20, No. 3, (May 2003) pp. 21-36.

(Continued)

*Primary Examiner* — Kim Vu
*Assistant Examiner* — Michael Vanchy, Jr.
(74) *Attorney, Agent, or Firm* — Oliff PLC

(57) ABSTRACT

An image processing apparatus includes: an extraction unit that extracts a first image and a second image similar to the first image, in a first resolution; and a generation unit that generates an image in a second resolution based on the respective images extracted by the extraction unit and phases of the respective images calculated with precision higher than one pixel in the first resolution.

27 Claims, 58 Drawing Sheets

HIGH RESOLUTION CHARACTER
IMAGE ACQUISITION PROCESSING
S10

(56) References Cited

FOREIGN PATENT DOCUMENTS

| | | |
|---|---|---|
| JP | A-10-108003 | 4/1998 |
| JP | A-10-178638 | 6/1998 |
| JP | A-2000-152250 | 5/2000 |
| JP | A-2000-188680 | 7/2000 |
| JP | A-2000-255120 | 9/2000 |
| JP | A-2000-354244 | 12/2000 |
| JP | A-2001-268351 | 9/2001 |
| JP | A-2002-190021 | 7/2002 |
| JP | A-2002-290716 | 10/2002 |
| JP | A-2004-56789 | 2/2004 |
| JP | A-2004-334843 | 11/2004 |

OTHER PUBLICATIONS

Sep. 7, 2011 Office Action issued in Japanese Patent Application No. 2007-098258 (with translation).

* cited by examiner (A)

CHARACTER IMAGE DATA 1　　CHARACTER IMAGE DATA 2
(PIXEL SHIFT PHASE 1)　　　(PIXEL SHIFT PHASE 2)

CHARACTER IMAGE DATA 3　　CHARACTER IMAGE DATA 4
(PIXEL SHIFT PHASE 3)　　　(PIXEL SHIFT PHASE 4)

HIGH RESOLUTION
PROCESSING (B)

QUADRUPLE RESOLUTION
CHARACTER IMAGE DATA

HIGH RESOLUTION CHARACTER
IMAGE ACQUISITION PROCESSING
S10

IMAGE ENLARGEMENT PROCESSING
S20

HIGH RESOLUTION CHARACTER IMAGE
ACQUISITION PROCESSING
INCLUDING NOISE ELIMINATION PROCESSING
S30

HIGH RESOLUTION CHARACTER IMAGE
ACQUISITION PROCESSING
S40

HIGH RESOLUTION CHARACTER IMAGE
ACQUISITION PROCESSING USING STORED
CHARACTER GROUP IMAGE
S50

FIG. 26

0123456789abcdefghijklmn
opqrstuvwxyzABCDEFGHI
JKLMNOPQRSTUVWXYZ
あいうえおかきくけこさしす
せそたちつてとなにぬねの
はひふへほまみむめもや
ゆよらりるれろわをん愛藍
会合逢遭間遇哀曖挨・・・
0123456789abcdefghijklmn
opqrstuvwxyzABCDEFGHI
JKLMNOPQRSTUVWXYZ
あいうえおかきくけこさしす
せそたちつてとなにぬねの
はひふへほまみむめもや
ゆよらりるれろわをん愛藍
会合逢遭間遇哀曖挨・・・

HIGH RESOLUTION CHARACTER IMAGE ACQUISITION PROCESSING
USING GENERATED CHARACTER GROUP IMAGE
S60

HIGH RESOLUTION CHARACTER IMAGE ACQUISITION PROCESSING
USING GENERATED CHARACTER IMAGE
S70

HIGH RESOLUTION CHARACTER IMAGE ACQUISITION PROCESSING
USING GENERATED PLURAL CHARACTER GROUP IMAGES
S80

HIGH RESOLUTION CHARACTER IMAGE ACQUISITION PROCESSING
WITH CHARACTER IMAGE REPLACEMENT PROCESSING
S90

(A) INPUT ORIGINAL (B) CUT-OUT AND SIZE-ADJUSTED CHARACTER IMAGE DATA 1
CUT-OUT AND SIZE-ADJUSTED CHARACTER IMAGE DATA 2
CUT-OUT AND SIZE-ADJUSTED CHARACTER IMAGE DATA 3

(C) HIGH RESOLUTION CHARACTER IMAGE DATA

HIGH RESOLUTION CHARACTER IMAGE
ACQUISITION PROCESSING WITH CHARACTER
SIZE ADJUSTMENT PROCESSING
S1000

HIGH RESOLUTION CHARACTER IMAGE ACQUISITION PROCESSING
WITH TWICE CHARACTER SIZE ADJUSTMENT PROCESSING
S1010

ADJUST PHASES AND CALCULATE
WEIGHTED MEAN VALUES

HIGH RESOLUTION CHARACTER IMAGE ACQUISITION PROCESSING
WITH WEIGHTED MEAN VALUE CALCULATION
S1020

ADJUST PHASES AND
CALCULATE MEAN VALUES

HIGH RESOLUTION CHARACTER IMAGE ACQUISITION PROCESSING
WITH PROCESSING OF GENERATING REDUCED IMAGES IN
DIFFERENT PHASES
S1030

(A)

INPUT IMAGE — OUTPUT IMAGE (B)

INPUT IMAGE — OUTPUT IMAGE (A) INPUT IMAGE (B) REPRESENTATIVE IMAGE DICTIONARY (C) POSITION, PHASE AND INDEX OF CHARACTER IMAGE

IMAGE CODING PROCESSING
S1040

IMAGE DECODING PROGRAM 80

IMAGE DECODING PROCESSING
S1050

IMAGE DECODING PROGRAM
82

IMAGE DECODING PROCESSING
S1070

IMAGE PROCESSING APPARATUS, IMAGE ENLARGING APPARATUS, IMAGE CODING APPARATUS, IMAGE DECODING APPARATUS, IMAGE PROCESSING SYSTEM AND MEDIUM STORING PROGRAM

CROSS-REFERENCE TO RELATED APPLICATIONS

This application is based on and claims priority under 35 USC 119 from Japanese Patent Application No. 2007-098258 filed Apr. 4, 2007.

BACKGROUND

The present invention relates to an image processing apparatus to enlarge an image, an image enlarging apparatus, an image coding apparatus, an image decoding apparatus, an image processing system and a medium storing a program.

TECHNICAL FIELD

Related Art

Generally, the resolution of an image upon reading and the resolution upon printing of the image are different. For example, the number of dots per inch upon reading is 200 to 300 dpi, whereas the number of dots per inch upon printing is 600 to 1200 dpi. Accordingly, when a character image original is read with a scanner or the like and print-outputted, it is necessary to enlarge the character image.

SUMMARY

According to an aspect of the invention, provided is an image processing apparatus including: an extraction unit that extracts a first image and a second image similar to the first image, in a first resolution; and a generation unit that generates an image in a second resolution based on the respective images extracted by the extraction unit and phases of the respective images calculated with precision higher than one pixel in the first resolution.

BRIEF DESCRIPTION OF THE DRAWINGS

Exemplary embodiments of the present invention will be described in detail based on the following figures, wherein:

FIG. 26 is an example of a character group image generated by the character group image generator 504;

DETAILED DESCRIPTION

Exemplary embodiments of the present invention will be described based on the drawings.

First, for assistance of understanding of the present invention, the background and the outline of the invention will be described.

Figure 1:
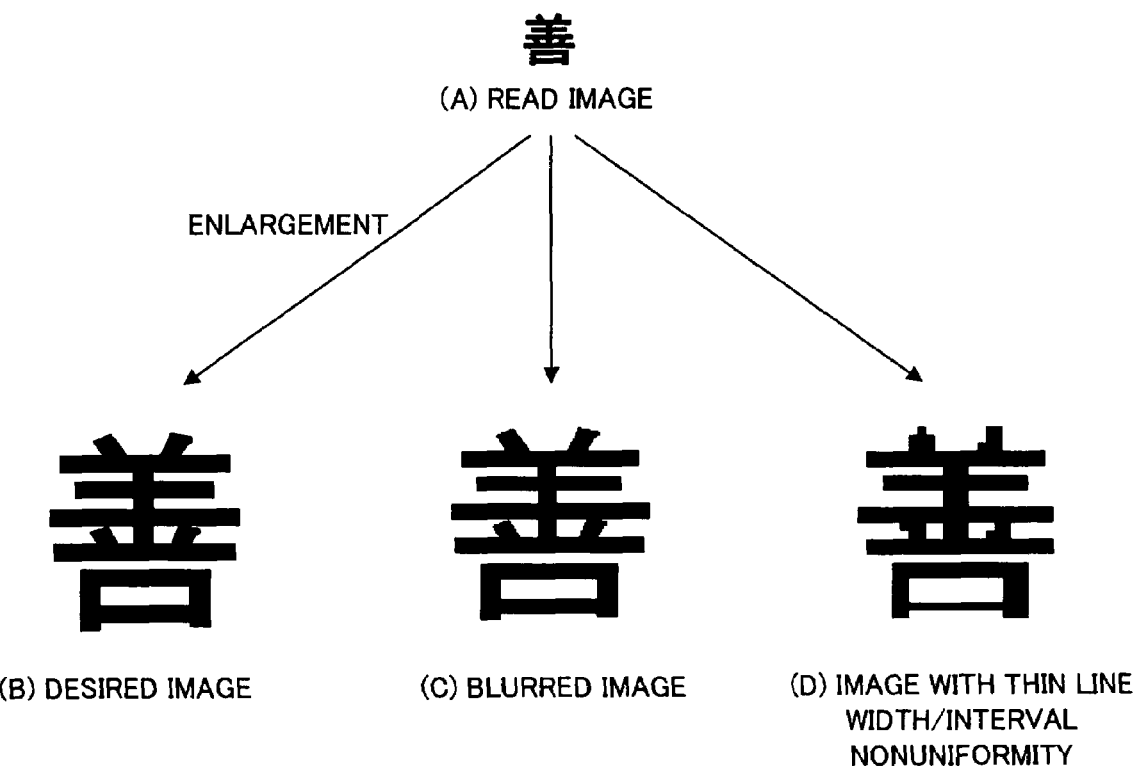
FIG. 1 is an explanatory view showing the quality of character images upon enlargement.

FIG. 1 is an explanatory view showing the quality of character images upon enlargement.

FIG. 1(A) shows a character image read with a scanner or the like. FIG. 1(B) shows a desired character image obtained by enlarging the character image shown in FIG. 1(A). However, when such read character image is enlarged, thin lines of the character may be blurred as shown in FIG. 1(C) according to character size or relation between resolutions before and after the enlargement. Otherwise, as shown in FIG. 1(D), smooth curves may become irregular, and further, line width and/or line interval may become non-uniform. In such cases, the quality of the character is seriously degraded.

More particularly, when a character image is enlarged, in multivalue data format, the problem of blur and irregular curves occurs, and in binary data format, the problem of nonuniformity of width and interval and irregular curves occurs. Further, in nearest neighbor interpolation, the problem of jaggy occurs, and in linear interpolation, the problem of blur is noticeable, and in sample function convolution interpolation, the problem of irregular curves occurs.

On the other hand, a technique of constructing an image in a resolution higher than an image sensing resolution, based in plural images obtained in minutely shifted image sensing positions, is known. By use of this technique, the quality of enlarged character can be improved.

Figure 2:
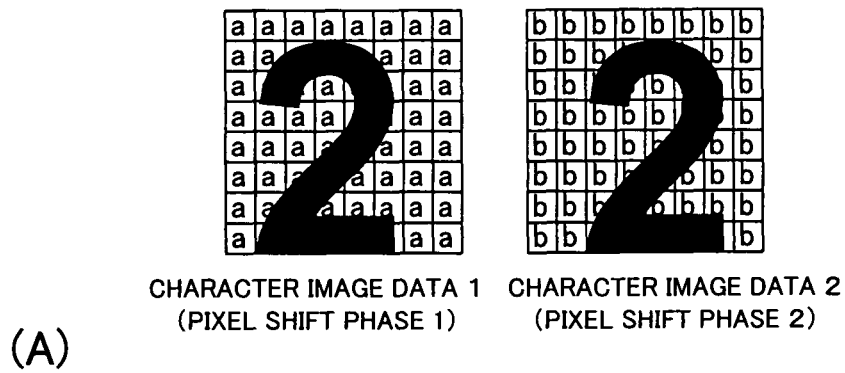
FIG. 2 is an explanatory view showing generation of an image in a resolution higher than an image sensing resolution.
Figure 2:
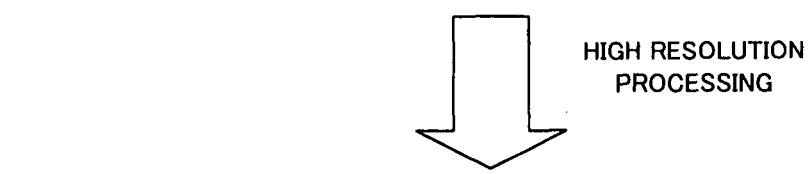
Figure 2:
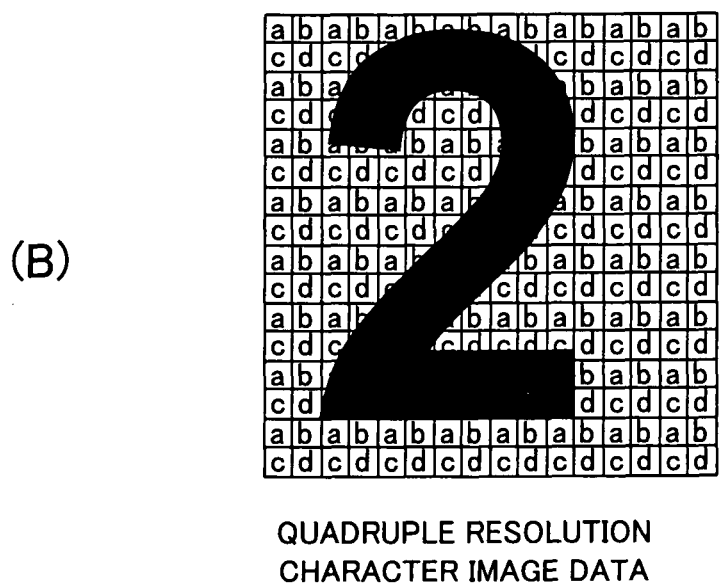

FIG. 2 is an explanatory view showing generation of an image in a resolution higher than an image sensing resolution.

FIG. 2(A) shows character image data pieces 1 to 4 in pixel shifted phases 1 to 4 obtained from an original image. The character image data pieces 1 to 4 are obtained while shifting the original image by ½ pixel. FIG. 2(B) shows an image in a resolution quadruple of that of the original image, generated based on the character image data pieces 1 to 4 shown in FIG. 2(A).

However, when this technique is used, it is necessary to minutely shift an image sensing position by use of plural cameras in different image sensing directions or shifting an image sensing optical system. For example, when an original image is read with a multifunction apparatus having a scanner, scanning is performed plural times while the carriage position of a line sensor is minutely changed. In this case, problems of increment in apparatus cost and reduction of productivity by scanning occur.

Figure 3:
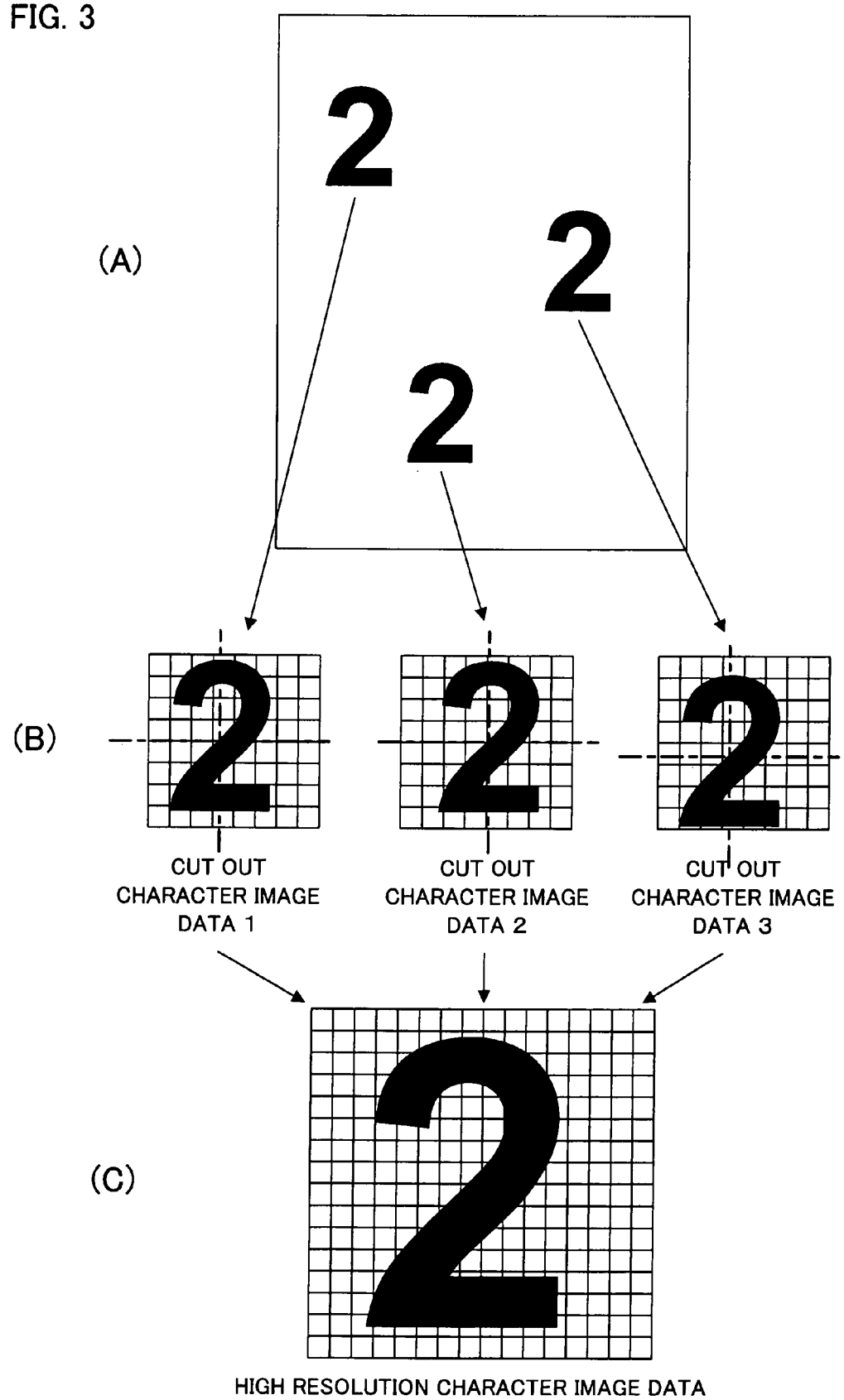
FIG. 3 is an explanatory view showing the outline of image processing by an image processing apparatus according to the present invention.

FIG. 3 is an explanatory view showing the outline of image processing by an image processing apparatus according to the present invention.

As shown in FIG. 3(A), the image processing apparatus according to the present invention extracts a character which appears plural times in one page original or plural pages of document. The read plural same characters are often read in different phases with respect to an original character (e.g., the center of gravity of the character). Accordingly, the phases of the extracted plural characters are shifted from each other.

As shown in FIG. 3(B), the image processing apparatus according to the present invention calculates the phases of the respective extracted characters. The phase of each character is obtained by calculation of e.g. the center of gravity of the character and calculation of relative positions between the calculated center of gravity and sampling lattice points. Further, as shown in FIG. 3(C), the image processing apparatus according to the present invention generates a high resolution character image based on the calculated phases and the respective extracted characters.

Note that the high resolution processing may be performed on partial images having the same shape such as figures, as well as character images. In this case, the image processing apparatus according to the present invention extracts a partial image which appears plural times in an input image, calculates the phases of the respective extracted partial images, and generates a high resolution partial image based on the calculated phases and the respective extracted partial images.

Hereinbelow, the image processing apparatus according to the present invention will be described about an example where the high resolution processing is performed on a character image for the purpose of simplification of explanation.

Next, an image processing apparatus 2 according to a first exemplary embodiment of the present invention will be described.

Figure 4:
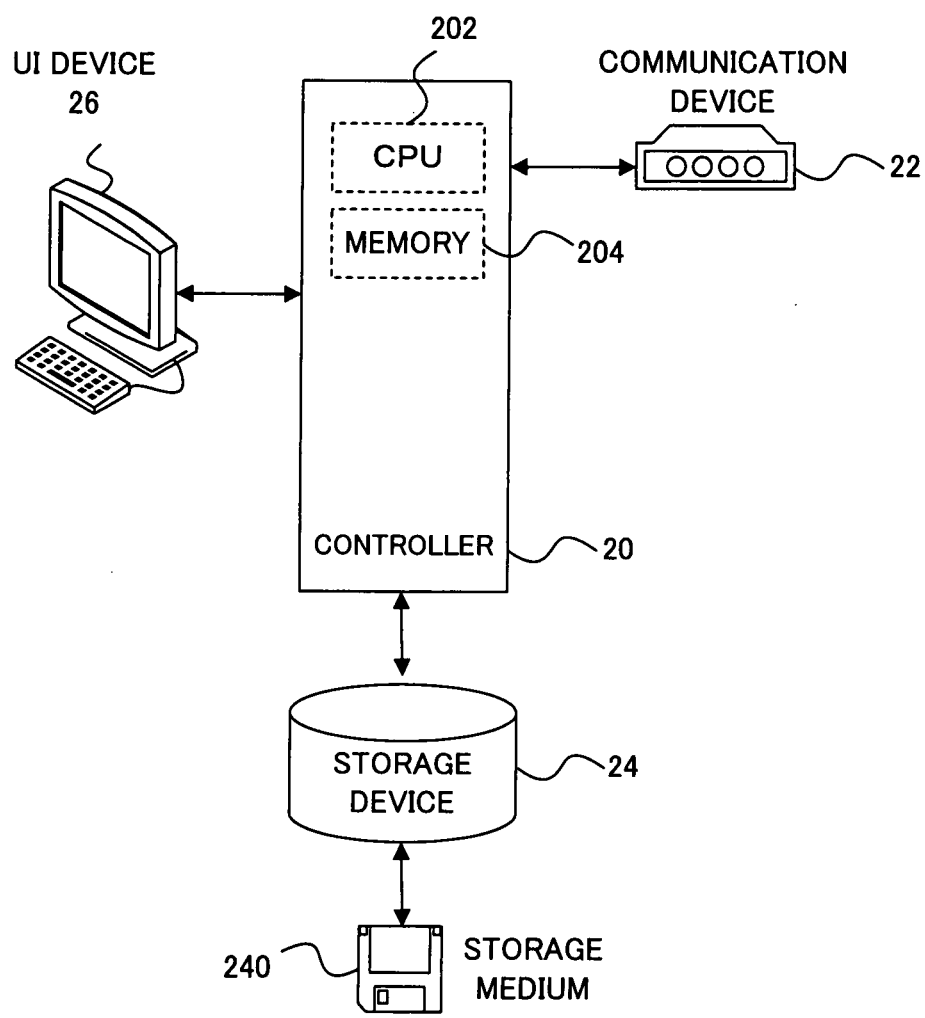
FIG. 4 illustrates the hardware configuration of an image processing apparatus 2 and an image enlarging apparatus 3 according to exemplary embodiments of the present invention, with a controller 20 as a central element.

FIG. 4 illustrates the hardware configuration of the image processing apparatus 2 and an image enlarging apparatus 3 to be described later according to the exemplary embodiments of the present invention, with a controller 20 as a central element.

As shown in FIG. 4, the image processing apparatus 2 or the like has a controller 20 including a CPU 202, a memory 204 and the like, a communication device 22 to perform data transmission and reception with an external computer or the like via a network, a storage device 24 such as a hard disk drive, and a user interface (UI) device 26 including a display such as a liquid crystal display, a keyboard and a pointing device.

The image processing apparatus 2 or the like is e.g. a general purpose computer in which a character image acquisition program 4 to be described later and the like are installed. The image processing apparatus 2 or the like obtains image data via the communication device 22, the storage device 24, a storage medium 240 or the like, and performs image processing on the obtained image data. The image processing apparatus 2 obtains image data obtained by optical reading with a scanner function of a printer (not shown) or a scanner (not shown).

Figure 5:
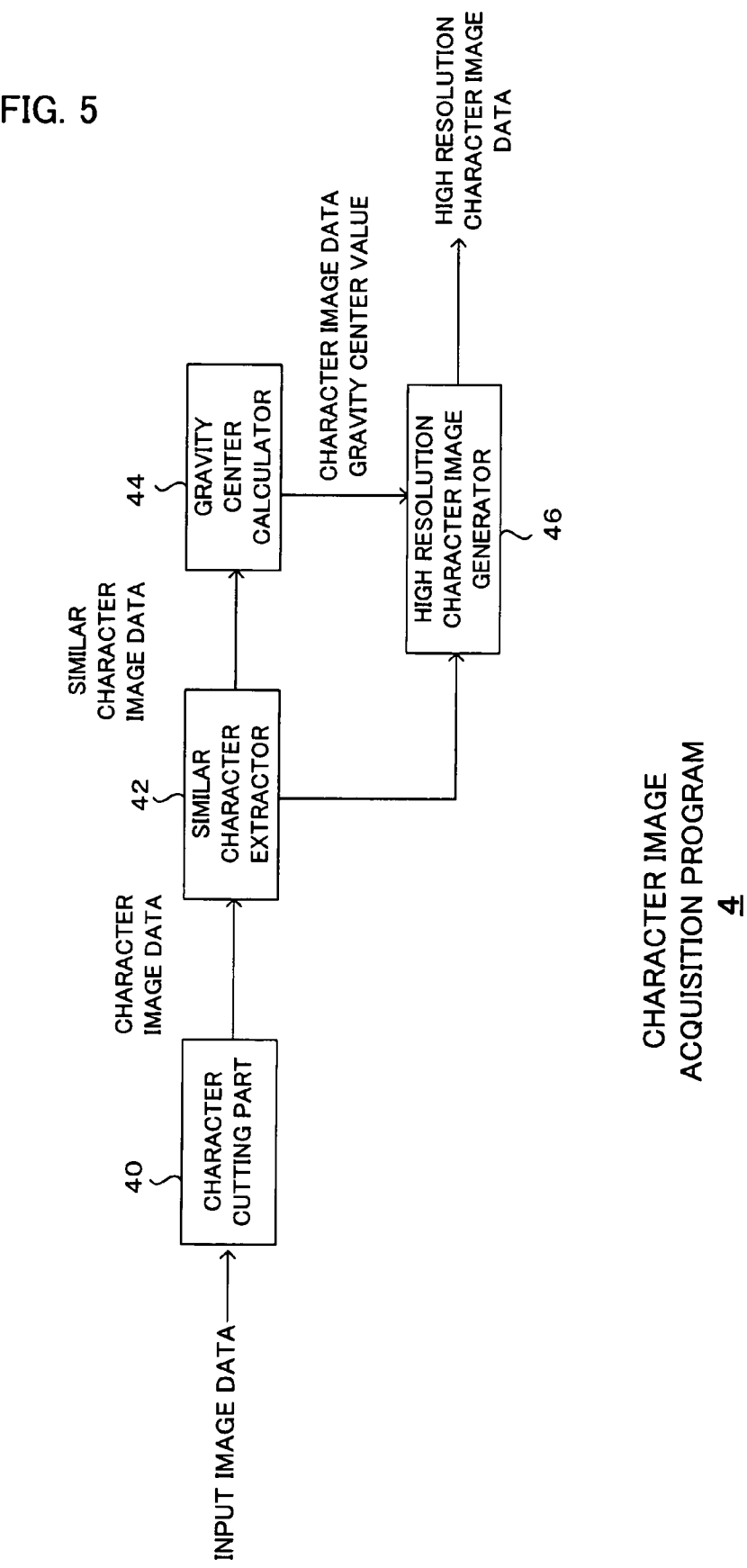
FIG. 5 is a block diagram showing the functional structure of a character image acquisition program 4 performed by the controller 20 of the image processing apparatus 2 according to a first exemplary embodiment of the present invention.

FIG. 5 is a block diagram showing the functional structure of the character image acquisition program 4 performed by the controller 20 of the image processing apparatus 2 according to the first exemplary embodiment of the present invention.

As shown in FIG. 5, the character image acquisition program 4 has a character cutting part 40, a similar character extractor 42, a gravity center calculator 44 and a high resolution character image generator 46. The character image acquisition program 4 is supplied via e.g. the communication device 22 to the controller 20, then loaded into the memory 204, and performed on an OS (not shown) operating on the controller 20 utilizing hardware. It may be arranged such that the character image acquisition program 4 is stored in the storage medium 24 such as an FD, a CD or a DVD, and is supplied to the image processing apparatus 2. Note that the following respective programs are supplied to the controller 20 and performed in a similar manner. Further, the entire or a part of the character image acquisition program 4 may be realized by ASIC or the like provided in the image processing apparatus 2.

In the character image acquisition program 4, the character cutting part 40 receives an input image in a predetermined resolution (first resolution) read with a scanner or the like via the communication device 22, the storage device 24 or the storage medium 240. The character cutting part 40 cuts out character images included in the input image and outputs them to the similar character extractor 42. Note that the input image may be one page original or plural pages of original document.

The similar character extractor 42 receives the character images cut out by the character cutting part 40, extracts mutually similar character images, and outputs them to the gravity center calculator 44 and the high resolution character image generator 46. More particularly, the similar character extractor 42 specifies a first character image from the plural cut out character images, and extracts the first character image and a second character image similar to the first character image.

The gravity center calculator 44 calculates the respective centers of gravity of the character images received from the similar character extractor 42, and outputs the calculated gravity center values to the high resolution character image generator 46. The gravity center calculator 44 calculates a center of gravity in a resolution higher than one pixel in the first resolution. Note that it may be arranged such that the gravity center calculator 44 calculates respective phases of the character images based on relative positions between the calculated gravity center values and sampling lattice points, and outputs the calculated phases to the high resolution character image generator 46. Further, the gravity center calculator 44 may calculate the central portion or the center of character image based on width and height of the character image. In this case, the gravity center calculator 44 outputs the calculated central portion or the like of the character image.

The high resolution character image generator 46 generates a character image in a second resolution higher than the first resolution, based on the respective character images extracted by the similar character extractor 42 and the phases of the respective character images calculated in the resolution higher than one pixel in the first resolution. More particularly, the high resolution character image generator 46 calculates the phases of the character images based on relative positions between the centers of gravity of the respective character images calculated by the gravity center calculator 44 and sampling lattice points, and generates a character image based on the similar character images received from the similar character extractor 42 and the phases of the respective character images. When the phases of the character images are calculated by the gravity center calculator 44 and inputted into the high resolution character image generator 46, the high resolution character image generator 46 may use the phases.

The second resolution may be the same as the first resolution. In this case, the high resolution character image generator 46 further performs resolution conversion processing on the character image in the second resolution higher than the first resolution thereby generates a character image in the second resolution the same as the first resolution. Further, the second resolution may be lower than the first resolution. In this case, the high resolution character image generator 46 further performs resolution conversion processing (reduction processing) on the character image in the second resolution higher than the first resolution thereby generates a character image in the second resolution lower than the first resolution. Note that character image generation processing by the high resolution character image generator 46 will be described in detail later.

Figure 6:
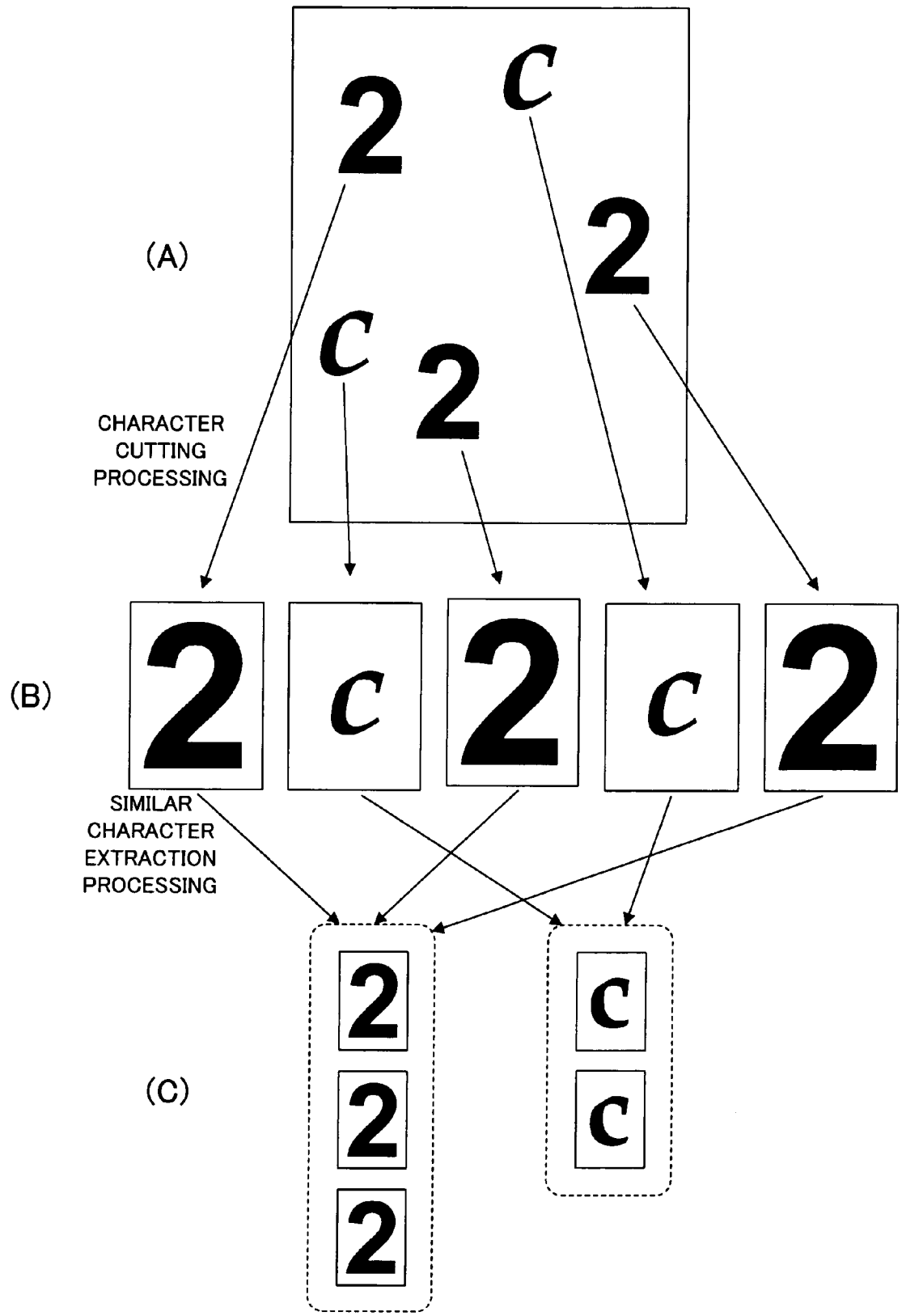
FIG. 6 is an explanatory view of character cutting processing by a character cutting part 40 and similar character extraction processing by a similar character extractor 42.

FIG. 6 is an explanatory view of character cutting processing by the character cutting part 40 and similar character extraction processing by the similar character extractor 42. FIG. 6(A) shows an input image. FIG. 6(B) shows character images cut out by the character cutting part 40 from the input image. FIG. 6(C) shows similar character images extracted by the similar character extractor 42.

As shown in FIGS. 6(A) and 6(B), the character cutting part 40 cuts out plural character images included in an input image. In this example, character images "2" and "c" are cut out from the input image.

For example, the character cutting part 40 may cut out a continuous black cluster (e.g. black pixels connected in 8 neighbor positions) as one character image, from a binarized input image. Otherwise, the character cutting part 40 may cut out one character image based on an estimated character area by estimation of character string and character interval. Further, the character cutting part 40 may cut out a character image specified with an external OCR (Optical Character Reader) or the like. Note that the character cutting is not particularly limited.

As shown in FIG. 6(C), the similar character extractor 42 extracts similar character images from the cut out character images. In this example, the similar character extractor 42 extracts character images similar to the character image "2" and character images similar to the character image "c". For example, the similar character extractor 42 judges whether or not these character images are similar by performing pattern matching between the first character image and the second character image. In this case, the similar character extractor 42 performs pattern matching between respective similar character images.

Further, for example, the similar character extractor 42 may handle one character image data as one vector data and perform clustering thereby extract a character image similar to the character image. In this case, when the distance (Euclidean distance) between the vector data representing the character image and the vector data of a character image as the subject of judgment is less than a predetermined value (i.e., when the distance between the two vector data is short), the similar character extractor 42 judges that the character image and the character image as the subject of judgment are similar. Note that the similarity judgment is not particularly limited.

FIGS. 7A to 7E are explanatory views showing high resolution character image data generation processing by the high resolution character image generator 46.

Figure 7A:
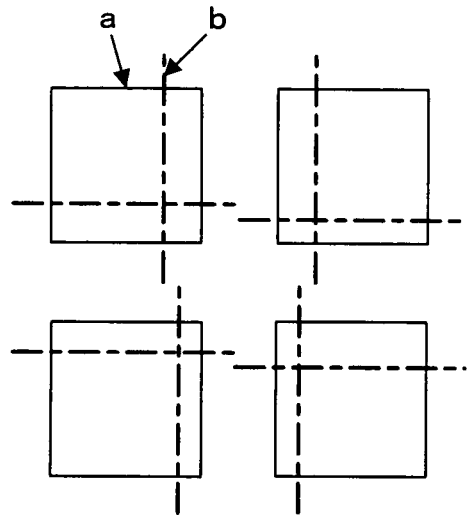
FIGS. 7A to 7E are explanatory views showing high resolution character image data generation processing by a high resolution character image generator 46.
Figure 7B:
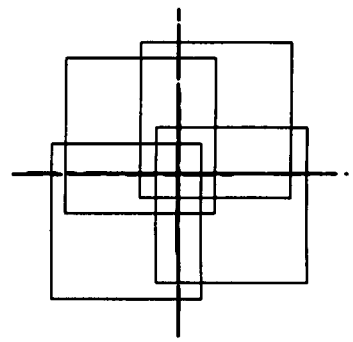

FIG. 7A shows the sampling lattices for an input image in the first resolution and the gravity center positions of the character image data. In FIG. 7A, rectangles indicated with an arrow a are input image sampling lattices, and points where broken lines indicated with an arrow b intersect are the gravity center positions of the character image data. In this example, four input image sampling lattices are used. First, as shown in FIG. 7B, the high resolution character image generator 46 moves the phases of the four sampling lattices based on the centers of gravity of the character image data.

Figure 7C:
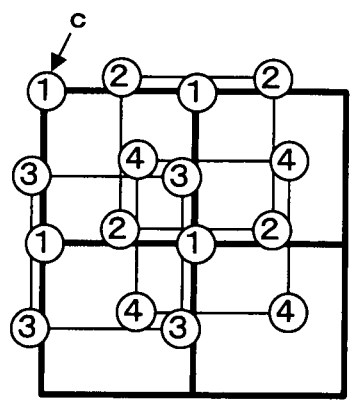
Figure 7D:
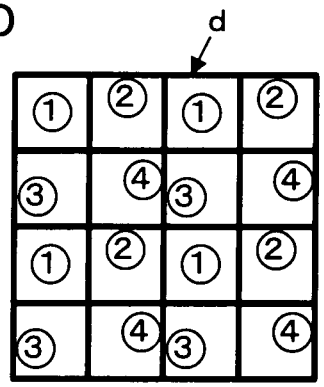

FIGS. 7C and 7D are explanatory views showing setting of a sampling lattice in the second resolution higher than the first resolution. In FIG. 7C, circled numbers indicated with an arrow c are the values of character image data in the first resolution. The character image data is illustrated such that the circled numbers are positioned on the lattice points of the sampling lattice in the first resolution. In FIG. 7D, bold lines indicated with an arrow d are high resolution character image sampling lattice in the second resolution.

When the phases of the four sampling lattices in the first resolution are moved, the high resolution character image generator 46 sets the sampling lattice in the second resolution as shown in FIG. 7C, and moves the phase of the sampling lattice in the second resolution based on the center of gravity of the character image data, as shown in FIG. 7D.

Figure 7E:
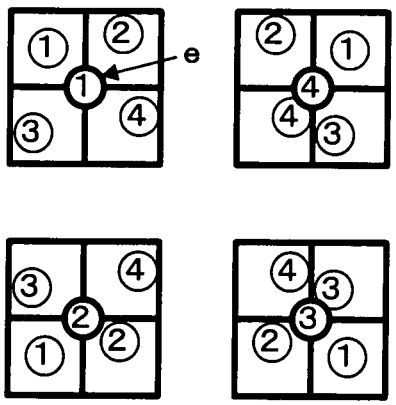

FIG. 7E is an explanatory view showing calculation of the values of the character image data in the second resolution. In FIG. 7E, bold circled numbers indicated with an arrow e are the values of the character image data in the second resolution. The character image data in the second resolution is illustrated such that the bold circled numbers are positioned on the lattice points of the sampling lattice in the second resolution.

The high resolution character image generator 46 interpolates the pixel values of the character image in the second resolution, from the pixel values of the respective character images in the first resolution based on the phases of the respective character images. In this example, the high resolution character image generator 46 interpolates the pixel values of the character image in the second resolution by applying nearest neighbor interpolation. That is, the high resolution character image generator 46 selects one of the four values (circled numbers "1" to "4") of the character image data in the first resolution, which is nearest the sampling lattice point in the second resolution, as the value of the character image data in the second resolution. Note that the interpolation is not particularly limited and other interpolation (e.g., linear interpolation) may be applied.

Figure 8:
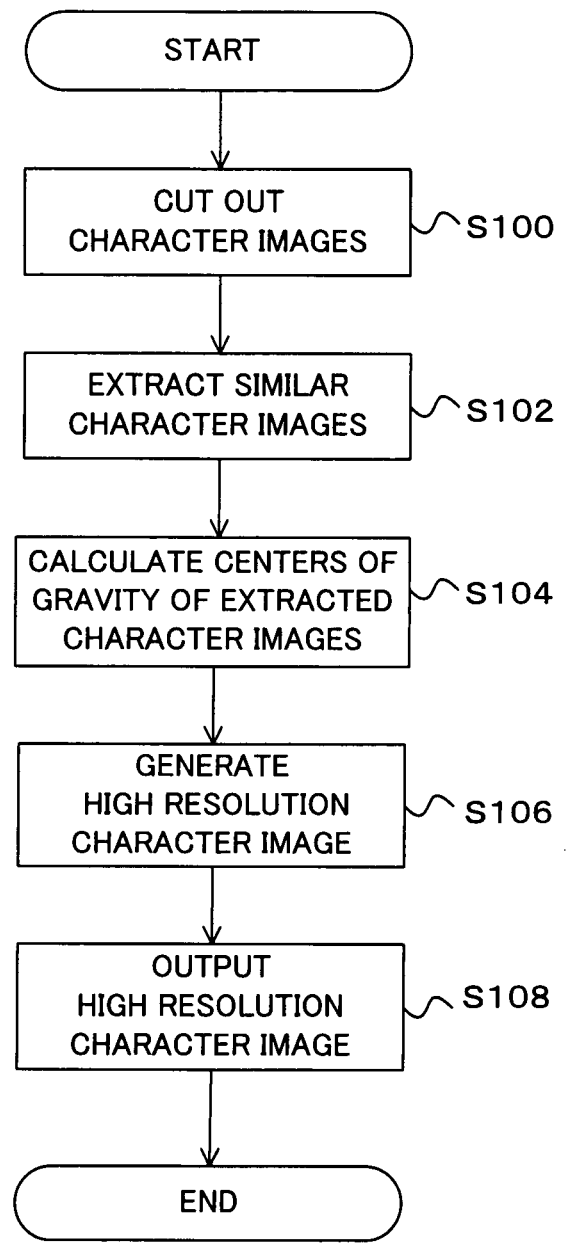
FIG. 8 is a flowchart showing high resolution character image acquisition processing (S10) based on the character image acquisition program 4.

FIG. 8 is a flowchart showing high resolution character image acquisition processing (S10) based on the character image acquisition program 4.

As shown in FIG. 8, at step S100, the character cutting part 40 of the character image acquisition program 4 receives an input image in the first resolution, cuts out character images from the input image, and outputs them to the similar character extractor 42.

At step S102, the similar character extractor 42 extract similar character images in the first resolution from the character images cut out by the character cutting part 40.

At step S104, the gravity center calculator 44 calculates the centers of gravity of the respective character images extracted by the similar character extractor 42, in a resolution higher than the first resolution.

At step S106, the high resolution character image generator 46 calculates the phases of the respective character images based on the centers of gravity of the respective character images calculated by the gravity center calculator 44, and generates a character image in the second resolution based on the respective similar character images extracted by the similar character extractor 42 and the phases of the similar character images.

At step S108, the high resolution character image generator 46 outputs the generated high resolution character image data in the second resolution. Otherwise, the high resolution character image generator 46 may output the high resolution character image data to the external computer (not shown) via the communication device 22, or may store the high resolution character image data into the storage device 24 or the storage medium 240.

Next, the image enlarging apparatus 3 according to the exemplary embodiments of the present invention will be specifically described.

The image enlarging apparatus 3 is a general purpose computer where the image enlargement program 5 is installed.

Figure 9:
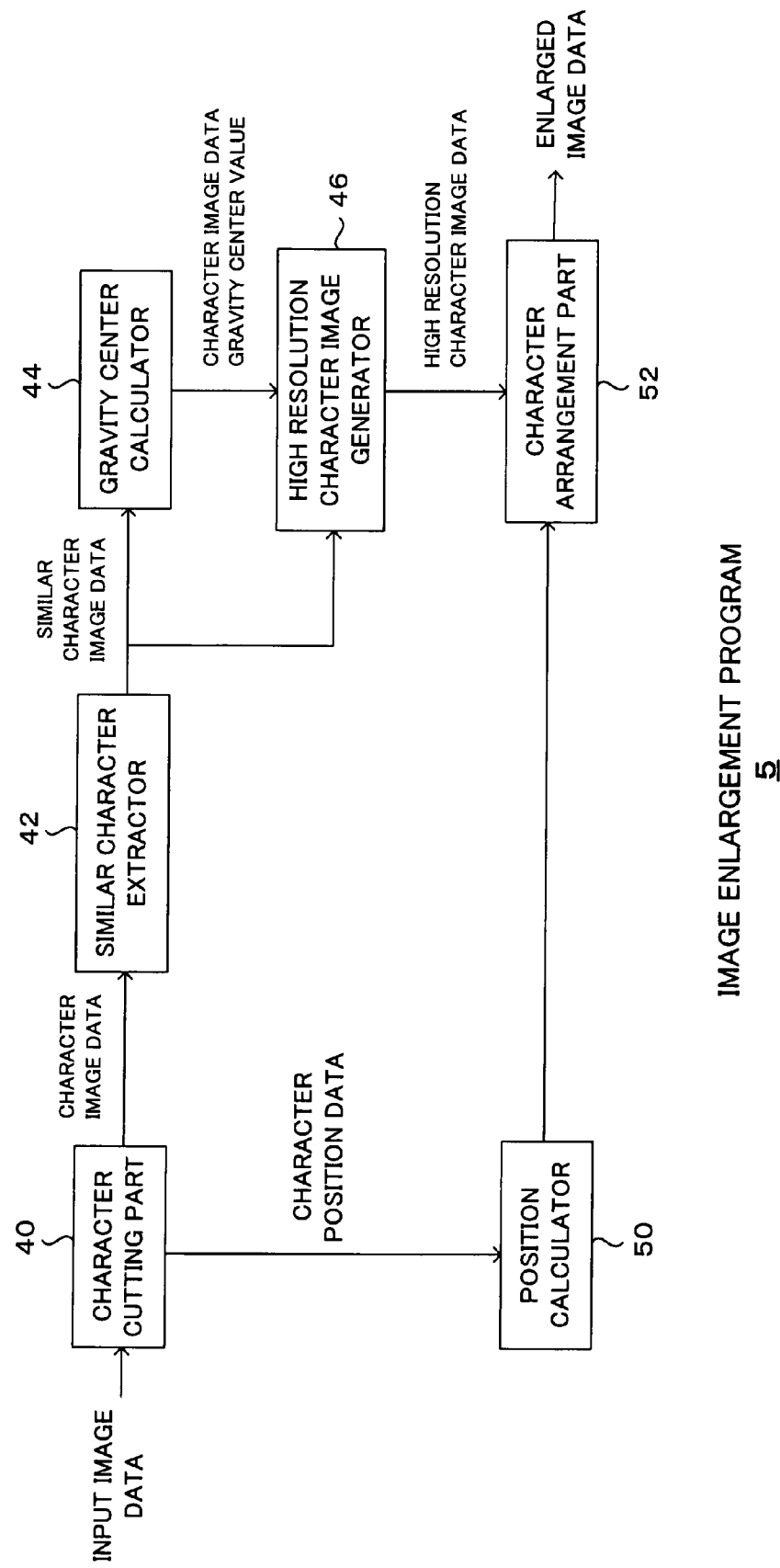
FIG. 9 is a block diagram showing the functional structure of an image enlargement program 5 performed by the controller 20 of the image enlarging apparatus 3 according to the first exemplary embodiment of the present invention.

FIG. 9 is a block diagram showing the functional structure of the image enlargement program 5 performed by the controller 20 of the image enlarging apparatus 3 according to the exemplary embodiments of the present invention.

As shown in FIG. 9, the image enlargement program 5 has the character cutting part 40, the similar character extractor 42, the gravity center calculator 44, the high resolution character image generator 46, a position calculator 50 and a character arrangement part 52. Note that among the constituent elements shown in FIG. 9, the elements substantially corresponding to those shown in FIG. 5 have the same reference numerals. In this manner, the image enlargement program 5 includes the character image acquisition program 4.

In the image enlargement program 5, the position calculator 50 receives character position data of character image cut out by the character cutting part 40 from an input image in the first resolution, and based on the position of the character image, calculates the position of a character image, corresponding to the character position, in an enlarged image in the second resolution. The position calculator 50 outputs the calculated position to the character arrangement part 52.

The character arrangement part 52 receives the position in the enlarged image in the second resolution calculated by the position calculator 50 based on the position of the character image extracted in the first resolution, and a character image in the second resolution generated by the high resolution character image generator 46 corresponding to the calculated position, and arranges the character image in the second resolution in the calculated position in the enlarged image. The character arrangement part 52 arranges character images in the second resolution, respectively corresponding to the character images included in the input image in the first resolution, in the enlarged image, thereby generates enlarged image data.

Figure 10:
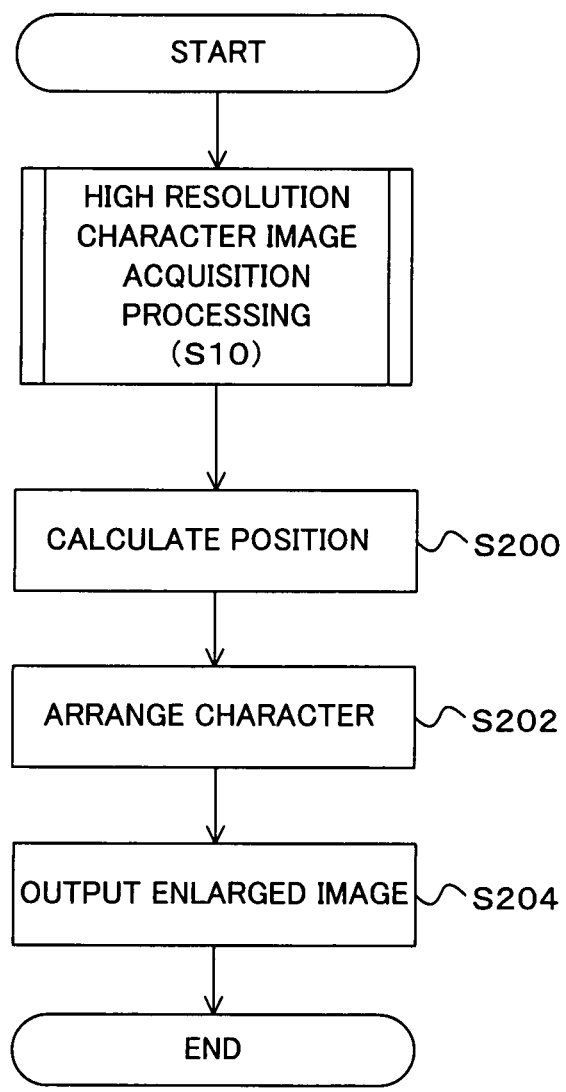
FIG. 10 is a flowchart showing image enlargement processing (S20) based on the image enlargement program 5.

FIG. 10 is a flowchart showing image enlargement processing (S20) based on the image enlargement program 5.

As shown in FIG. 10, the image enlargement program 5 performs the high resolution character image acquisition processing (step S10 in FIG. 8), to obtain character images in the second resolution respectively corresponding to character images in the first resolution.

At step S200, the position calculator 50 of the image enlargement program 5 calculates the positions of the respective character images in an enlarged image based on the positions of the respective character images included in the input image in the first resolution.

At step S202, the character arrangement part 52 arranges the character images in the second resolution in the positions in the enlarged image calculated based on the positions of the character images extracted in the first resolution.

At step S204, the character arrangement part 52 outputs the generated enlarged image data. Otherwise, the character arrangement part 52 may transmit the enlarged image data via the communication device 22, or may store the enlarged image data into the storage device 24 or the like.

Next, the image processing apparatus 2 according to a second exemplary embodiment of the present invention will be described.

The image processing apparatus 2 according to the present exemplary embodiment is a general purpose computer in which a character image acquisition program 6 is installed. The character image acquisition program 6 is different from the character image acquisition program 4 in that a noise elimination function is added to the character image acquisition program 4 (FIG. 5).

Figure 11:
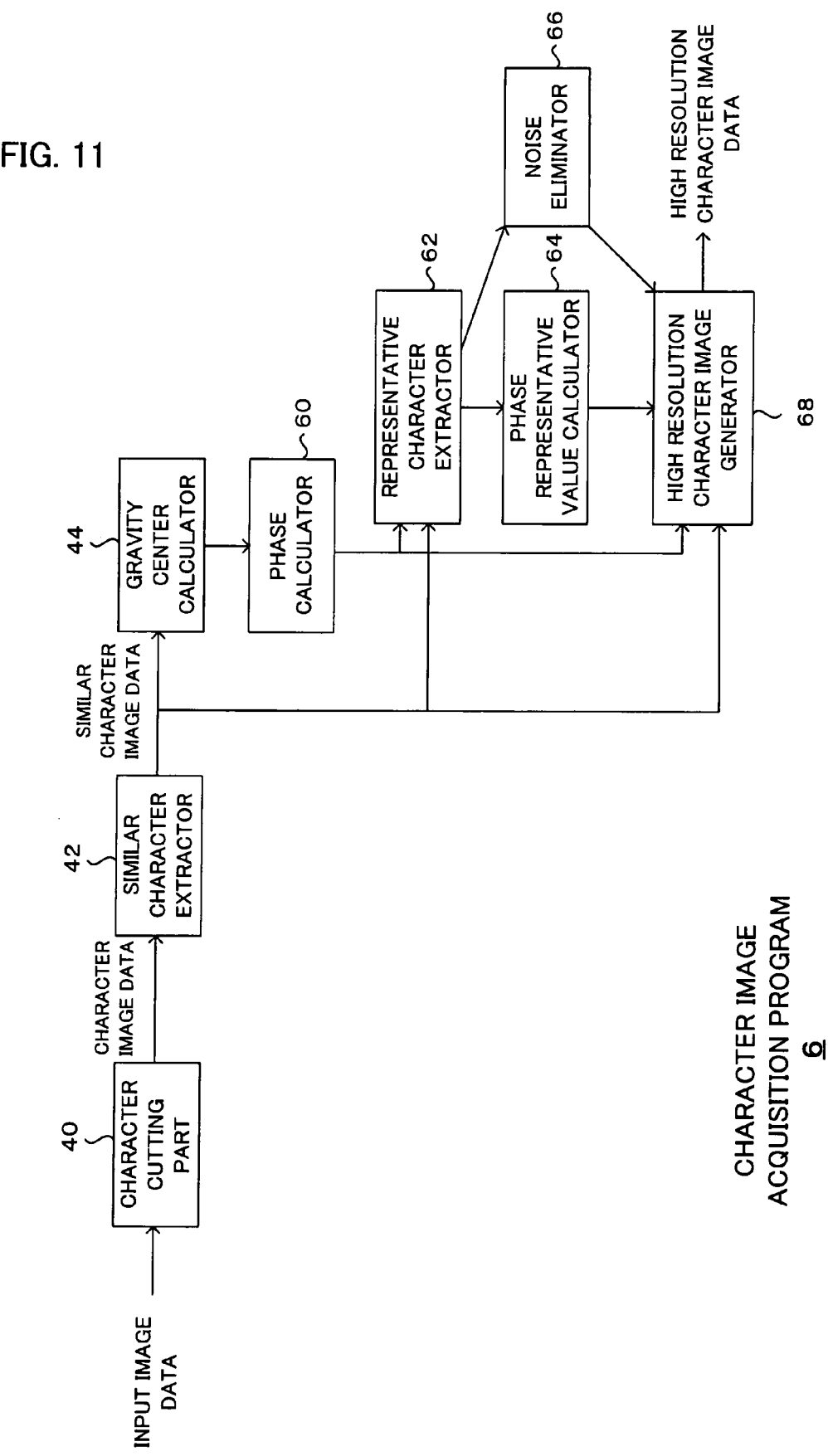
FIG. 11 is a block diagram showing the functional structure of a character image acquisition program 6 performed by the controller 20 of the image processing apparatus 2 according to a second exemplary embodiment of the present invention.

FIG. 11 is a block diagram showing the functional structure of the character image acquisition program 6 performed by the controller 20 of the image processing apparatus 2 according to the second exemplary embodiment of the present invention.

As shown in FIG. 11, the character image acquisition program 6 has the character cutting part 40, the similar character extractor 42, the gravity center calculator 44, a phase calculator 60, a representative character extractor 62, a phase representative value calculator 64, a noise eliminator 66 and a high resolution character image generator 68. Note that among the respective constituent elements shown in FIG. 11, the elements substantially corresponding to those shown in FIG. 5 have the same reference numerals. In this manner, the character image acquisition program 6 includes the character image acquisition program 4.

In the character image acquisition program 6, the phase calculator 60 calculates the phases of character images based on the centers of gravity of the character images calculated by the gravity center calculator 44 with precision higher than one pixel in the first resolution and relative positions between the gravities of center and sampling lattice points, and outputs the calculated phases to the representative character extractor 62 and the high resolution character image generator 68.

The representative character extractor 62 receives plural similar character images extracted by the similar character extractor 42 and the phases of the character images calculated by the phase calculator 60, and extracts plural character images having mutually small phase differences as a representative character image. The representative character extractor 62 sets a character image having a phase difference smaller than a predetermined threshold value as a representative character image. The representative character extractor 62 outputs the extracted plural representative character images to the phase representative value calculator 64 and the noise eliminator 66.

The phase representative value calculator 64 selects one phase representative value from the phases of the plural character images extracted by the representative character extractor 62, and outputs it to the high resolution character image generator 68. Note that the phase representative value is calculated by similar character image.

The noise eliminator 66 eliminates noise of the character images based on the respective character images extracted by the similar character extractor 42 and the phases of the respective character images calculated with precision higher than one pixel in the first resolution. More particularly, the noise eliminator 66 performs smoothing processing based on the plural representative character images extracted by the representative character extractor 62 thereby performs noise elimination processing on the character images. The smoothing processing is performed by e.g. obtaining a mean value of pixel values in corresponding positions in the extracted plural representative character images. The noise eliminator 66 outputs the noise-eliminated character images to the high resolution character image generator 68.

The high resolution character image generator 68 generates a character image which is a character image in the second resolution higher than the first resolution and which is a noise-eliminated image, based on the character images noise-eliminated by the noise eliminator 66 and the phase representative values of the character images calculated by the phase representative value calculator 64. Note that the high resolution character image generator 68 may generate the character image in the second resolution further based on the noise-uneliminated character images extracted by the similar character extractor 42 and the phases of the character images calculated by the phase calculator 60.

Figure 12:
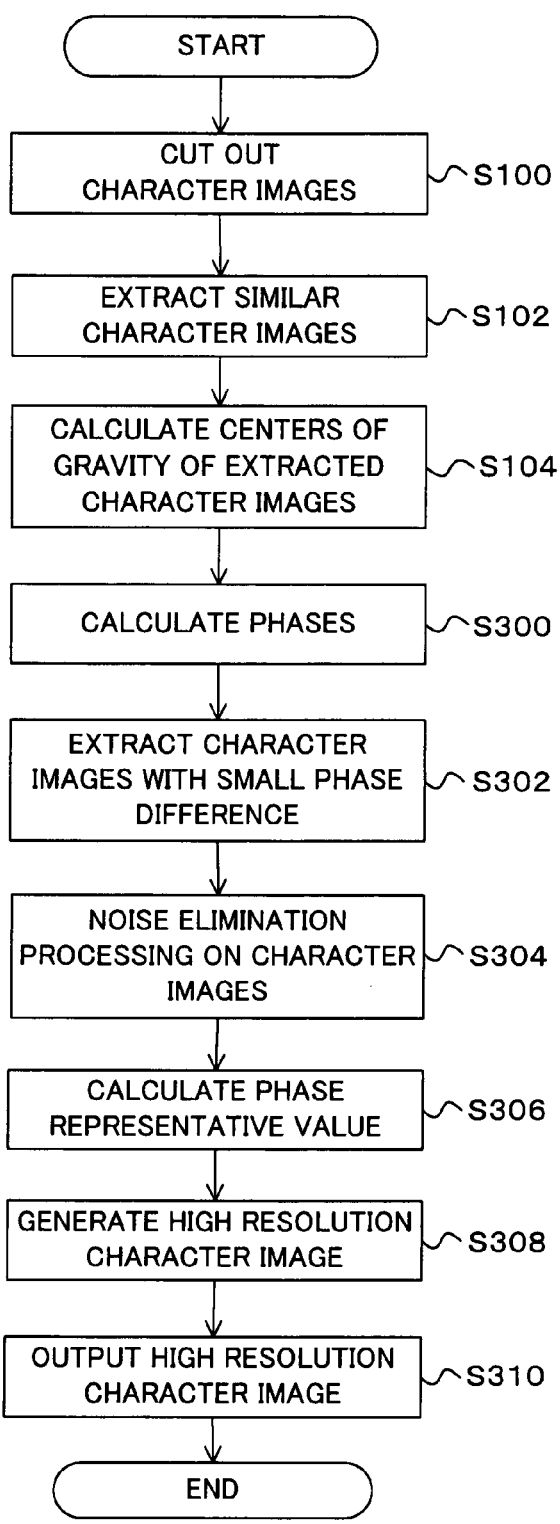
FIG. 12 is a flowchart showing high resolution character image acquisition processing including noise elimination processing (S30) based on the character image acquisition program 6.

FIG. 12 is a flowchart showing high resolution character image acquisition processing including noise elimination processing (S30) based on the character image acquisition program 6. Note that among the respective processing steps shown in FIG. 12, the processing steps substantially corresponding to those shown in FIG. 8 have the same reference numerals.

As shown in FIG. 12, character images are extracted from an input image, and the centers of gravity of the extracted character images are calculated at step S100 to S104.

At step S300, the phase calculator 60 calculates the phases of the respective extracted character images based on the calculated centers of gravity.

At step S302, the representative character extractor 62 extracts similar characters having mutually small phase differences as a representative character image.

At step S304, the noise eliminator 66 performs noise elimination processing based on the respective extracted character images and the phases of the respective character images, thereby generates noise-eliminated character images.

At step S306, the phase representative value calculator 64 selects one phase representative value from the phases of the respective extracted character images.

At step S308, the high resolution character image generator 68 generates a noise-eliminated character image in the second resolution based on the noise-eliminated character images and the phase representative value of the character images calculated by the phase representative value calculator 64.

At step S310, the high resolution character image generator 68 outputs the generated high resolution character image data in the second resolution.

Figure 13:
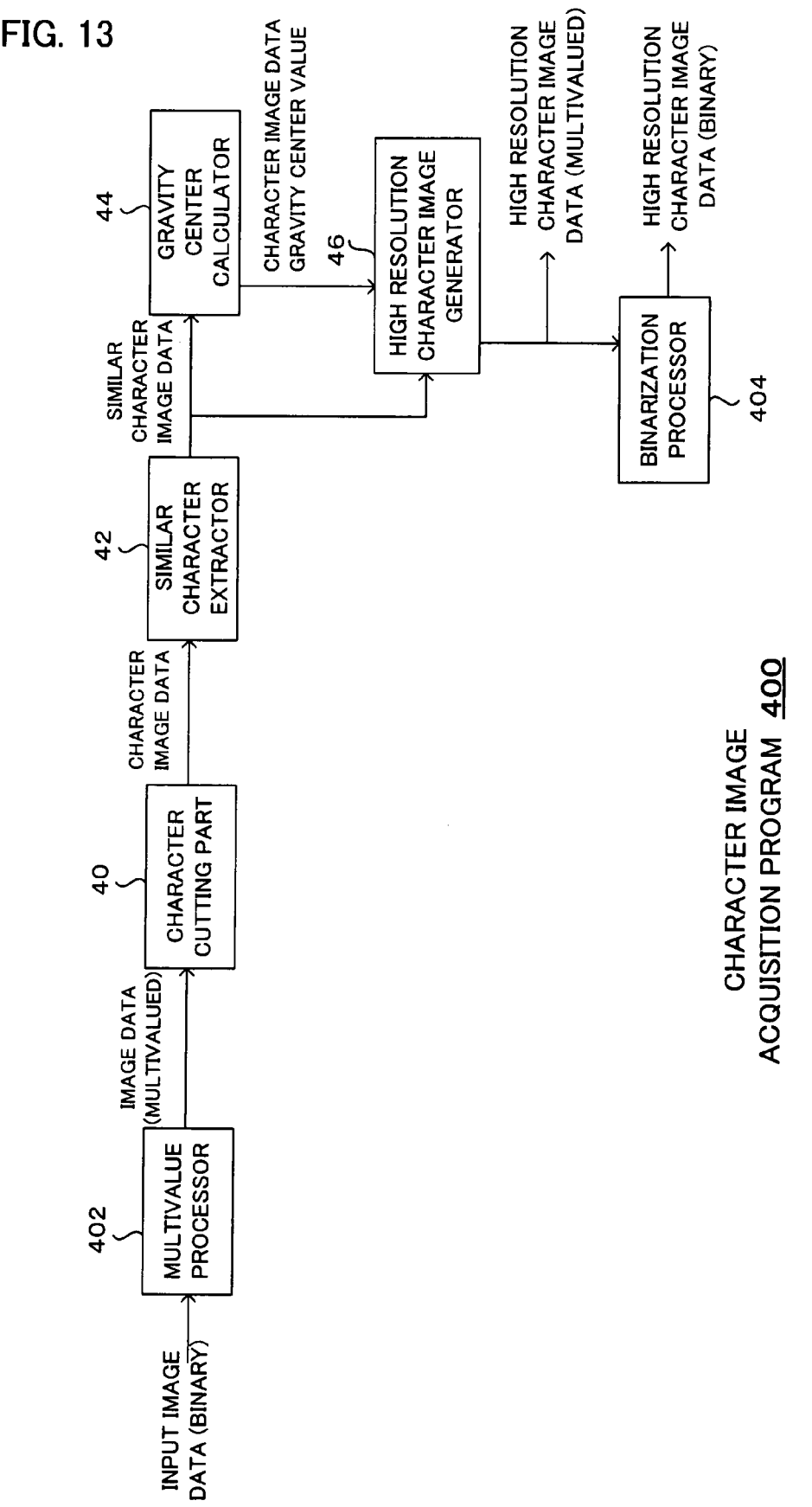
FIG. 13 is a block diagram showing the functional structure of a character image acquisition program 400 performed by the controller 20 of the image processing apparatus 2 according to a third exemplary embodiment of the present invention.

FIG. 13 is a block diagram showing the functional structure of a character image acquisition program 400 performed by the controller 20 of the image processing apparatus 2 according to a third exemplary embodiment of the present invention.

As shown in FIG. 13, the character image acquisition program 400 has a structure in which a multivalue processor 402 and a binarization processor 404 are added to the character image acquisition program 4 shown in FIG. 5. Note that among the respective constituent elements shown in FIG. 13, the elements substantially corresponding to those shown in FIG. 5 have the same reference numerals.

In the character image acquisition program 400, the multivalue processor 402 receives a binary input image in a predetermined resolution (first resolution) read with a scanner or the like via the communication device 22, the storage device 24 or the storage medium 240, then performs multivalue processing (processing to increase the number of grayscale levels) on the input image thereby converts the image into a multivalued image, and outputs the multivalued image to the character cutting part 40. Note that the multivalue processing will be described in detail later.

Accordingly, the character cutting part 40 receives the image multivalued by the multivalue processor 402, and cuts out character images included in the multivalued image. The similar character extractor 42 receives the multivalued character images cut out by the character cutting part 40, and extracts mutually-similar multivalued character images. The gravity center calculator 44 calculates the centers of gravity of the respective multivalued character images received from the similar character extractor 42. The high resolution character image generator 46 generates a multivalued character image in a second resolution higher than the first resolution based on the respective multivalued character images extracted by the similar character extractor 42 and the phases of the respective character images calculated with precision higher than one pixel in the first resolution. The high resolution character image generator 46 outputs the generated multivalued character image in the second resolution to the binarization processor 404. Note that the high resolution character image generator 46 may store the multivalued character image data into the storage device 24, or may transmit the multivalued character image data to the external computer via the communication device 22.

The binarization processor 404 receives the multivalued character image in the second resolution generated by the high resolution character image generator 46, then performs binarization processing on the multivalued character image thereby converts the image to a binary character image, thus generates a binary character image in the second resolution. The binarization processor 404 converts the multivalued character image by performing threshold value processing into binary image, and outputs the binary character image. Otherwise, the binarization processor 404 may store the binary character image data into the storage device 24, or transmit the binary character image data to the external computer via the communication device 22.

FIGS. 14A to 14D are explanatory views showing the outline of the multivalue processing performed by the image processing apparatus 2 according to the third exemplary embodiment of the present invention.

As shown in FIGS. 14A to 14D, the image processing apparatus 2 performs one of plural multivalue processing methods to convert a binary image into a multivalued image. In this example, the image processing apparatus 2 performs multivalue processing by applying a predetermined multivalue processing method.

Figure 14A:
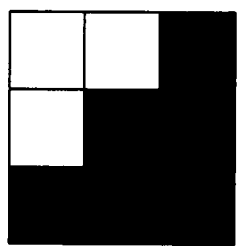
FIGS. 14A to 14D are explanatory views showing the outline of multivalue processing performed by the image processing apparatus 2 according to the third exemplary embodiment of the present invention.
Figure 14B:
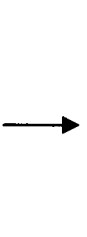
Figure 14C:
Figure 14D:

FIG. 14A shows a binary image inputted into the image processing apparatus 2. For example, the input image is a 3×3 pixel image, in which a black pixel is expressed as "1" and a white pixel is expressed as "0". FIGS. 14B to 14D show a first multivalue processing method, a second multivalue processing method, and a third multivalue processing method.

As shown in FIG. 14B, in the first multivalue processing method, the multivalue processor 402 converts binary values "0" and "1" to, e.g., "0" and "255". In the second multivalue processing method, the multivalue processor 402 converts respective character images to multivalued images by application of enlargement. Note that the multivalue processing is used with enlargement interpolation. Accordingly, the binary input image is enlarged, and the respective pixel values are converted to any one of e.g. 256 gray scale level values. In the third multivalue processing, the multivalue processor 402 converts the respective pixel values into gray font data. For example, the multivalue processor 402 applies a low-pass filter to the binary input image thereby performs multivalue processing. Further, for example, the multivalue processor 402 calculates a mean value of pixel values included in a predetermined area thereby performs multivalue processing.

In use of the first multivalue processing method or the third multivalue processing method, the high resolution character image generator 46 generates multivalue high resolution character image data as in the case of the method shown in FIG. 7. That is, in the present exemplary embodiment, the high resolution character image generator 46 interpolates pixel values of a character image in the second resolution from multivalued pixel values of respective character images in the first resolution based on the phases of the respective character images in the first resolution. The high resolution character image generator 46 applies nearest neighbor interpolation, liner interpolation or the like as the interpolation method. Note that the second multivalue processing method will be described in detail later.

Figure 15:
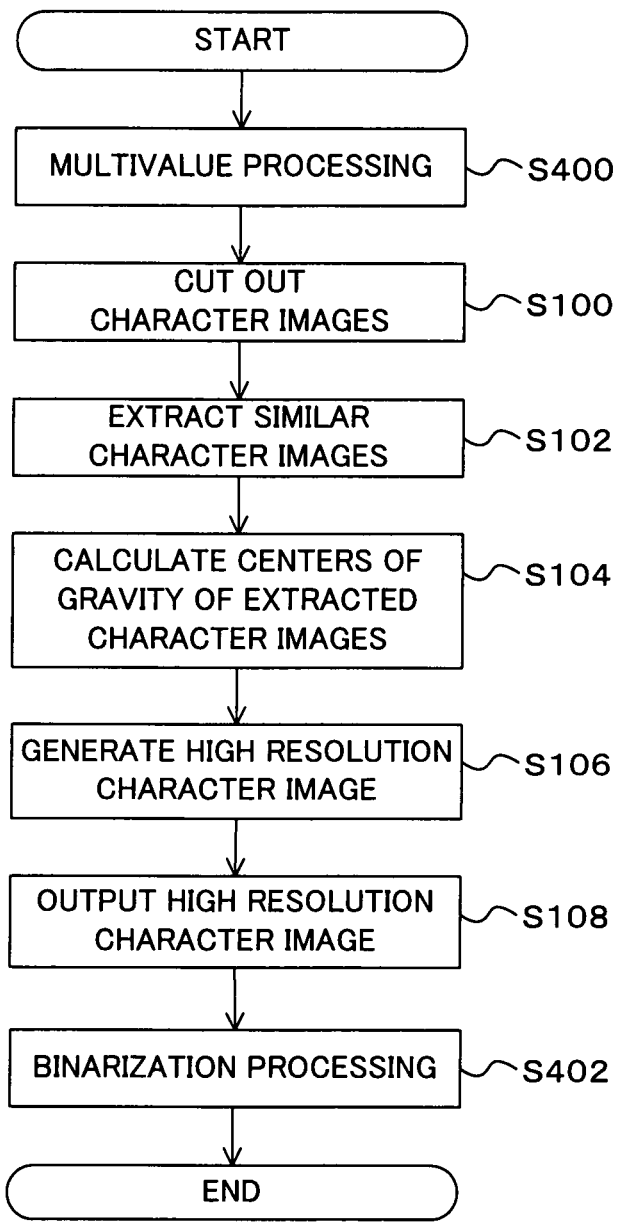
FIG. 15 is a flowchart showing high resolution character image acquisition processing (S40) based on the character image acquisition program 400.

FIG. 15 is a flowchart showing high resolution character image acquisition processing (S40) based on the character image acquisition program 400. Note that among the respective processing steps shown in FIG. 15, the processing steps substantially corresponding to those shown in FIG. 8 have the same reference numerals.

As shown in FIG. 15, at step S400, the multivalue processor 402 of the character image acquisition program 400 receives a binary input image in the first resolution, performs multivalue processing on the input image, and outputs the processed image to the character cutting part 40.

After the multivalue processing, a multivalued high resolution character image in the second resolution is generated by the processings at steps S100 to S108.

At step S402, the binarization processor 404 receives the generated multivalued character image, performs e.g. predetermined threshold value processing on the character image thereby converts the multivalued character image to a binary character image, and outputs the binary high resolution character image data in the second resolution.

Next, the image processing apparatus 2 according to fourth to sixth exemplary embodiments of the present invention will be described based on FIGS. 16 to 18.

Figure 16:
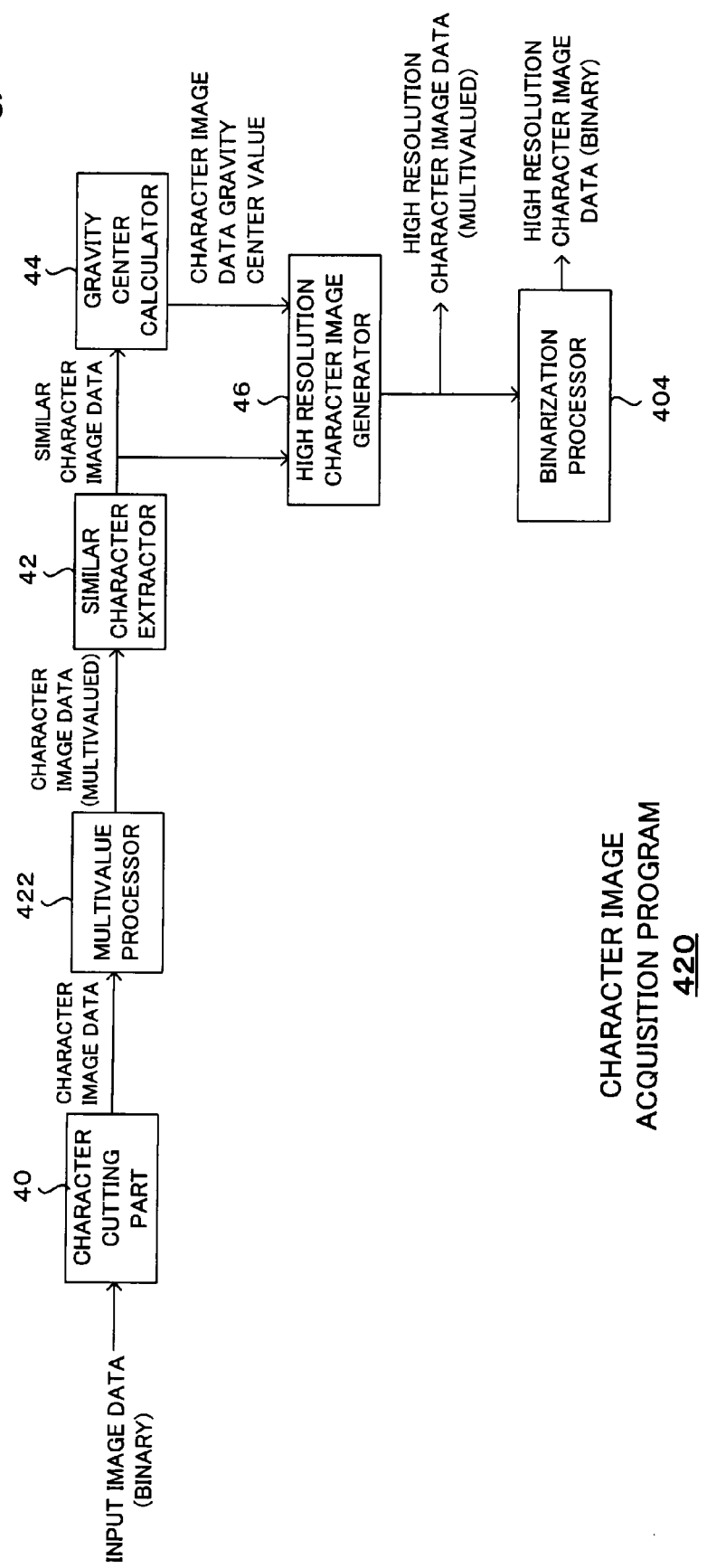
FIG. 16 is a block diagram showing the functional structure of a character image acquisition program 420 performed by the controller 20 of the image processing apparatus 2 according to a fourth exemplary embodiment of the present invention.

FIG. 16 is a block diagram showing the functional structure of a character image acquisition program 420 performed by the controller 20 of the image processing apparatus 2 according to the fourth exemplary embodiment of the present invention. Note that among the respective constituent elements shown in FIG. 16, the elements substantially corresponding to those shown in FIG. 13 have the same reference numerals.

As shown in FIG. 16, the character image acquisition program 420 is different from the character image acquisition program 400 shown in FIG. 13 in that the multivalue processing is performed after the character cutting processing.

In the character image acquisition program 420, a multivalue processor 422 receives binary character images cut out by the character cutting part 40, performs multivalue processing on the character images thereby converts the images to multivalued character images, and outputs the multivalued character images to the similar character extractor 42.

Figure 17:
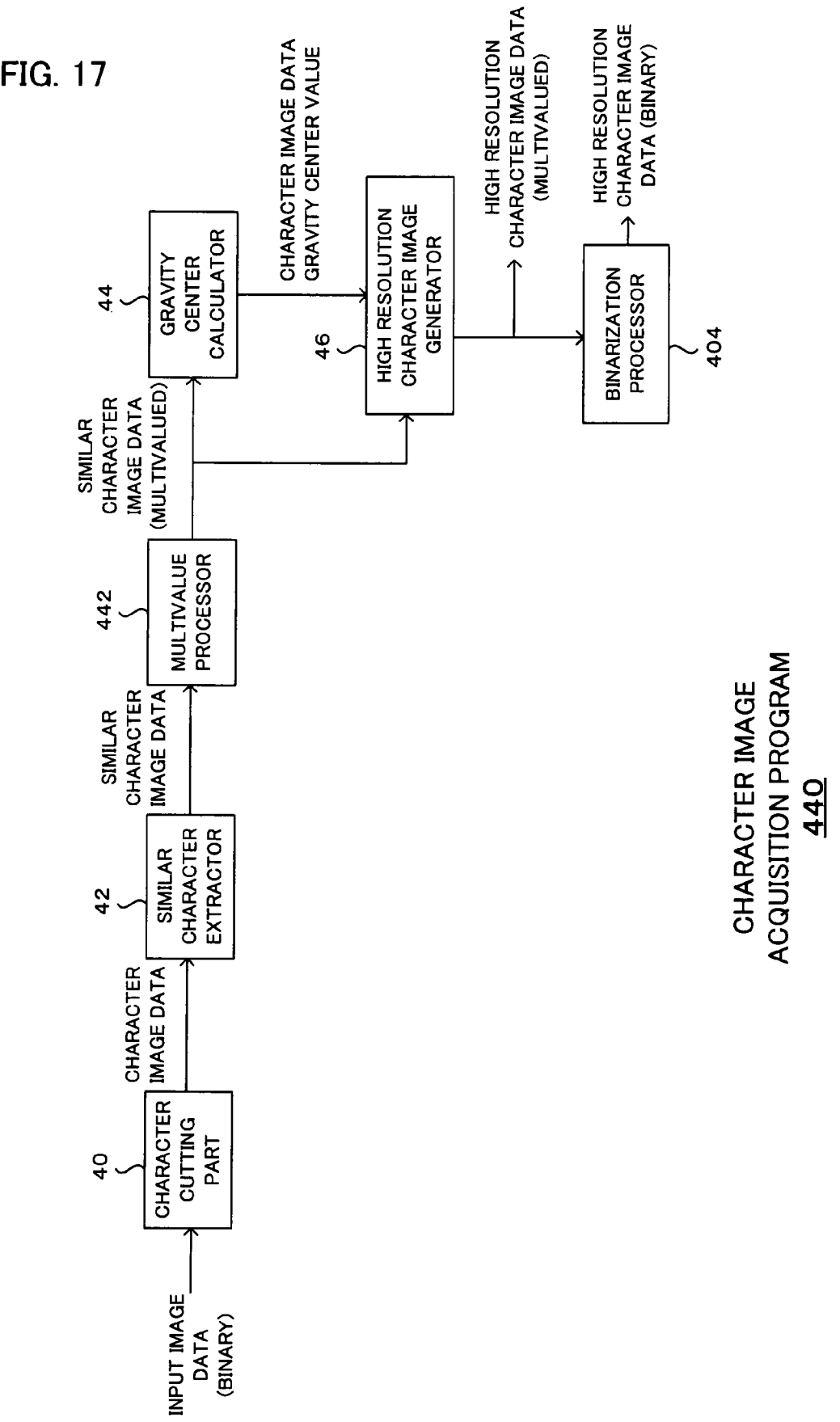
FIG. 17 is a block diagram showing the functional structure of a character image acquisition program 440 performed by the controller 20 of the image processing apparatus 2 according to a fifth exemplary embodiment of the present invention.

FIG. 17 is a block diagram showing the functional structure of a character image acquisition program 440 performed by the controller 20 of the image processing apparatus 2 according to the fifth exemplary embodiment of the present invention. Note that among the respective constituent elements shown in FIG. 17, the elements substantially corresponding to those shown in FIG. 13 have the same reference numerals.

As shown in FIG. 17, the character image acquisition program 440 is different from the character image acquisition program 400 shown in FIG. 13 in that the multivalue processing is performed after the similar character extraction processing.

In the character image acquisition program 440, the multivalue processor 442 receives mutually similar binary character images extracted by the similar character extractor 42, performs multivalue processing on the character images thereby converts the images to multivalued character images, and outputs the similar multivalued character images to the gravity center calculator 44 and the high resolution character image generator 46.

Figure 18:
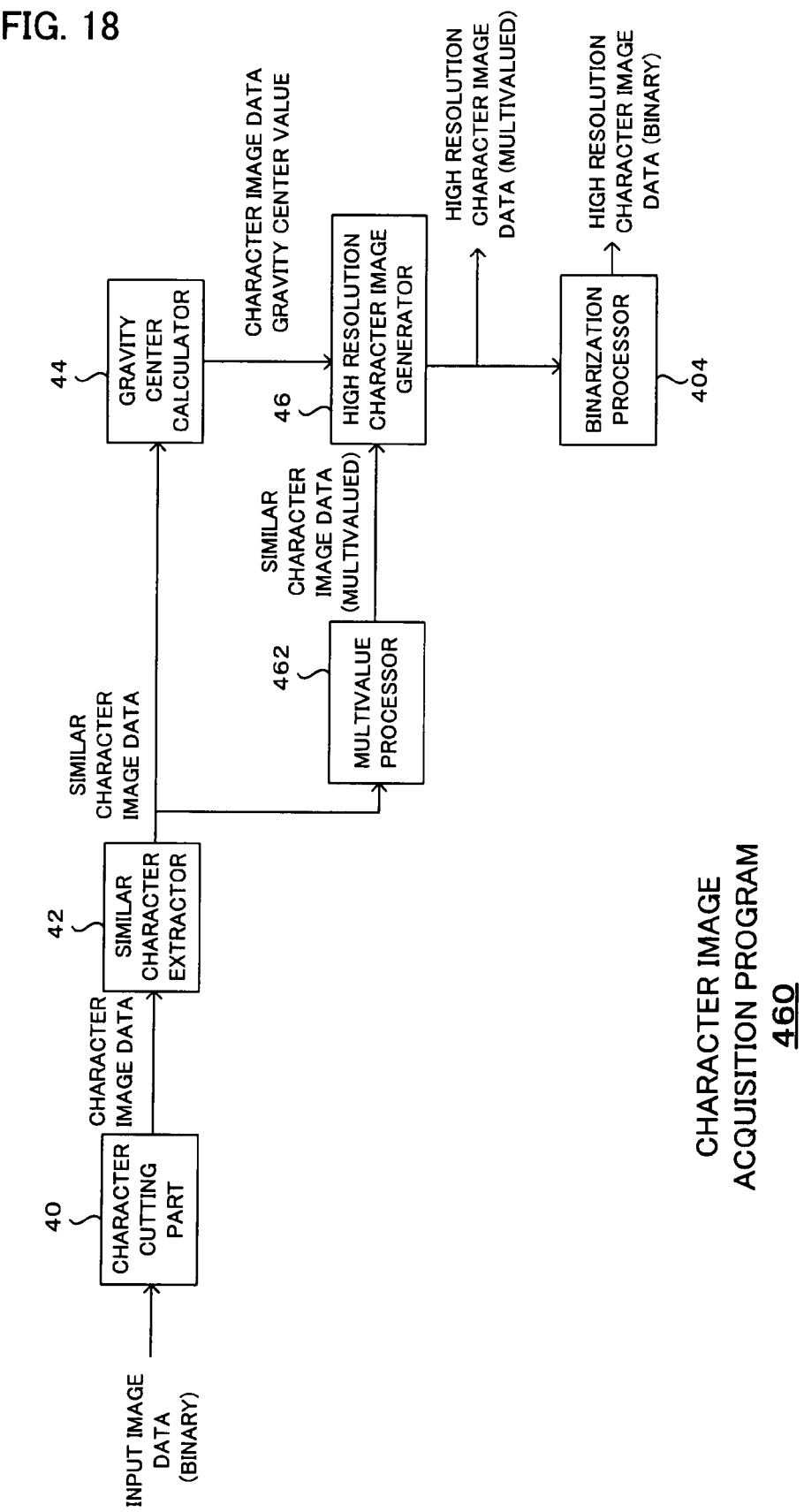
FIG. 18 is a block diagram showing the functional structure of a character image acquisition program 460 performed by the controller 20 of the image processing apparatus 2 according to a sixth exemplary embodiment of the present invention.

FIG. 18 is a block diagram showing the functional structure of a character image acquisition program 460 performed by the controller 20 of the image processing apparatus 2 according to the sixth exemplary embodiment of the present invention. Note that among the respective constituent elements shown in FIG. 18, the elements substantially corresponding to those shown in FIG. 17 have the same reference numerals.

As shown in FIG. 18, the character image acquisition program 460 is different from the character image acquisition program 440 shown in FIG. 17 in that the similar character extractor 42 outputs similar character images to the gravity center calculator 44 and a multivalue processor 462, and the multivalue processing is performed before the high resolution character image generation.

In the character image acquisition program 460, the multivalue processor 462 receives mutually similar binary character images extracted by the similar character extractor 42, performs multivalue processing on the character images thereby converts the images to multivalued character images, and outputs the similar multivalued character images to the high resolution character image generator 46.

FIGS. 19A to 19E are explanatory views showing high resolution character image data generation processing upon application of the second multivalue processing method shown in FIG. 14C. Note that the numerals in FIGS. 19A to 19E are substantially the same as those shown in FIGS. 7A to 7E. The second multivalue processing is performed with, e.g., the structure of the character image acquisition program 460 (FIG. 18).

Figure 19A:
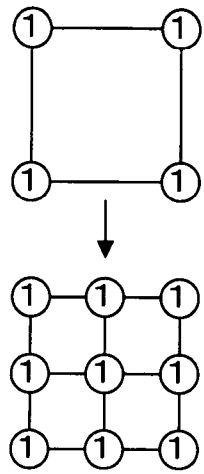
FIGS. 19A to 19E are explanatory views showing the high resolution character image data generation processing by the high resolution character image generator 46 upon application of a second multivalue processing method.
Figure 19B:
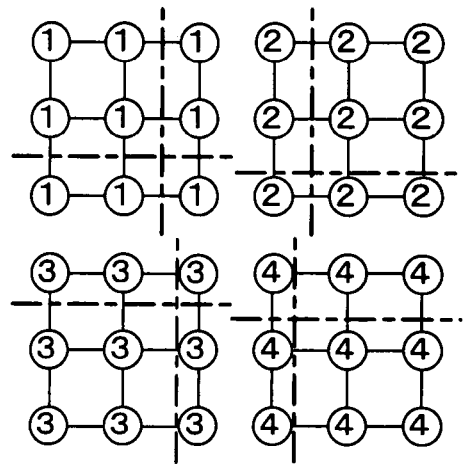

As shown in FIG. 19A, the multivalue processor 462 performs enlargement processing on plural character image data pieces for each phase. More particularly, the multivalue processor 462 has an enlarging unit to enlarge respective extracted character images into images in the second resolution higher than the first resolution. FIG. 19B shows input image sampling lattices and the centers of gravity of the respective plural (4 in this example) images after the enlargement processing. In FIG. 19B, the respective rectangles indicate input image sampling lattices, and points where broken lines intersect are the gravity center positions of the respective character images.

Figure 19C:
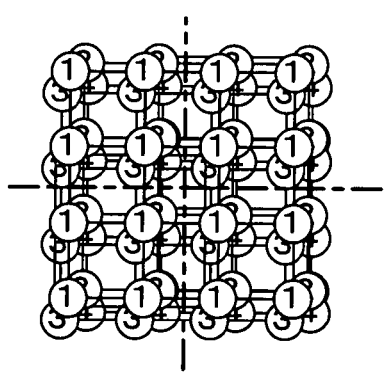
Figure 19D:
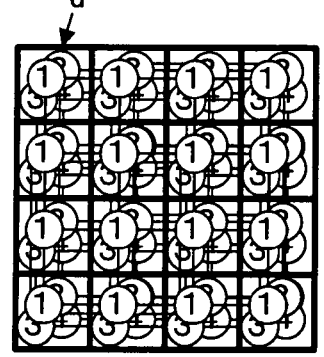
Figure 19E:
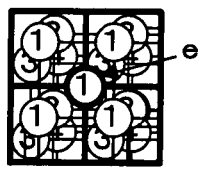
Figure 19E:
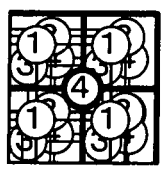
Figure 19E:
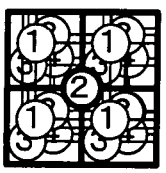
Figure 19E:
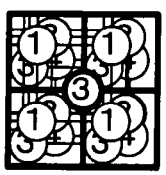

As shown in FIG. 19C, the high resolution character image generator 46 moves the phases of the respective sampling lattices based on the gravity center positions of the respective character images. Further, as shown in FIG. 19D, the high resolution character image generator 46 sets a sampling lattice in the second resolution higher than the first resolution (indicated with an arrow d in FIG. 19D). Then as shown in FIG. 19E, the high resolution character image generator 46 interpolates pixel values of the character image in the second resolution based on the values of multivalued character image data in the peripheral positions of the sampling lattice in the second resolution. As the interpolation method, nearest neighbor interpolation, linear interpolation or the like is applied.

Figure 20:
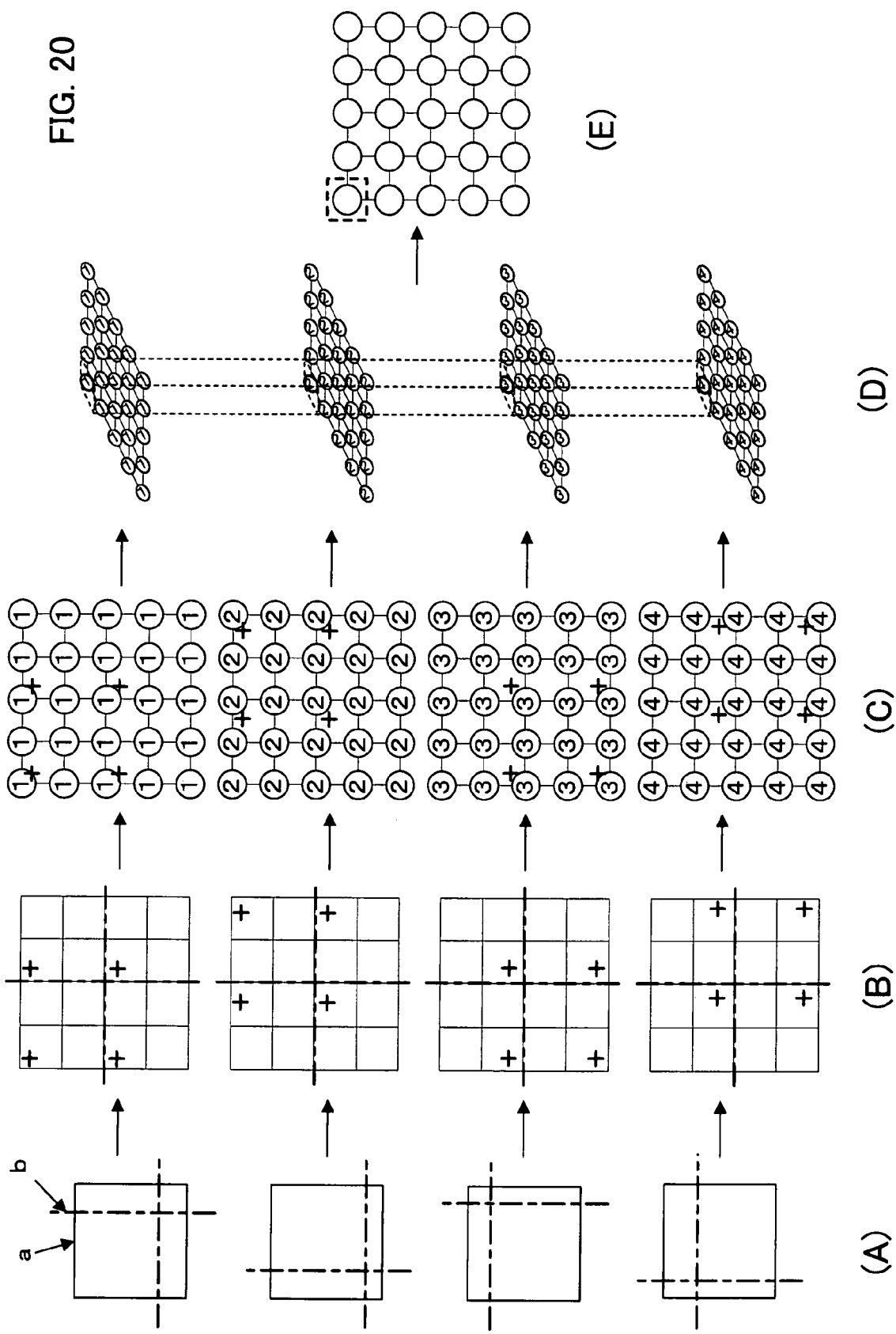
FIG. 20 is an explanatory view showing another example of the high resolution character image data generation processing by the high resolution character image generator 46.

FIG. 20 is an explanatory view showing another example of the high resolution character image data generation processing by the high resolution character image generator 46.

As shown in FIG. 20, the image processing apparatus 2 applies a predetermined interpolation method to enlarge a character image in the first resolution into a character image in the second resolution higher than the first resolution such that the phases of the enlarged character image correspond with each other. Hereinbelow, the method of the present example will be described.

FIG. 20(A) shows input image sampling lattices in the first resolution and the gravity center positions of the character images. In FIG. 20(A), rectangles indicated with an arrow a are input image sampling lattices, and points where broken lines indicated with an arrow b intersect are the gravity center positions of the character images. FIG. 20(B) shows sampling lattices in the second resolution higher than the first resolution and the gravity center positions of the respective character images. As shown in FIGS. 20(A) and 20(B), the multivalue processor 462 performs enlargement processing on the sampling lattices in the second resolution based on the centers of gravity of the respective character images in the first resolution. The high resolution character image generator 46 performs enlargement processing by interpolation such that the phases of the respective character images correspond with each other. Accordingly, the multivalue processor 462 has an enlarging unit to enlarge the respective character images into images in the second resolution higher than the first resolution based on the respective extracted character images and the phases of the respective character images calculated with precision higher than one pixel in the first resolution.

FIG. 20(C) shows pixel values of the respective enlarged character images. FIG. 20(D) shows a method of calculating pixel values of the character image in the second resolution based on the respective enlarged character images. As shown in FIGS. 20(C) and 20(D), the high resolution character image generator 46 calculates a mean value of pixel values in the same position in the respective enlarged character images as a pixel value of the position. The calculated value is, e.g., a pixel value in a position shown in FIG. 20(E).

Note that it may be arranged such that the high resolution character image generator 46 enlarges the respective character images in the first resolution by character image, then moves the respective enlarged character images such that the phases of the respective character images correspond with each other, and perform averaging processing. Further, the interpolation of pixel values is not particularly limited.

Next, processing performed on a character, the number of which is less than a predetermined number, included in an input original, will be described.

Figure 21:
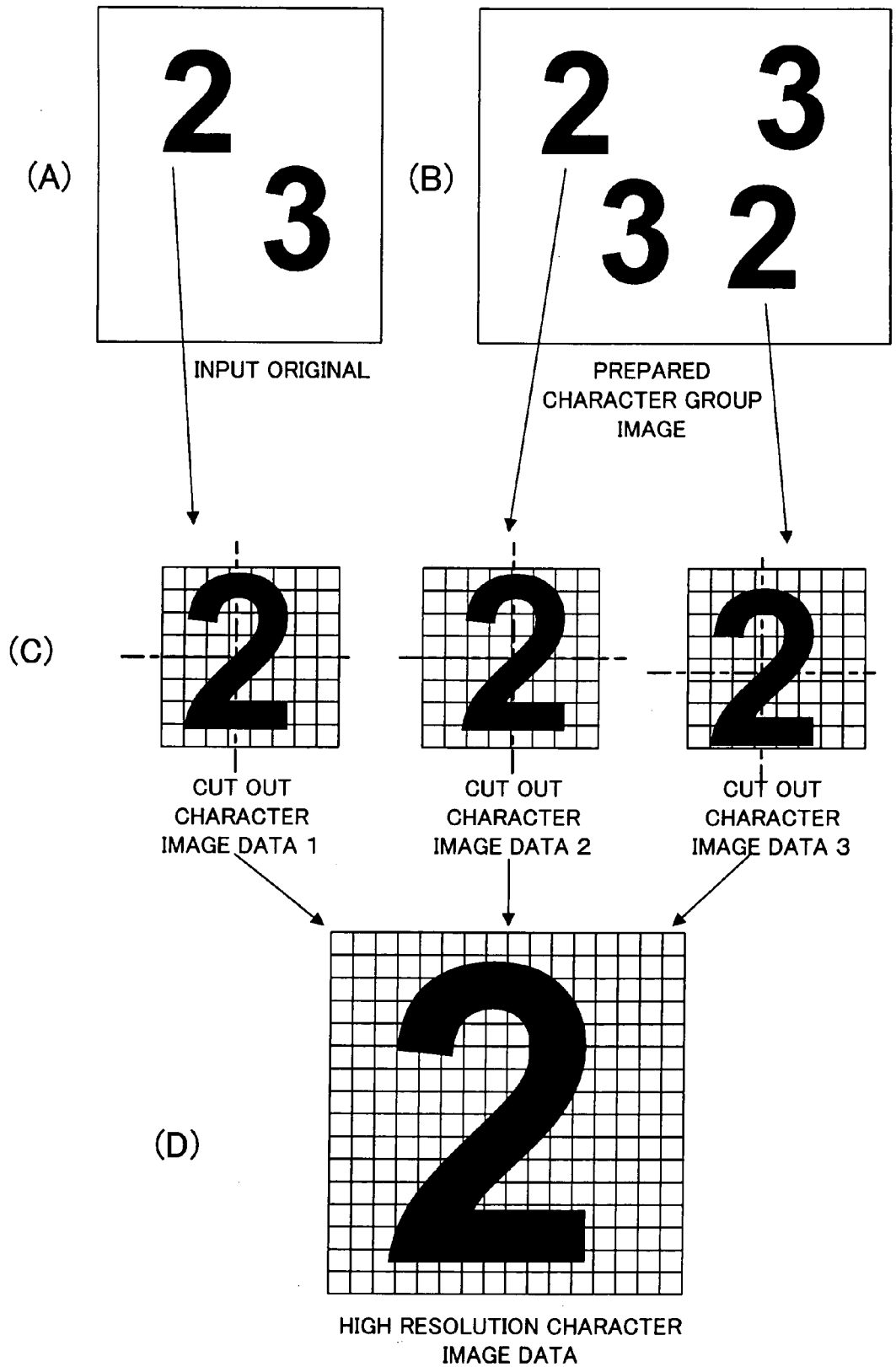
FIG. 21 is an explanatory view showing the outline of image processing performed on a character, the number of which is less than a predetermined number, included in an input original.

FIG. 21 is an explanatory view showing the outline of image processing performed on a character, the number of which is less than a predetermined number, included in an input original.

As shown in FIG. 21(A), some character appears only once or less frequently than a predetermined number of times in one page original or plural pages of document. In such case, the image processing apparatus 2 extracts character images, similar to a character image extracted from an input original, from a prepared character group image as shown in FIG. 21(B) or a newly-generated character group image. Then as shown in FIGS. 21(C) and 21(D), the image processing apparatus 2 calculates the phases of the respective extracted characters, and generates a high resolution character image based on the calculated phases and the respective extracted character images.

The character group image includes plural character images. This character group image data is generated by a font drawing apparatus to be described later. The character group image is generated by determining a font pattern of a character included in the character group image based on the size, thickness and the like of a character extracted from an input original.

Note that the respective character images may be generated in different pixel phases. Further, it may be arranged such that upon extraction of similar character image from an input original or character group image, a character group image is further generated. In this case, in the generated character group image, the extracted character image is drawn in different pixel phases. Further, it may be arranged such that the image processing apparatus 2 extracts similar character images from another document image, which is an accessible document image different from a designated input image. For example, the image processing apparatus 2 extracts similar character images from a document image group stored in the same folder (or directory) of the input image, a document image group designated by the user, or the like.

Figure 22:
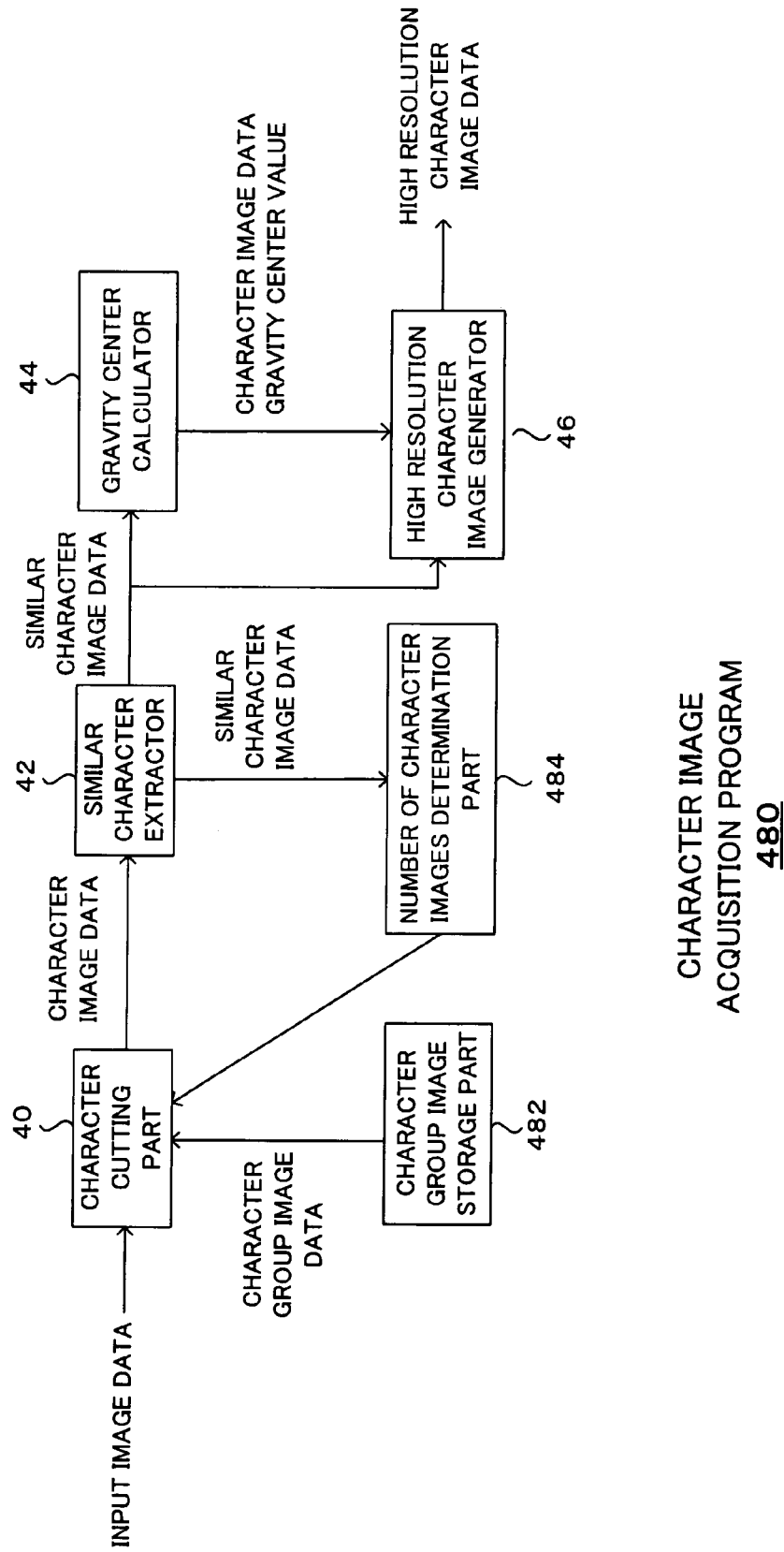
FIG. 22 is a block diagram showing the functional structure of a character image acquisition program 480 performed by the controller 20 of the image processing apparatus 2 according to a seventh exemplary embodiment of the present invention.

FIG. 22 is a block diagram showing the functional structure of a character image acquisition program 480 performed by the controller 20 of the image processing apparatus 2 according to a seventh exemplary embodiment of the present invention.

As shown in FIG. 22, the character image acquisition program 480 has a structure where a character group image storage part 482 and a number of character images determination part 484 are added to the character image acquisition program 4 shown in FIG. 5. Note that among the constituent elements shown in FIG. 22, the elements substantially corresponding to those shown in FIG. 5 have the same reference numerals.

In the character image acquisition program 480, the character group image storage part 482 holds a character group image including plural character images. The character group image includes, e.g., 8000 (4 types of fonts for 2000 types kanji (Chinese) characters designated for daily use) character images (font patterns). Note that the character group image may include further 8000 (40 types of fonts for 200 types of alphanumeric character codes) character images. The character group image storage part 482 is realized with at least one of the memory 204 or the storage device 24.

The number of character images determination part 484 determines whether or not the number of mutually similar character images extracted by the similar character extractor 42 is less than a predetermined number. For example, the number of character images determination part 484 determines whether or not the number of similar character images is 0 (less than 1 or not). When the number of similar character images is less than the predetermined number, the number of character images determination part 484 outputs an instruction to the character cutting part 40 to further cut out similar characters from the character group image stored in the character group image storage part 482.

Accordingly, the character cutting part 40 reads the character group image stored in the character group image storage part 482, cuts out character images included in the character group image, and outputs them to the similar character extractor 42. The similar character extractor 42 receives the character images cut out by the character cutting part 40 from the input image and the character group image, and extracts similar character images from these images.

Figure 23:
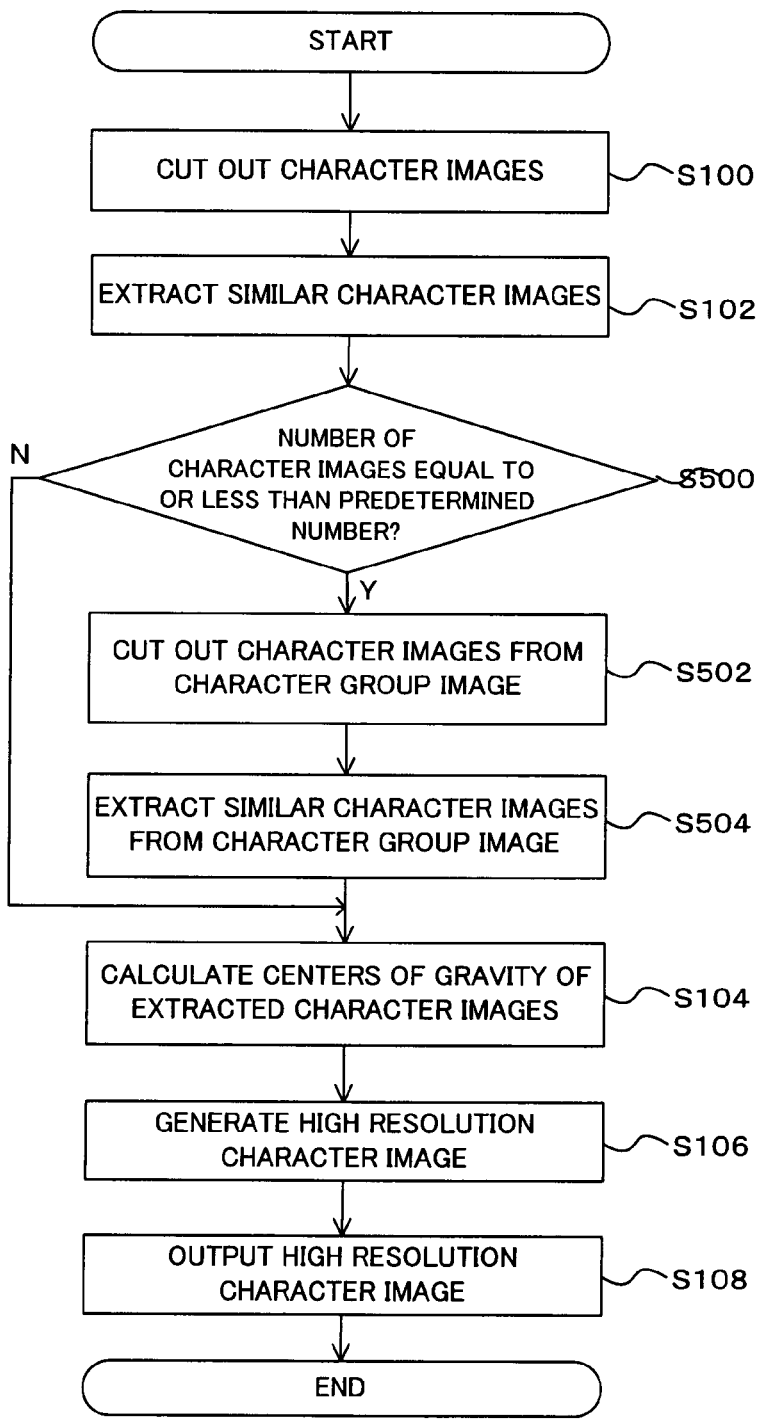
FIG. 23 is a flowchart showing high resolution character image acquisition processing using stored character group image (S50) based on the character image acquisition program 480.

FIG. 23 is a flowchart showing high resolution character image acquisition processing using stored character group image (S50) based on the character image acquisition program 480. Note that among the respective processing steps shown in FIG. 23, the processing steps substantially corresponding to those shown in FIG. 8 have the same reference numerals.

As shown in FIG. 23, at steps S100 and S102, the character image cutting processing and the similar character image extraction processing are performed, then at step S500, the number of character images determination part 484 determines whether or not the number of extracted similar character images is equal to or less than a predetermined number. When the number of extracted similar character images is equal to or less than a predetermined number, the character image acquisition program 480 proceeds to step S502, otherwise, performs the processings at steps S104 to S108, to generate a high resolution character image.

When the number of extracted similar character images is equal to or less than a predetermined number, at step S502, the number of character images determination part 484 outputs an instruction to the character cutting part 40 to further cut out similar characters from the stored character group image. The character cutting part 40 reads the character group image from the character group image storage part 482, then cuts out character images from the character group image and outputs them to the similar character extractor 42.

At step S504, the similar character extractor 42 extracts similar character images from the character images cut out by the character cutting part 40 from the character group image. The similar character extractor 42 outputs the character images, which are included in the input image and the character group image and which are similar character images, to the gravity center calculator 44 and the high resolution character image generator 46. Thereafter, the processings at steps S104 to S108 are performed and a high resolution character image is generated.

Figure 24:
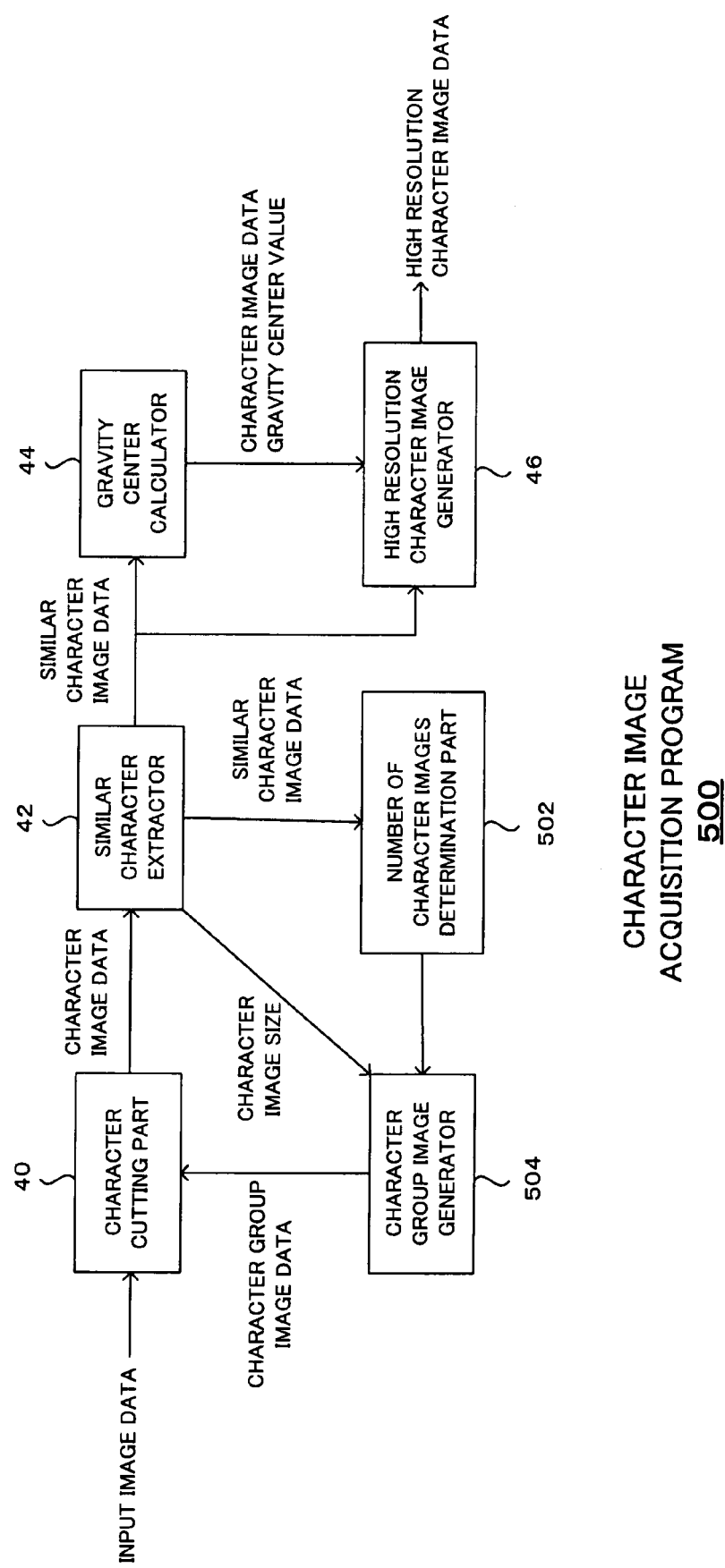
FIG. 24 is a block diagram showing the functional structure of a character image acquisition program 500 performed by the controller 20 of the image processing apparatus 2 according to an eighth exemplary embodiment of the present invention.

FIG. 24 is a block diagram showing the functional structure of a character image acquisition program 500 performed by the controller 20 of the image processing apparatus 2 according to an eighth exemplary embodiment of the present invention.

As shown in FIG. 24, the character image acquisition program 500 has a structure where a number of character images determination part 502 and a character group image generator 504 are added to the character image acquisition program 4 shown in FIG. 5. Note that among the respective constituent elements shown in FIG. 24, the elements substantially corresponding to those shown in FIG. 5 have the same reference numerals.

In the character image acquisition program 500, the number of character images determination part 502 determines whether or not the number of mutually similar character images extracted by the similar character extractor 42 is less than a predetermined number. When the number of similar character images is less than the predetermined number, the number of character images determination part 502 outputs an instruction to the character group image generator 504 to generate a character group image.

When the character group image generator 504 receives the instruction to generate a character group image from the number of character images determination part 502, the character group image generator 504 receives the size of character images extracted by the similar character extractor 42, then generates a character group image based on the size, and outputs the image to the character cutting part 40. In this manner, the character group image generator 504 has a character group image acquisition unit to obtain a character group image including plural character images. Note that the character group image generation processing will be described in detail later.

Accordingly, the character cutting part 40 receives the character group image generated by the character group image generator 504, then cuts out character images included in the character group image, and outputs them to the similar character extractor 42. The similar character extractor 42 receives the character images cut out by the character cutting part 40 from the input image and the character group image, and extracts similar character images from these images.

Figure 25:
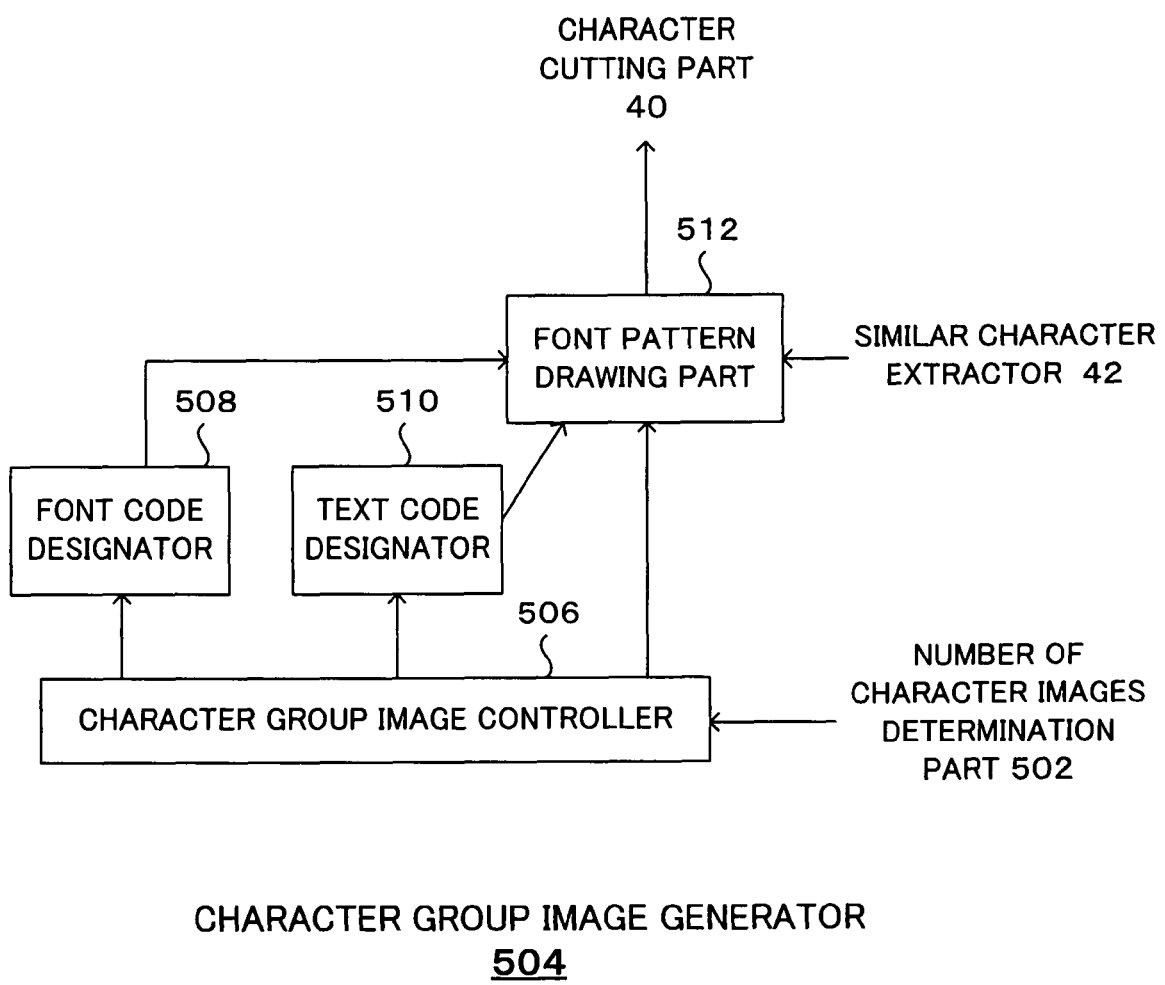
FIG. 25 is a block diagram showing the detailed functional structure of a character group image generator 504.

FIG. 25 is a block diagram showing the detailed functional structure of the character group image generator 504.

As shown in FIG. 25, the character group image generator 504 has a character group image controller 506, a font code designator 508, a text code designator 510 and a font pattern drawing part 512. In the character group image generator 504, the character group image controller 506 receives an instruction outputted from the number of character images determination part 502, and controls the other constituent elements.

The font code designator 508 outputs a font code indicating the font type of the character images included in the character group image to the font pattern drawing part 512. The font code may be previously determined or may be determined under the control of the character group image controller 506. The font code is, e.g., Mincho, Gothic or the like.

The text code designator 510 outputs a text code indicating the text type of the character images included in the character group image to the font pattern drawing part 512. The text code may be previously determined or may be determined under the control of the character group image controller 506. The text code is, e.g., numeric character, alphabet, hiragana (Japanese syllabary characters), katakana (Japanese phonetic alphabet), kanji designated for daily use, or the like.

The font pattern drawing part 512 receives the font code designated by the font code designator 508, the text code designated by the text code designator 510 and the character image size outputted from the similar character extractor 42, then generates a character group image by drawing the font patterns based on the received font code, the text code and the character image size under the control of the character group image controller 506, and outputs the character group image to the character cutting part 40.

Note that the character group image generator 504 may be included in a program which operates on hardware different from the image processing apparatus 2. In this case, the hardware functions as a font drawing apparatus having the function of the character group image generator 504. The image processing apparatus 2 may perform transmission and reception of character group image data with the font drawing apparatus via the network, thereby obtain the character group image data.

FIG. 26 is an example of a character group image generated by the character group image generator 504.

As shown in FIG. 26, the character group image includes numeric characters, lower-case and capital alphabetic letters, hiragana characters and kanji designated for daily use in Gothic and Mincho fonts.

Figure 27:
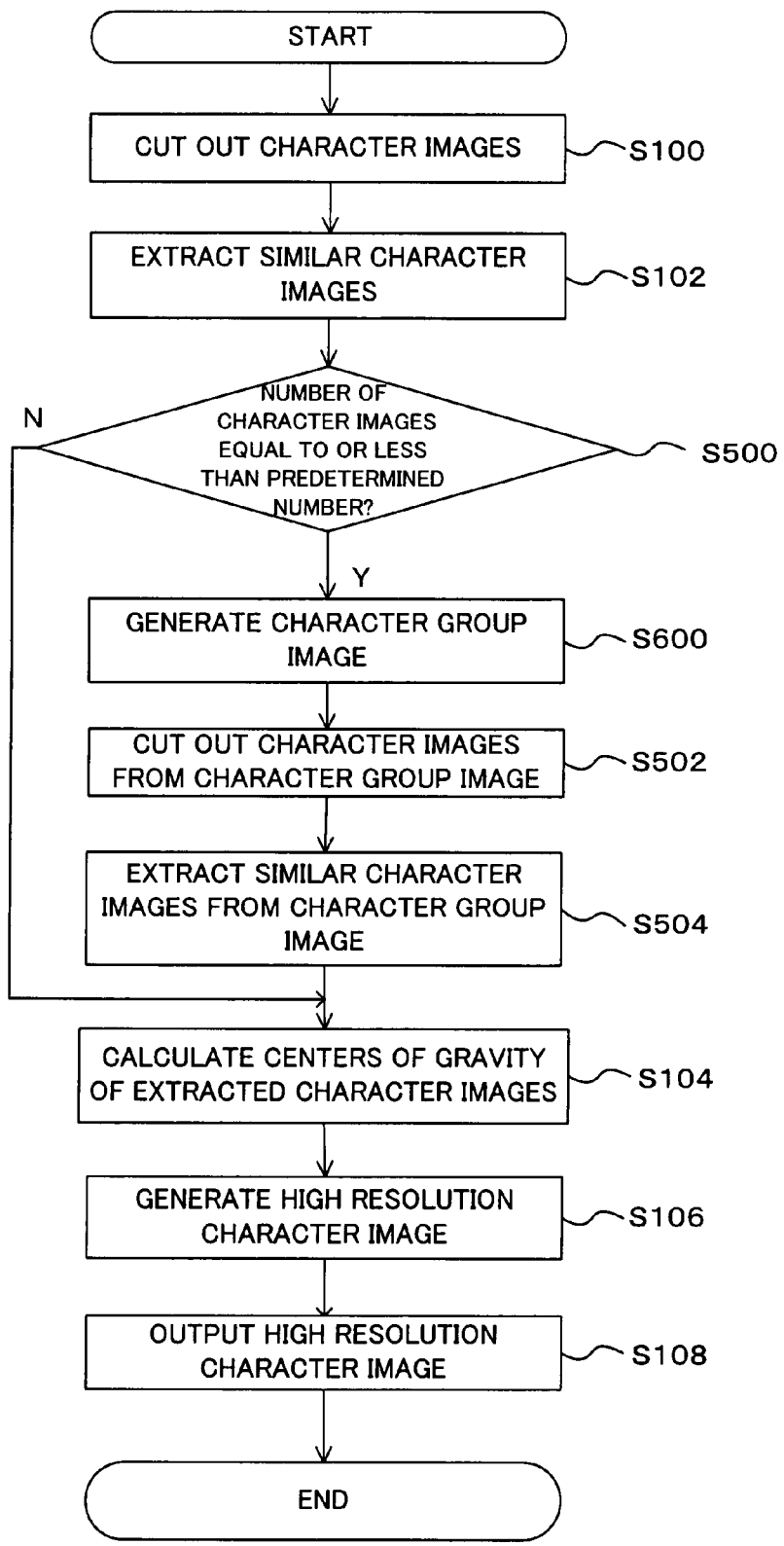
FIG. 27 is a flowchart showing high resolution character image acquisition processing using generated character group image (S60) based on the character image acquisition program 500.

FIG. 27 is a flowchart showing high resolution character image acquisition processing using generated character group image (S60) based on the character image acquisition program 500. Note that among the respective processing steps shown in FIG. 27, the processing steps substantially corresponding to those shown in FIGS. 8 and 23 have the same reference numerals.

As shown in FIG. 27, at steps S100 and S102, the character image cutting processing and the similar character image extraction processing are performed, then at step S500, it is determined whether or not the number of extracted similar character images is equal to or less than a predetermined number.

When the number of extracted similar character images is equal to or less than a predetermined number, then at step S600, the number of character images determination part 502 outputs an instruction to generate a character group image to the character group image generator 504. The character group image generator 504 generates a character group image based on the size of the character images extracted by the similar character extractor 42, and outputs the image to the character cutting part 40.

Further, at step S502, character images are cut out from the character group image, and at step S504, similar character images are extracted. Thereafter, the processings at steps S104 to S108 are performed, thereby a high resolution character image is generated.

Figure 28:
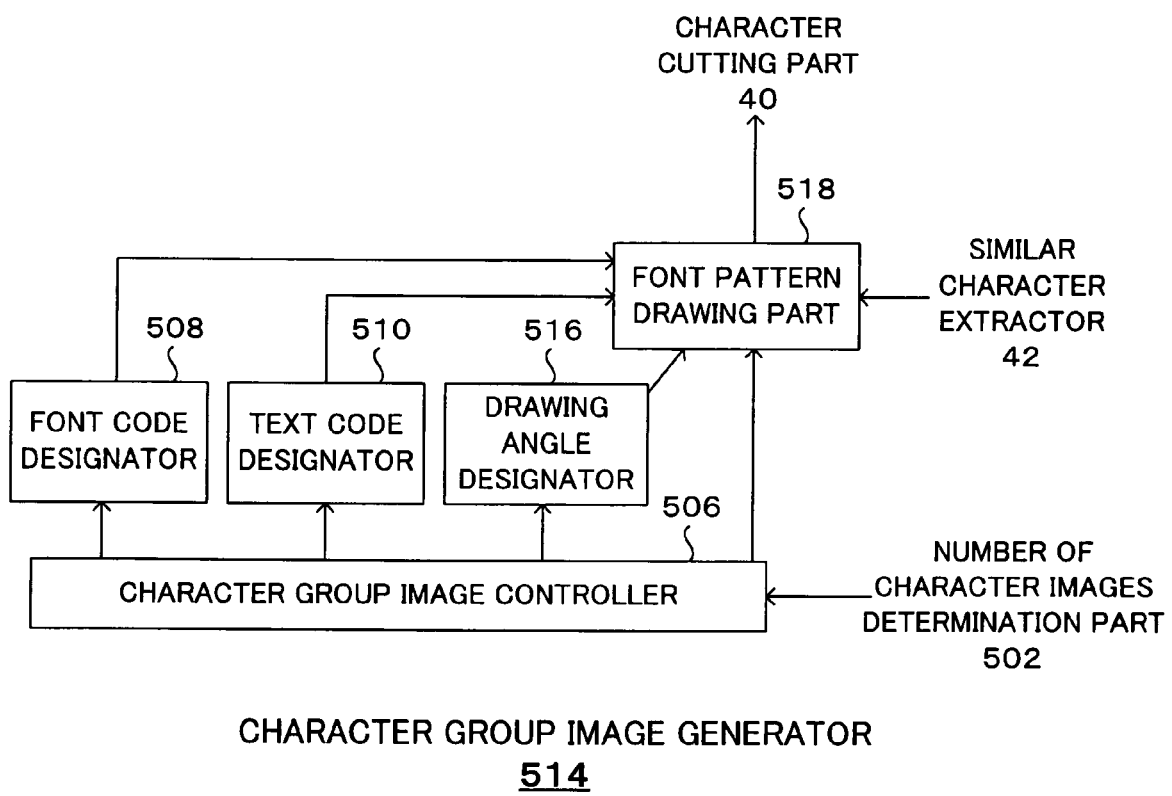
FIG. 28 is a block diagram showing the detailed functional structure of a character group image generator 514 as a first modification of the character group image generator 504.

FIG. 28 is a block diagram showing the detailed functional structure of a character group image generator 514 as a first modification of the character group image generator 504.

As shown in FIG. 28, the character group image generator 514 has the character group image controller 506, the font code designator 508, the text code designator 510, a drawing angle designator 516 and a font pattern drawing part 518. Note that among the constituent elements shown in FIG. 28, the elements substantially corresponding to those shown in FIG. 25 have the same reference numerals.

In the character group image generator 514, the drawing angle designator 516 outputs an angle to draw a font pattern to the font pattern drawing part 518. The drawing angle may be previously determined or may be determined under the control of the character group image controller 506. The drawing angle is, e.g., 0°, 90°, 180°, 270° and the like.

The font pattern drawing part 518 receives a font code designated by the font code designator 508, a text code designated by the text code designator 510, a drawing angle designated by the drawing angle designator 516 and a character image size outputted from the similar character extractor 42, then generates a character group image by drawing font patterns based on the font code, the text code, the drawing angle and the character image size, under the control of the character group image controller 506, and outputs the character group image to the character cutting part 40.

Figure 29:
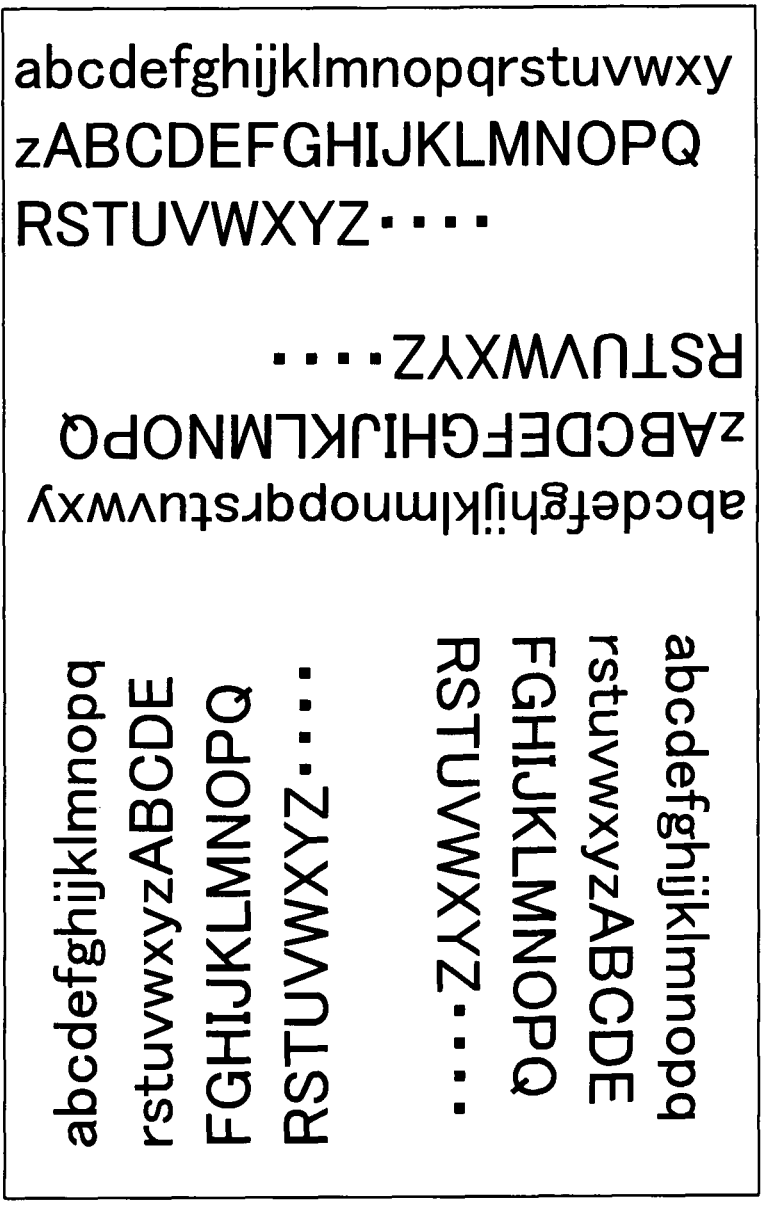
FIG. 29 is an example of a character group image generated by the character group image generator 514.

FIG. 29 is an example of a character group image generated by the character group image generator 514.

As shown in FIG. 29, the character group image includes lower-case and capital alphabetic letters in Gothic font drawn at 0°, 90°, 180° and 270° drawing angles.

Figure 30:
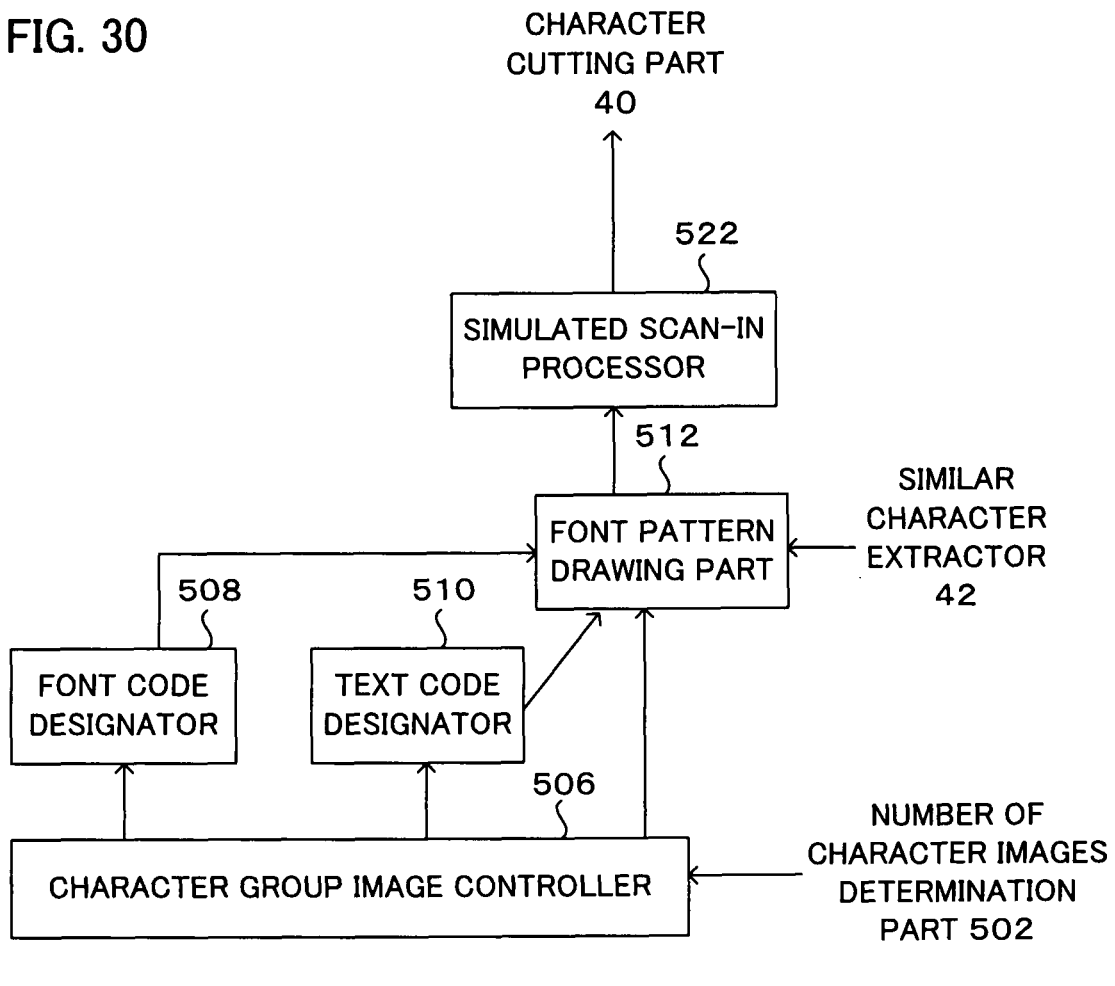
FIG. 30 is a block diagram showing the detailed functional structure of a character group image generator 520 as a second modification of the character group image generator 504.

FIG. 30 is a block diagram showing the detailed functional structure of a character group image generator 520 as a second modification of the character group image generator 504.

As shown in FIG. 30, the character group image generator 520 has a structure where a simulated scan-in processor 522 is added to the character group image generator 504. Note that among the constituent elements shown in FIG. 30, the elements substantially corresponding to those shown in FIG. 25 have the same reference numerals.

In the character group image generator 520, when input image data is obtained by reading with a reading device such as a scanner (scan-in data), the simulated scan-in processor 522 performs processing simulating a scan-in process (simulated scan-in processing) such as spatial filter or noise convolution on a character group image drawn by the font pattern drawing part 512. The simulated scan-in processor 522 outputs the character group image subjected to the simulated scan-in processing to the character cutting part 40. Note that the simulated scan-in processor 522 may be added to the character group image generator 514.

Figure 31:
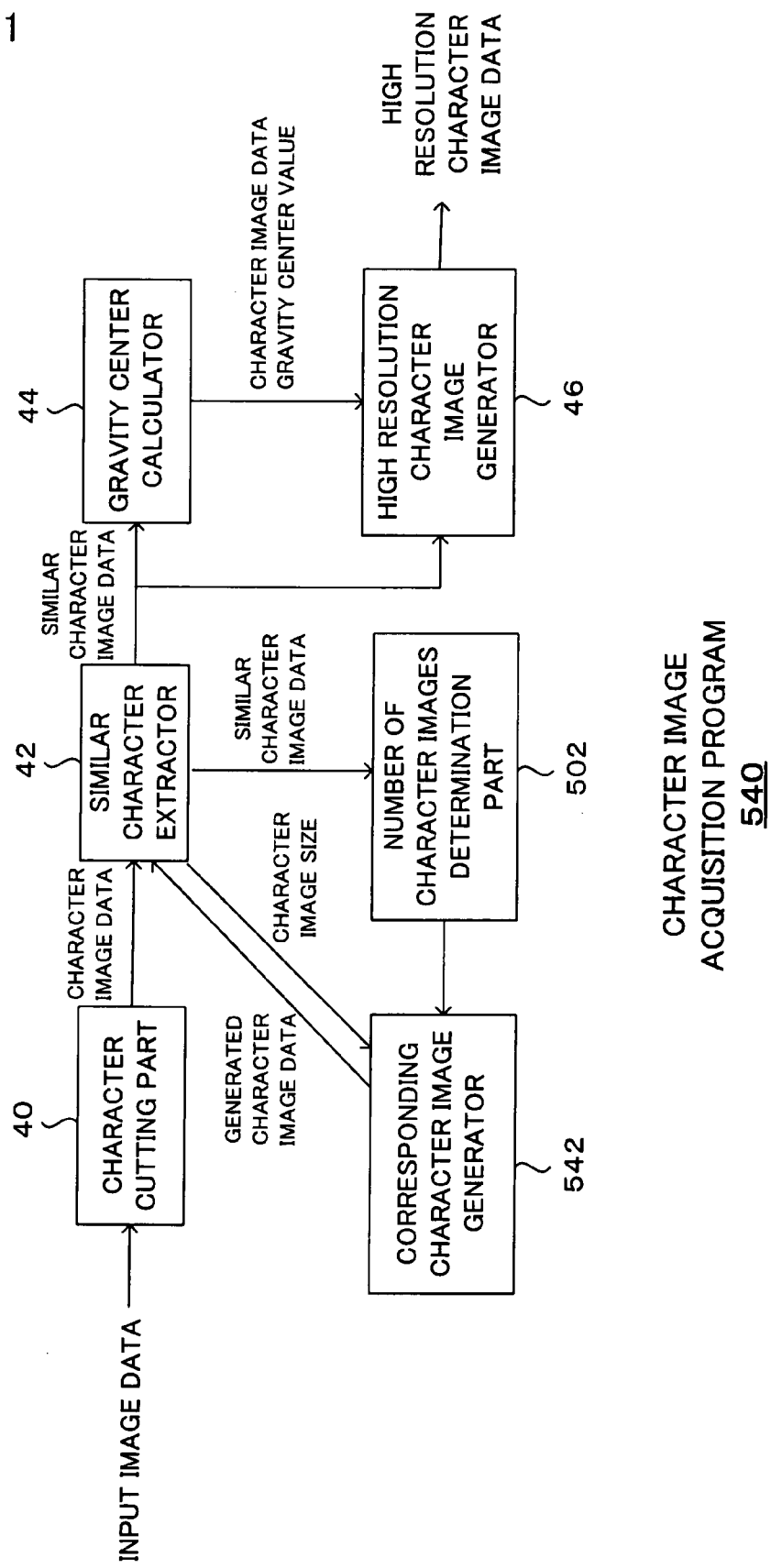
FIG. 31 is a block diagram showing the functional structure of a character image acquisition program 540 performed by the controller 20 of the image processing apparatus 2 according to a ninth exemplary embodiment of the present invention.

FIG. 31 is a block diagram showing the functional structure of a character image acquisition program 540 performed by the controller 20 of the image processing apparatus 2 according to a ninth exemplary embodiment of the present invention.

As shown in FIG. 31, the character image acquisition program 540 has a structure where the number of character images determination part 502 and a corresponding character image generator 542 are added to the character image acquisition program 4 shown in FIG. 5. Note that among the constituent elements shown in FIG. 31, the elements substantially corresponding to those shown in FIGS. 5 and 24 have the same reference numerals.

In the character image acquisition program 540, when the number of character images determination part 502 determines that the number of similar character images is less than a predetermined number, the corresponding character image generator 542 receives the size of character images extracted by the similar character extractor 42 from the similar character extractor 42, then generates character images corresponding to the character image size and outputs the images to the similar character extractor 42.

Figure 32:
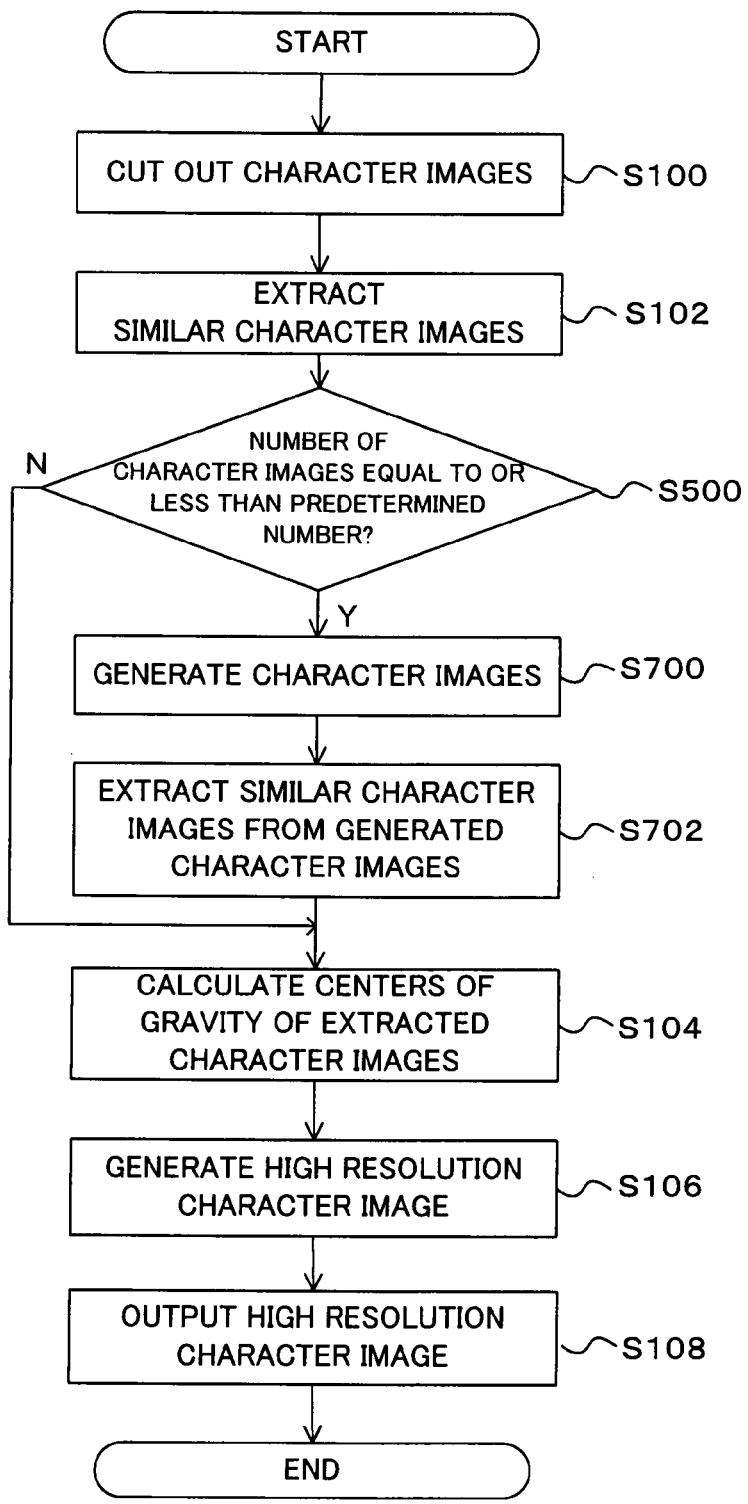
FIG. 32 is a flowchart showing high resolution character image acquisition processing using generated character image (S70) based on the character image acquisition program 540.

FIG. 32 is a flowchart showing high resolution character image acquisition processing using generated character image (S70) based on the character image acquisition program 540. Note that among the respective processing steps shown in FIG. 32, the processing steps substantially corresponding to those shown in FIGS. 8 and 23 have the same reference numerals.

As shown in FIG. 32, when the character image cutting processing and the similar character image extraction processing are performed at steps S100 and S102, then at step S500, it is determined whether or not the number of the extracted similar character images is equal to or less than a predetermined number.

When the number of the extracted similar character images is equal to or less than a predetermined number, then at step S700, the number of character images determination part 502 outputs an instruction to generate a character image to the corresponding character image generator 542. The corresponding character image generator 542 generates character images corresponding to the size of the character images extracted by the similar character extractor 42 and outputs the images to the similar character extractor 42.

At step S702, the similar character extractor 42 receives the character images generated by the corresponding character image generator 542, and further extracts similar character images from the received character images. Thereafter, the processings at steps S104 to S108 are performed, thereby a high resolution character image is generated.

Figure 33:
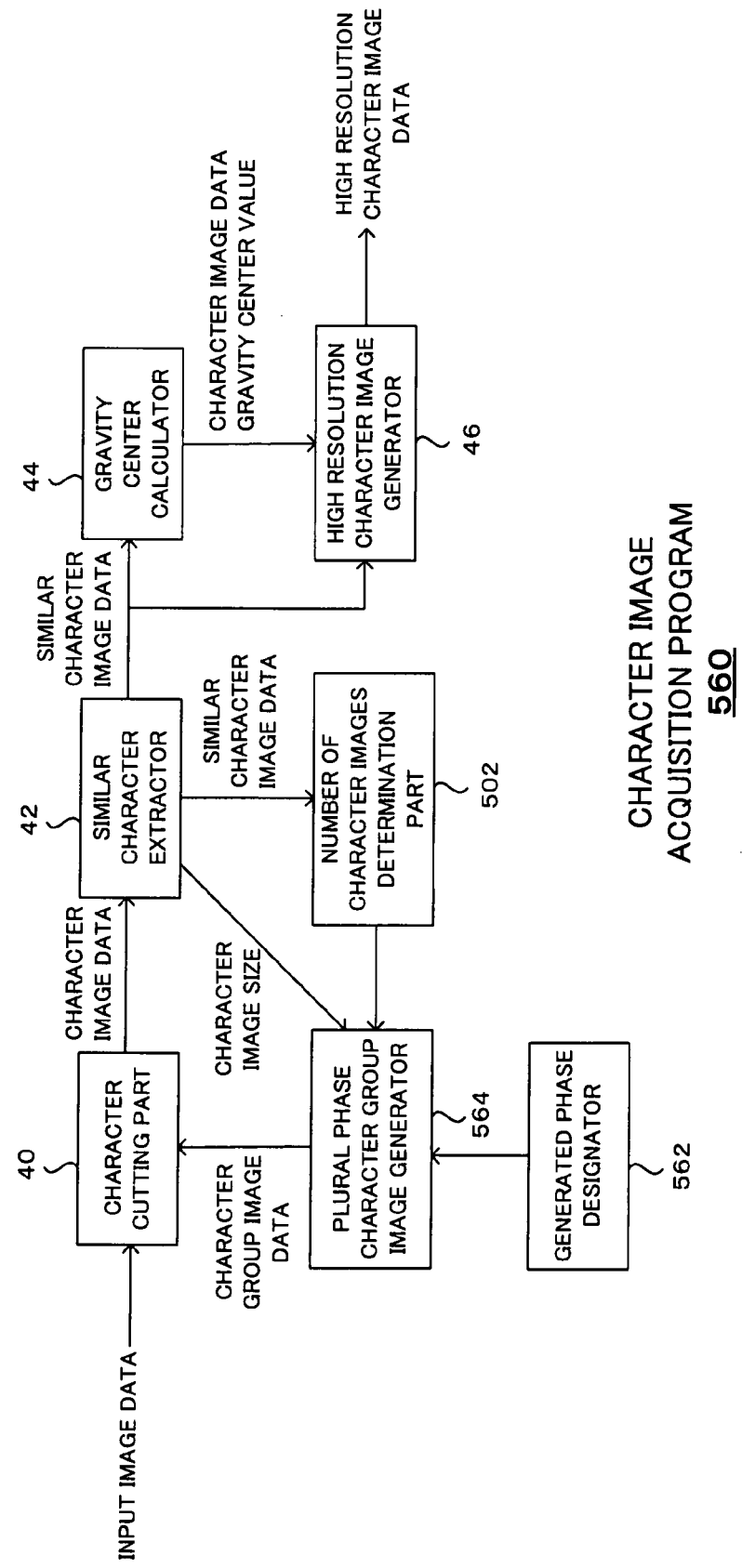
FIG. 33 is a block diagram showing the functional structure of a character image acquisition program 560 performed by the controller 20 of the image processing apparatus 2 according to a tenth exemplary embodiment of the present invention.

FIG. 33 is a block diagram showing the functional structure of a character image acquisition program 560 performed by the controller 20 of the image processing apparatus 2 according to a tenth exemplary embodiment of the present invention.

As shown in FIG. 33, the character image acquisition program 560 has a structure where the number of character images determination part 502, a generated phase designator 562 and a plural phase character group image generator 564 are added to the character image acquisition program 4 shown in FIG. 5. Note that among the constituent elements shown in FIG. 33, the elements substantially corresponding to those shown in FIGS. 5 and 24 have the same reference numerals.

In the character image acquisition program 560, the generated phase designator 562 outputs plural phases of a character group image to be generated to the plural phase character group image generator 564.

When the plural phase character group image generator 564 receives an instruction to generate a character group image from the number of character images determination part 502, the plural phase character group image generator 564 receives the size of character images extracted by the similar character extractor 42, from the similar character extractor 42, receives the plural phases from the generated phase designator 562, then generates plural character group images in different phases based on the size and the plural phases, and outputs them to the character cutting part 40. In this manner, the plural phase character group image generator 564 obtains plural character group images in different phases.

Accordingly, the character cutting part 40 receives the plural character group images in different phases generated by the plural phase character group image generator 564, then cuts out character images included in the character group images, and outputs them to the similar character extractor 42. The similar character extractor 42 receives the character images cut out by the character cutting part 40 from the input image and the character group images, and extracts similar character images from these images.

Figure 34:
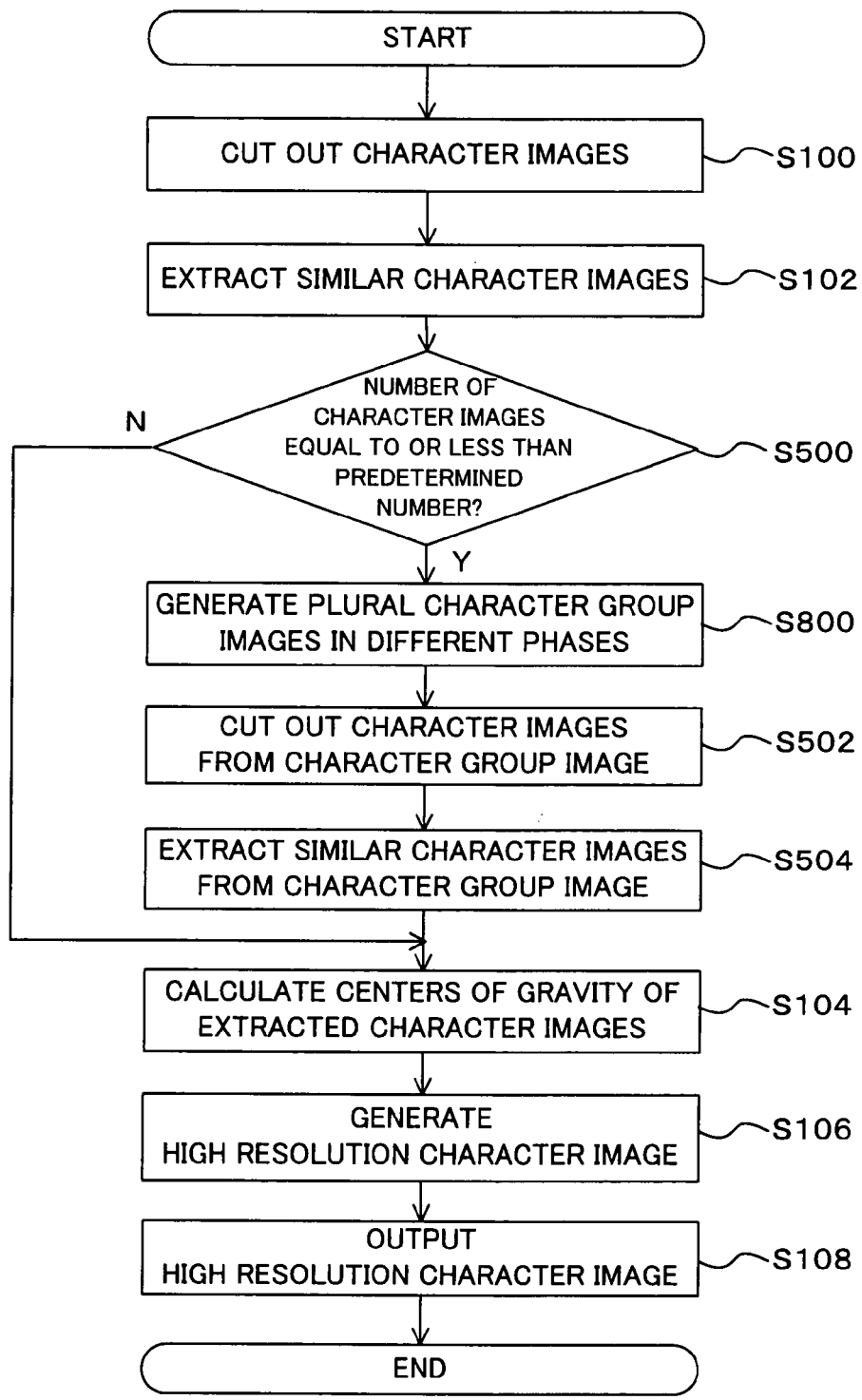
FIG. 34 is a flowchart showing high resolution character image acquisition processing using generated plural character group images (S80) based on the character image acquisition program 560.

FIG. 34 is a flowchart showing high resolution character image acquisition processing using generated plural character group images (S80) based on the character image acquisition program 560. Note that among the respective processing steps shown in FIG. 34, the processing steps substantially corresponding to those shown in FIGS. 8 and 23 have the same reference numerals.

As shown in FIG. 34, when the character image cutting processing and the similar character image extraction processing are performed at steps S100 and S102, then at step S500, it is determined whether or not the number of extracted similar character images is equal to or less than a predetermined number.

When the number of extracted similar character images is equal to or less than a predetermined number, at step S800, the generated phase designator 562 outputs plural phases to the plural phase character group image generator 564. The plural phase character group image generator 564 generates plural character group images in different phases based on the size of the character images extracted by the similar character extractor 42 and the plural phases designated by the generated phase designator 562, and outputs them to the character cutting part 40.

Further, at step S502, character images are cut out from the plural character group images in different phases, and similar character images are extracted at step S504. Thereafter, the processings at steps S104 to S108 are performed, thereby a high resolution character image is generated.

Figure 35:
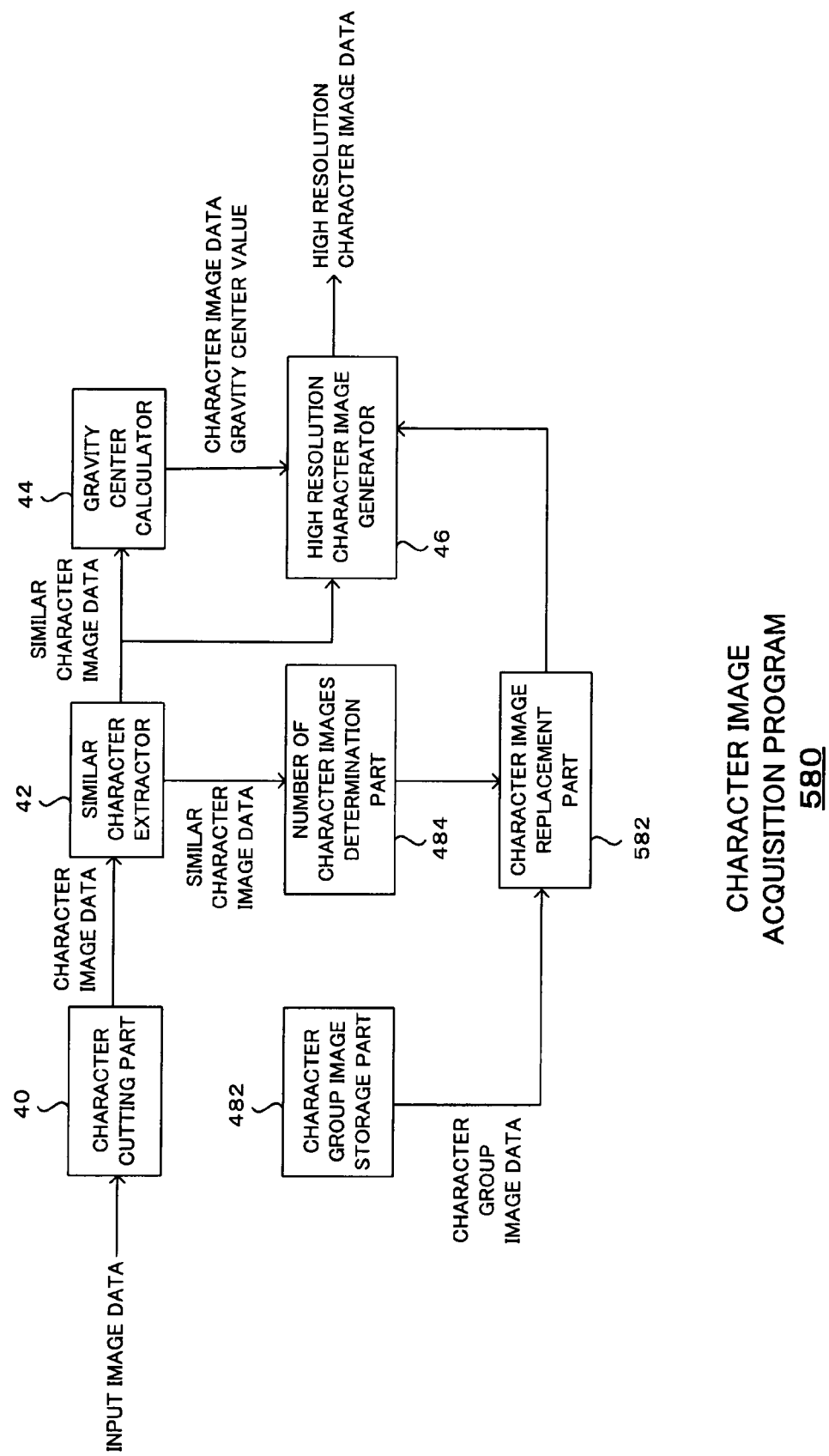
FIG. 35 is a block diagram showing the functional structure of a character image acquisition program 580 performed by the controller 20 of the image processing apparatus 2 according to an eleventh exemplary embodiment of the present invention.

FIG. 35 is a block diagram showing the functional structure of a character image acquisition program 580 performed by the controller 20 of the image processing apparatus 2 according to an eleventh exemplary embodiment of the present invention.

As shown in FIG. 35, the character image acquisition program 480 has a structure where a character image replacement part 582 is added to the character image acquisition program 480 shown in FIG. 22. Note that among the respective constituent elements shown in FIG. 35, the elements substantially corresponding to those shown in FIGS. 5 and 22 have the same reference numerals.

In the character image acquisition program 580, when the number of similar character images is less than a predetermined number, the character image replacement part 582 replaces the character images with character images, which are images extracted from a character group image stored in the character group image storage part 482 and which are similar to the character images. The character image replacement part 582 outputs the replaced character images to the high resolution character image generator 46.

Figure 36:
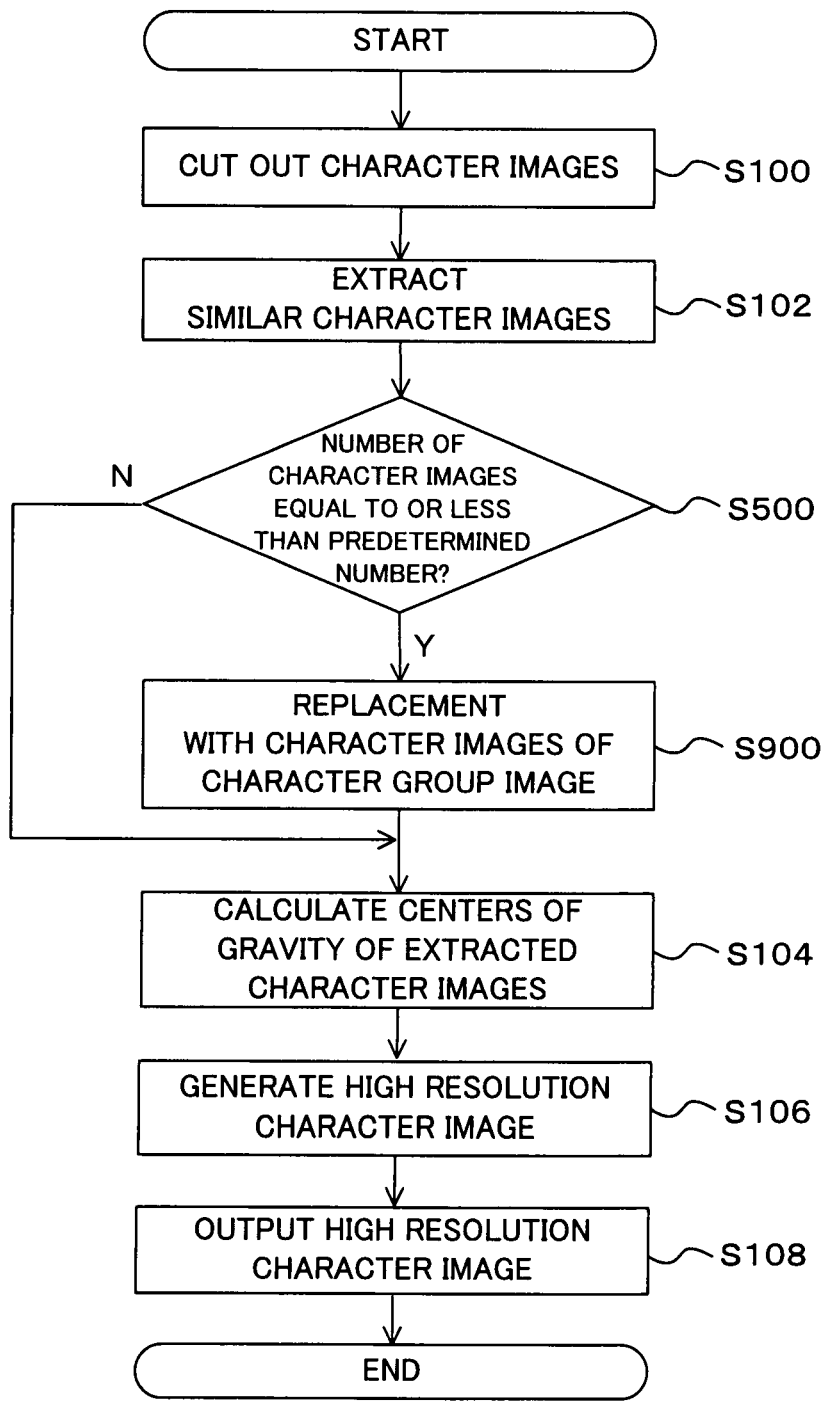
FIG. 36 is a flowchart showing high resolution character image acquisition processing with character image replacement processing (S90) based on the character image acquisition program 580.

FIG. 36 is a flowchart showing high resolution character image acquisition processing with character image replacement processing (S90) based on the character image acquisition program 580. Note that among the respective processing steps shown in FIG. 36, the processing steps substantially corresponding to those shown in FIGS. 8 and 23 have the same reference numerals.

As shown in FIG. 36, when the character image cutting processing and the similar character image extraction processing are performed at steps S100 and S102, then at step S500, it is determined whether or not the number of extracted similar character images is equal to or less than a predetermined number.

When the number of extracted similar character images is equal to or less than a predetermined number, then at step S900, the number of character images determination part 502 outputs an instruction to replace the character images to the character image replacement part 582. The character image replacement part 582 replaces the character images, the number of which is equal to or less than the predetermined number, with character images which are similar to the character images and which have been extracted from the character group image, and outputs them to the high resolution character image generator 46.

Thereafter, the processings at steps S104 to S108 are performed, thereby a high resolution character image is generated. Note that in this example, the character group image is previously generated and stored, but the character group image may be generated upon each generation of high resolution character image.

Next, processing performed on the same characters in different sizes will be described.

Figure 37:
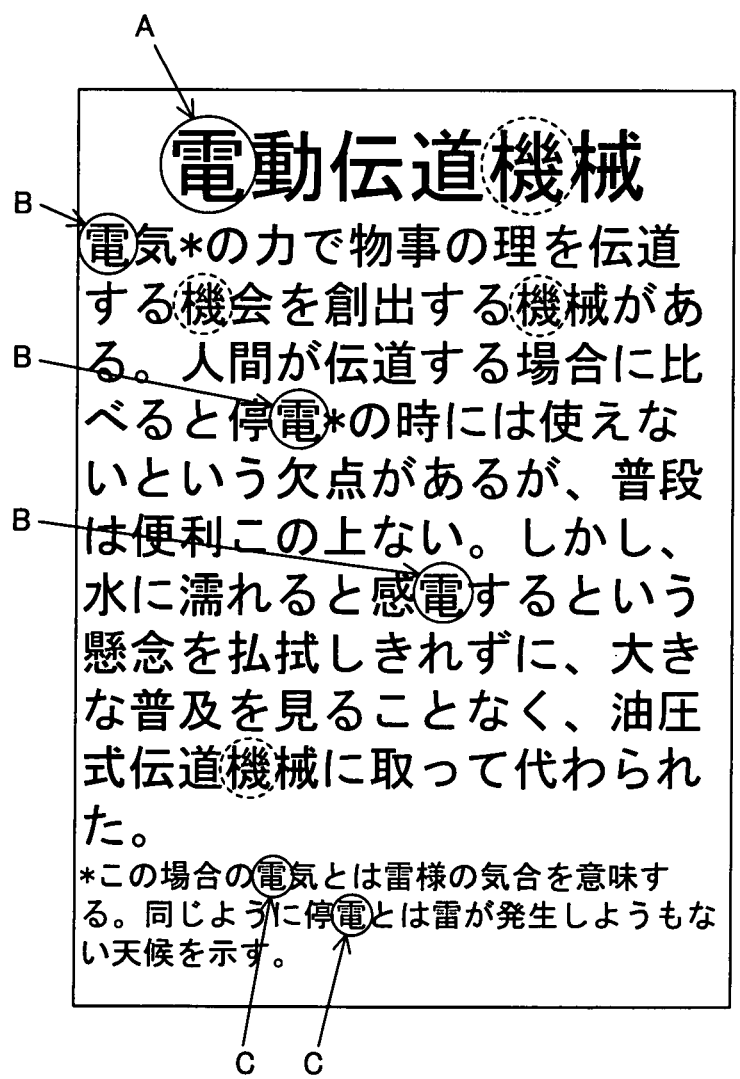
FIG. 37 is a sample of an original including the same characters in different sizes.

FIG. 37 is a sample of an original including same characters in different sizes.

As shown in FIG. 37, a character image "電" is included in the original in different sizes. For example, a character image indicated with an arrow B is smaller than a title character image indicated with an arrow A, and larger than a footnote character image indicated with an arrow C. Note that the characters "電" indicated with the arrows B and C are included in the original in plural positions, on the other hand, the character image "電" indicated with the arrow A is included in the original in only one position. Similarly, a character image "機" is used twice in the text, on the other hand, used once in the title in a size larger than that in the text.

In this manner, an original may include identical characters in different sizes. Note that the size of character is also referred to as a character point size.

Figure 38:
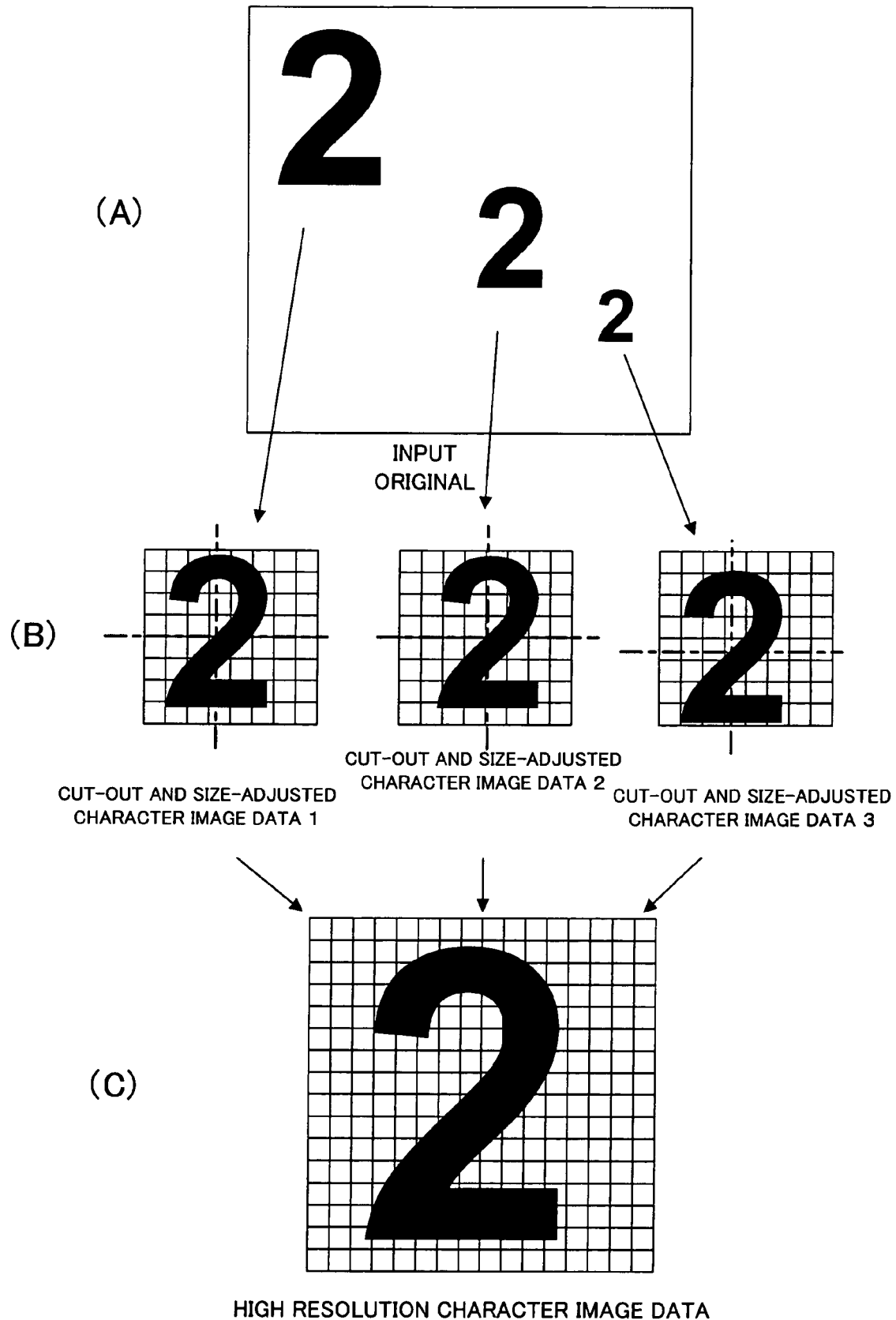
FIG. 38 is an explanatory view showing the outline of image processing performed on the same characters in different sizes.

FIG. 38 is an explanatory view showing the outline of image processing performed on the same characters in different sizes.

As shown in FIG. 38(A), an image of character, geometric figure or the like may appear in different sizes in one page original or plural pages of document. In such case, as shown in FIG. 38(B), the image processing apparatus 2 adjusts the sizes of character images cut out from an input original image, and as shown in FIG. 38(C), calculates phases of the respective size-adjusted characters, and generates a high resolution character image based on the calculated phases and the respective size-adjusted character images. The image processing apparatus 2 may adjust the sizes of the extracted characters to a predetermined size.

Figure 39:
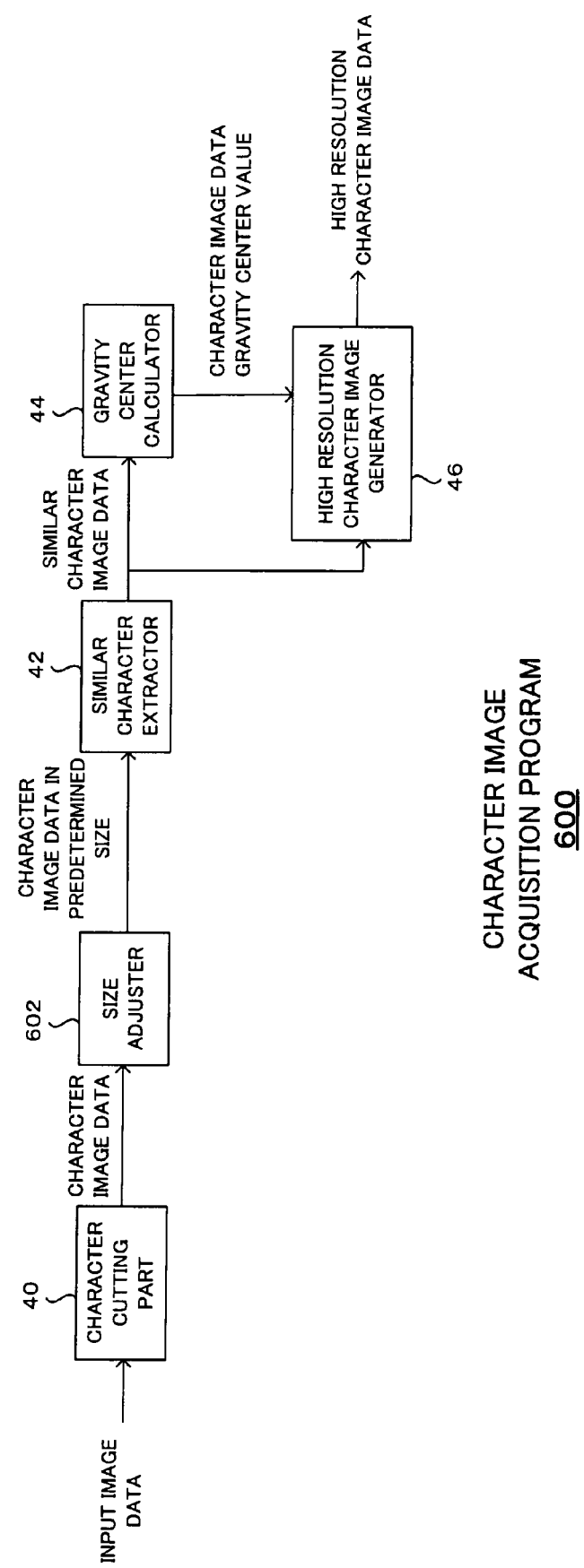
FIG. 39 is a block diagram showing the functional structure of a character image acquisition program 600 performed by the controller 20 of the image processing apparatus 2 according to a twelfth exemplary embodiment of the present invention.

FIG. 39 is a block diagram showing the functional structure of a character image acquisition program 600 performed by the controller 20 of the image processing apparatus 2 according to a twelfth exemplary embodiment of the present invention.

As shown in FIG. 39, the character acquisition program 600 has a structure where a size adjuster 602 is added to the character image acquisition program 4 shown in FIG. 5. Note that among the constituent elements shown in FIG. 39, the elements substantially corresponding to those shown in FIG. 5 have the same reference numerals.

In the character acquisition program 600, the size adjuster 602 receives character images cut out by the character cutting part 40, adjusts the sizes of the character images and outputs them to the similar character extractor 42. More particularly, the size adjuster 602 adjusts the sizes of the character images to a predetermined size.

For example, the size adjuster 602 selects one of plural cut out character images, and adjusts the sizes of the plural character images to the size of the selected character image.

Figure 40:
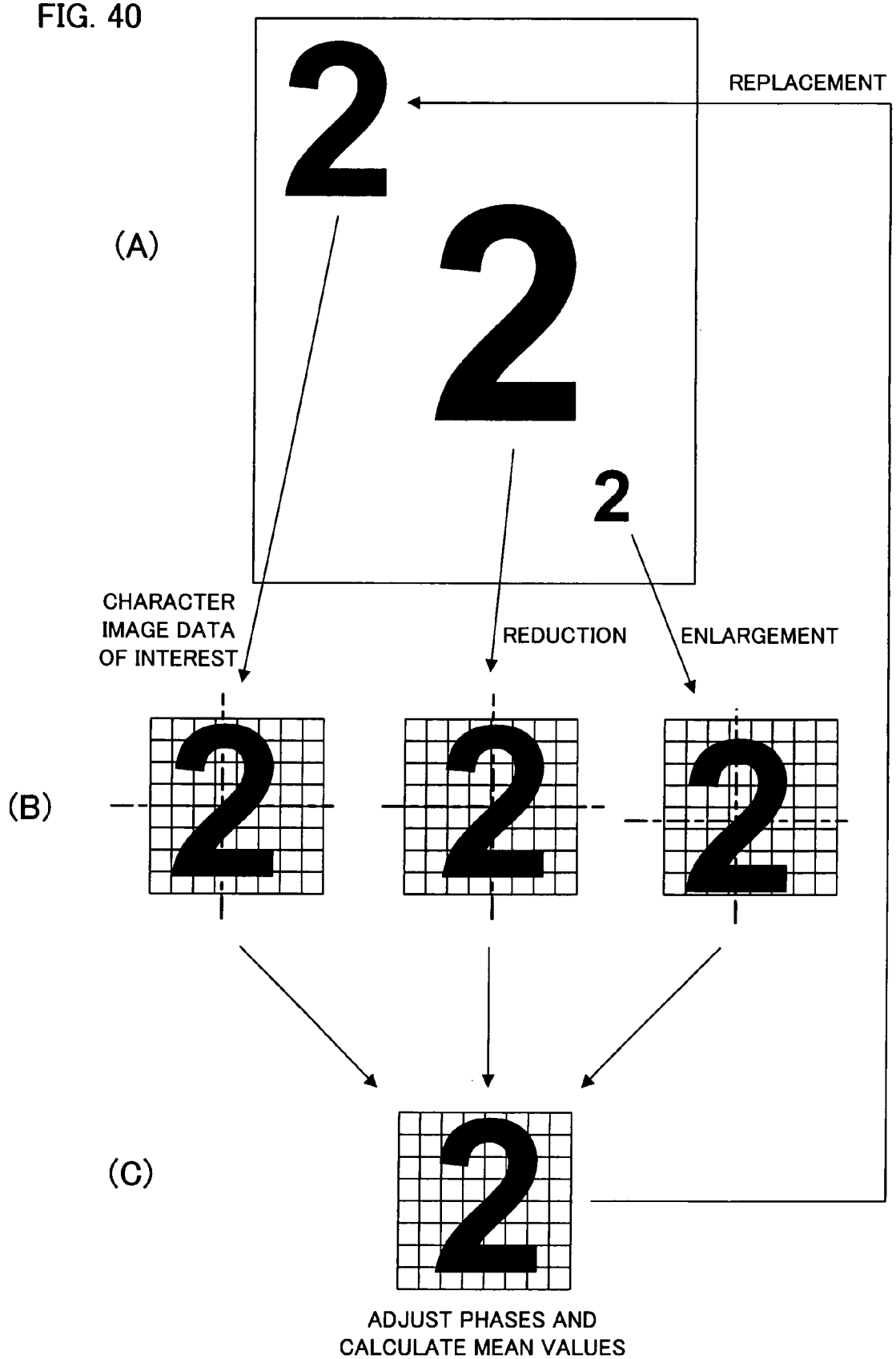
FIG. 40 is an explanatory view of the outline of image processing performed so as to adjust the size of cut out character image to the size of a selected character image.

FIG. 40 is an explanatory view of the outline of image processing performed so as to adjust the size of cut out character image to the size of a selected character image. FIG. 40(A) shows an input original image. FIG. 40(B) shows a size-adjusted character image. FIG. 40(C) shows a generated high resolution image.

As shown in FIGS. 40(A) and 40(B), the image processing apparatus 2 according to the present exemplary embodiment selects one of plural cut out character images, and reduces a character image larger than the selected character image to the size of the selected character image, while the apparatus enlarges a character image smaller than the selected character image to the size of the selected character image. As shown in FIG. 40(C), the image processing apparatus 2 generates a high resolution character image based on the plural character images adjusted to the size of the selected character image. For example, the image processing apparatus 2 calculates the phases of the respective character images, and overlaps the respective character images based on the calculated phases, and calculates mean values of the respective character images. In this case, the image processing apparatus 2 estimates the phases of sampled character images based on at least the centers of gravity of the character images or positions where cross-correlation functions are the greatest.

The image processing apparatus 2 may replace a selected character image with a generated character image. In this case, the character image acquisition program 600 (FIG. 39) includes equivalent functions to the position calculator 50 and the character arrangement part 52 of the image enlargement program 5 (FIG. 9).

Note that in the character image acquisition program 600, it may be arranged such that the size adjuster 602 selects one of plural cut out character images, calculates a size when the selected character image is enlarged to a predetermined magnification, and adjusts the sizes of the plural character images to the calculated size.

Figure 41:
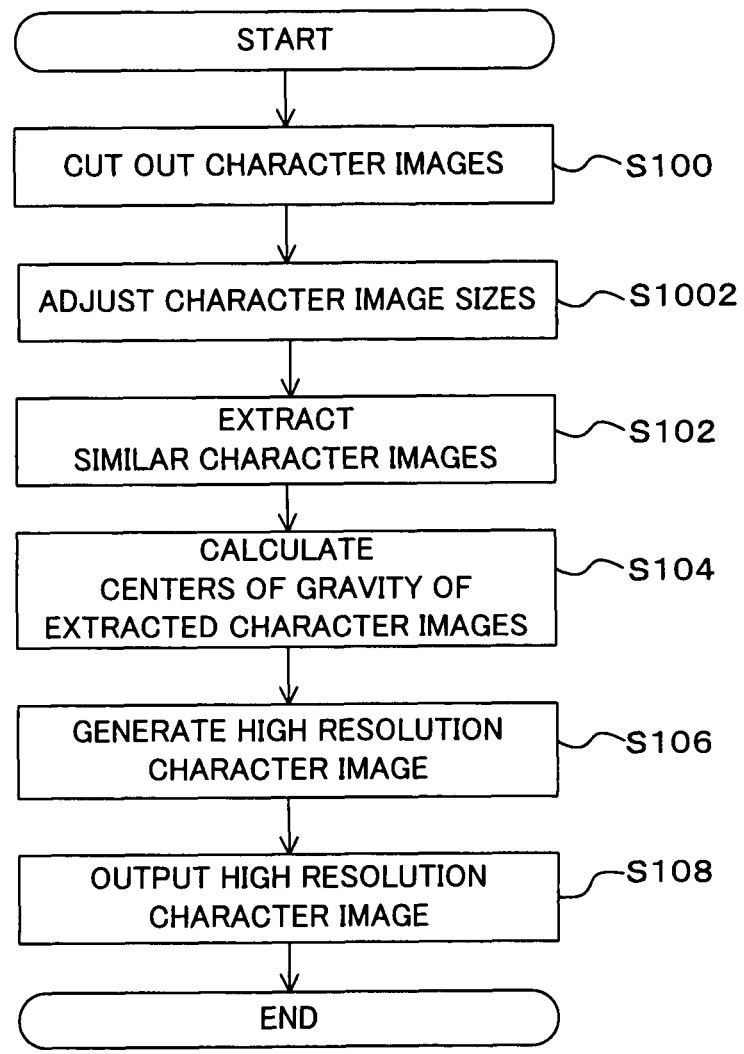
FIG. 41 is a flowchart showing high resolution character image acquisition processing with character size adjustment processing (S1000) based on the character image acquisition program 600.

FIG. 41 is a flowchart showing high resolution character image acquisition processing with character size adjustment processing (S1000) based on the character image acquisition program 600. Note that among the respective processing steps shown in FIG. 41, the processing steps substantially corresponding to those shown in FIG. 8 have the same reference numerals.

As shown in FIG. 41, when the character image cutting processing is performed at step S100, then at step S1002, the size adjuster 602 selects one of the cut out character images, and converts the character images in sizes different from that of the selected character image to the size of the selected character image. Thereafter, the processings at steps S102 to S108, and a high resolution character image is generated.

Figure 42:
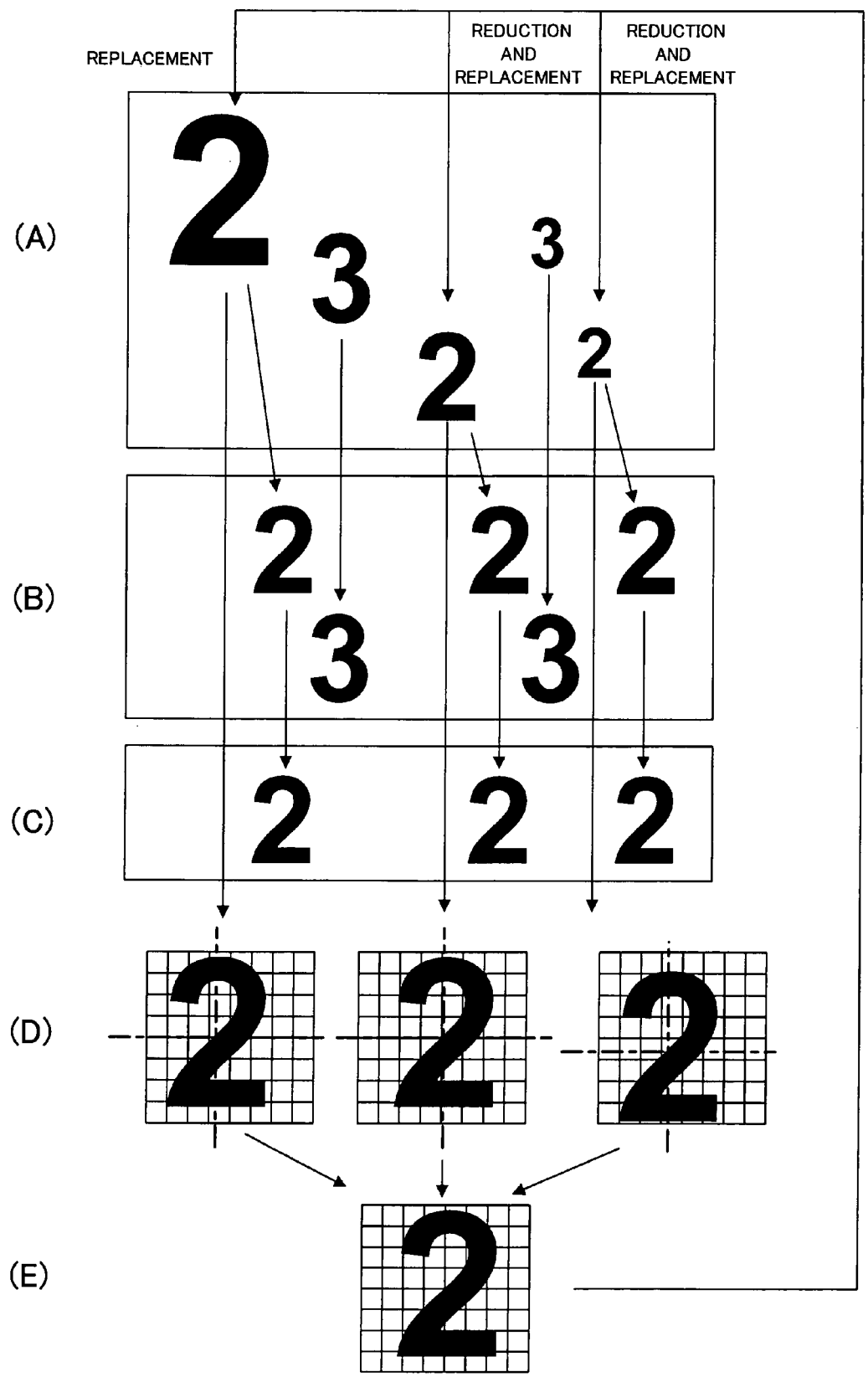
FIG. 42 is an explanatory view showing the outline of a first modification of the image processing performed on the same characters in different sizes.

FIG. 42 is an explanatory view showing the outline of a first modification of the image processing performed on the same characters in different sizes.

As shown in FIG. 42(A), an image of character or the like may appear in different sizes in an original image. In this case, as shown in FIG. 42(B), the image processing apparatus 2 adjusts the sizes of the cut out character images to a predetermined size, and as shown in FIG. 42(C), extracts similar character images from the size-adjusted character images.

Further, as shown in FIG. 42(D), the image processing apparatus 2 selects a largest character image in the original image from the extracted character images, and adjusts the sizes of the extracted character images to the size of the largest character image. As shown in FIG. 42(E), the image processing apparatus 2 generates a high resolution character image based on the plural size-adjusted character images.

The image processing apparatus 2 may replace the character images included in the original image with the generated character image. In this case, the image processing apparatus 2 reduces the generated character image based on the sizes of the character images included in the original image and replaces the character images with the reduced generated character image. For example, the image processing apparatus 2 replaces the largest character image in the original image with the generated character image, and replaces character images other than the largest character image with the reduced generated character image.

Figure 43:
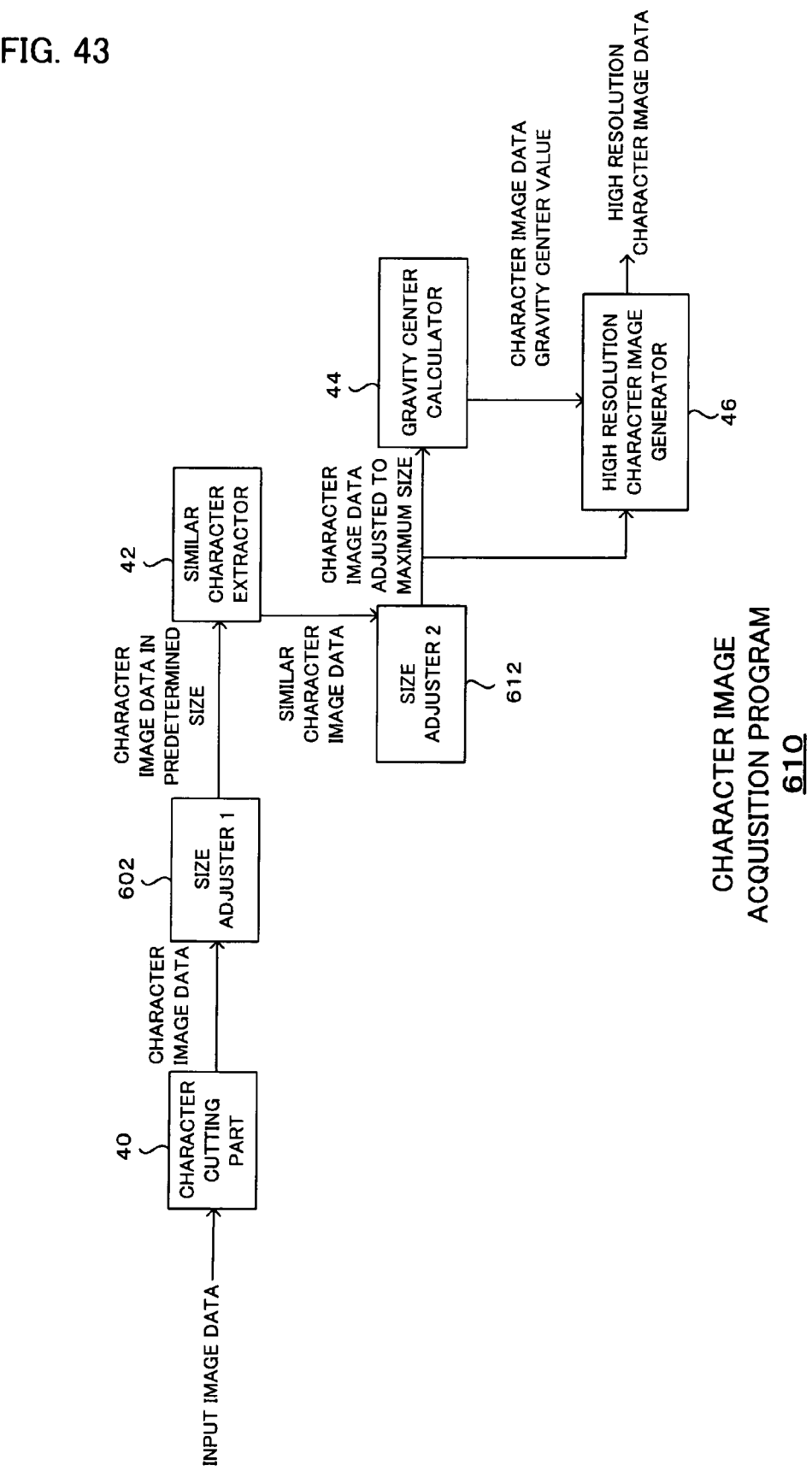
FIG. 43 is a block diagram showing the functional structure of a character image acquisition program 610 performed by the controller 20 of the image processing apparatus 2 according to a thirteenth exemplary embodiment of the present invention.

FIG. 43 is a block diagram showing the functional structure of a character image acquisition program 610 performed by the controller 20 of the image processing apparatus 2 according to a thirteenth exemplary embodiment of the present invention.

As shown in FIG. 43, the character image acquisition program 610 has a structure where a second size adjuster 612 is added to the character image acquisition program 600 shown in FIG. 39. Note that among the constituent elements shown in FIG. 43, the elements substantially corresponding to those shown in FIG. 39 have the same reference numerals.

In the character image acquisition program 610, the second size adjuster 612 searches for a largest character image in an original image from plural character images received from the similar character extractor 42. The second size adjuster 612 adjusts the sizes of the plural character images extracted by the similar character extractor 42 to the size of the largest character image. The second size adjuster 612 outputs the size-adjusted character images to the gravity center calculator 44 and the high resolution character image generator 46.

The image processing apparatus 2 may replace the respective cut out character images with the generated character image. In this case, the character image acquisition program 610 includes equivalent functions to the position calculator 50 and the character arrangement part 52 of the image enlargement program 5 (FIG. 9). For example, the image processing apparatus 2 replaces the largest character image in the original image with the generated character image, and replaces other character images than the largest character image with the generated character image reduced based on the sizes of the other character images.

Figure 44:
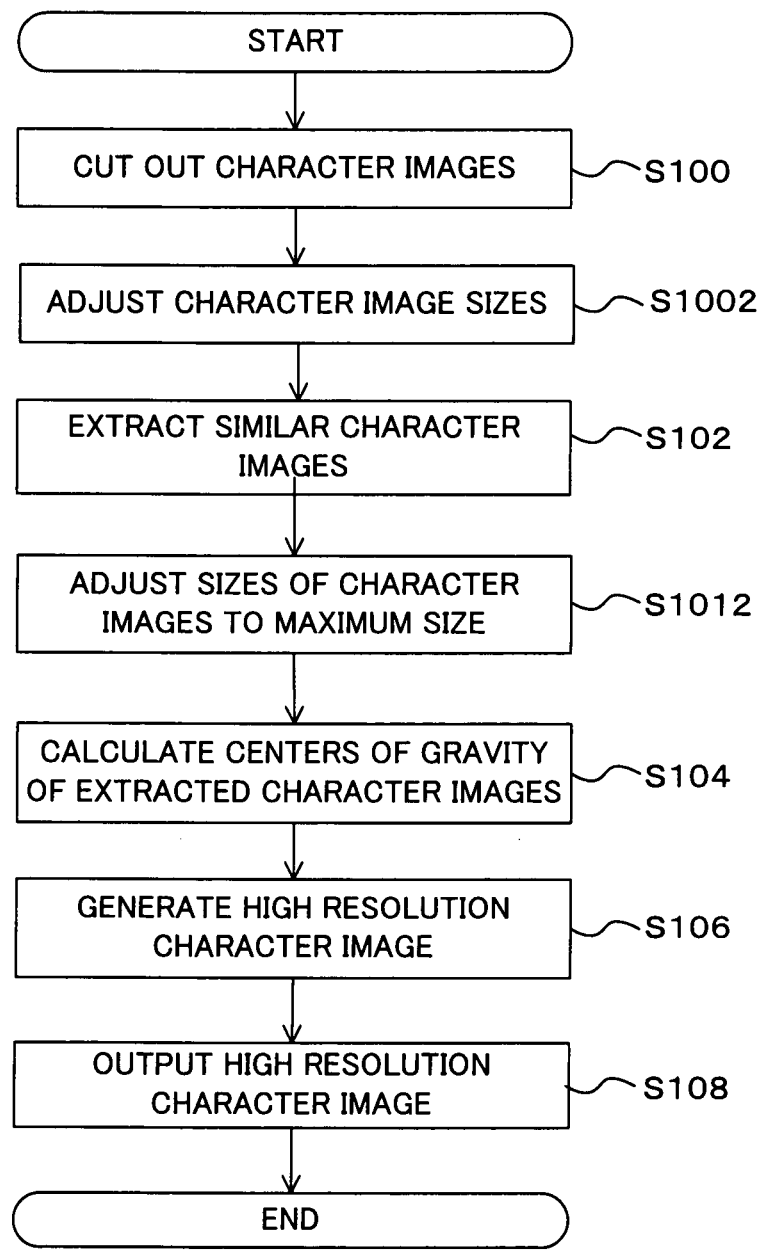
FIG. 44 is a flowchart showing high resolution character image acquisition processing with twice character size adjustment processing (S1010) based on the character image acquisition program 610.

FIG. 44 is a flowchart showing high resolution character image acquisition processing with twice character size adjustment processing (S1010) based on the character image acquisition program 610. Note that among the respective processing steps shown in FIG. 44, the processing steps substantially corresponding to those shown in FIG. 41 have the same reference numerals.

As shown in FIG. 44, character images are cut out from an input image, then the sizes of the character images are adjusted, and similar character images are extracted by the processings at steps S100 to S102.

At step S1012, the second size adjuster 612 adjusts the sizes of the similar character images to the size of a largest character image in the input image among these character images. Thereafter, the processings at steps S104 to S108 are performed, and a high resolution character image is generated.

Figure 45:
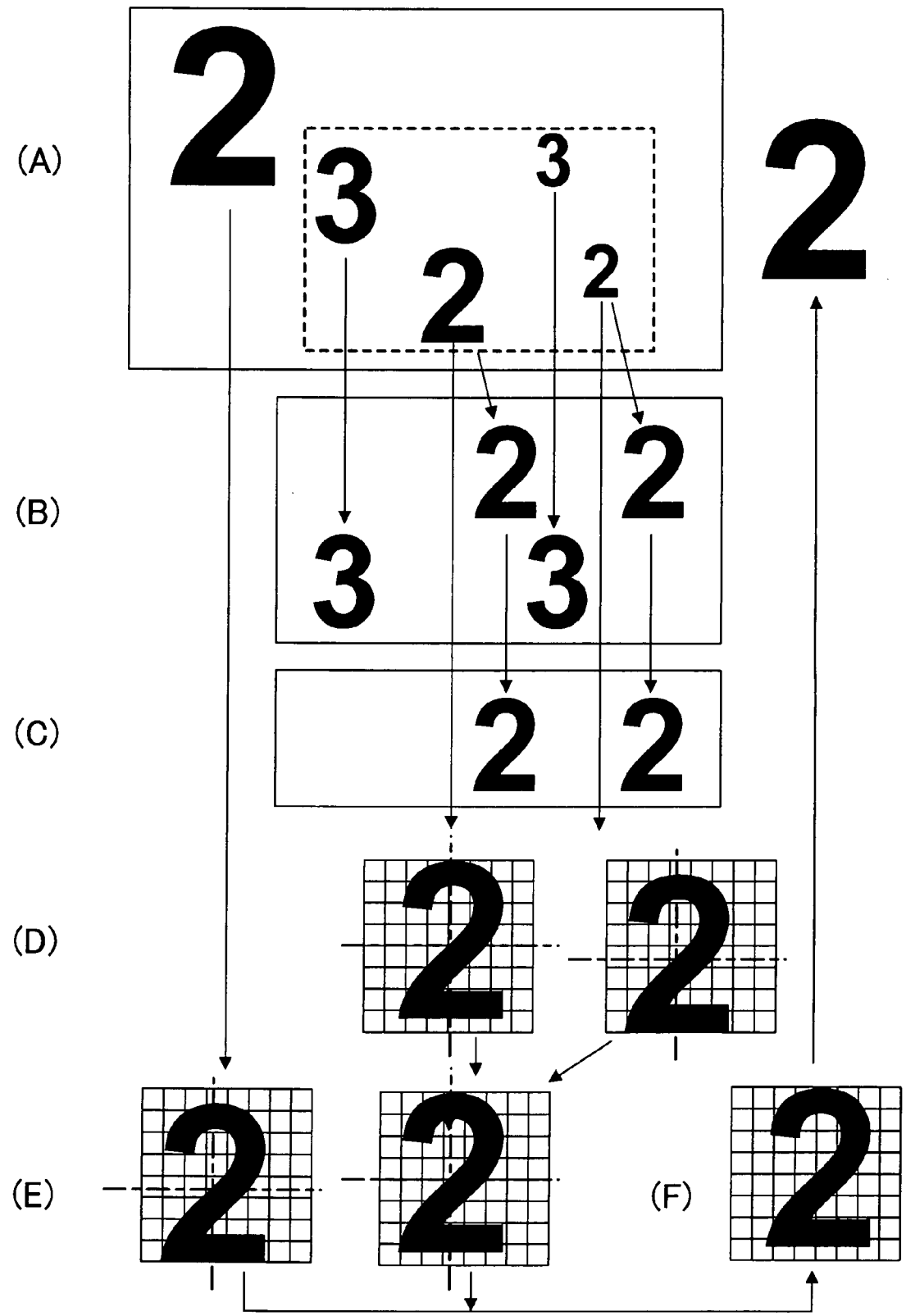
FIG. 45 is an explanatory view showing the outline of a second modification of the image processing performed on the same characters in different sizes.

FIG. 45 is an explanatory view showing the outline of a second modification of the image processing performed on the same characters in different sizes.

The second modification is different from the first modification in that character images having sizes similar to a certain degree are subjected to size adjustment. For example, when the difference between character images is less than a predetermined value, the image processing apparatus 2 judges that these character images as subject character images of size adjustment.

As shown in FIG. 45(A), when a character image appears in different sizes in an original image, as shown in FIG. 45(B), the image processing apparatus 2 adjusts the sizes of character images in sizes close to each other to a certain degree (within a broken-line block) to a predetermined size. Then as shown in FIG. 45(C), the image processing apparatus 2 extracts similar character images from the size-adjusted character images.

Further, as shown in FIG. 45(D), the image processing apparatus 2 adjusts the sizes of the extracted character images to a predetermined size, and as shown in FIG. 45(E), generates a high resolution character image based on the plural size-adjusted character images. Further, as shown in FIGS. 45(E) and 45(F), the image processing apparatus 2 adds the generated character image to the cut out character image group, and recursively repeats the procedure as shown in FIG. 45. In this manner, the image processing apparatus 2 generates a high resolution character image.

Figure 46:
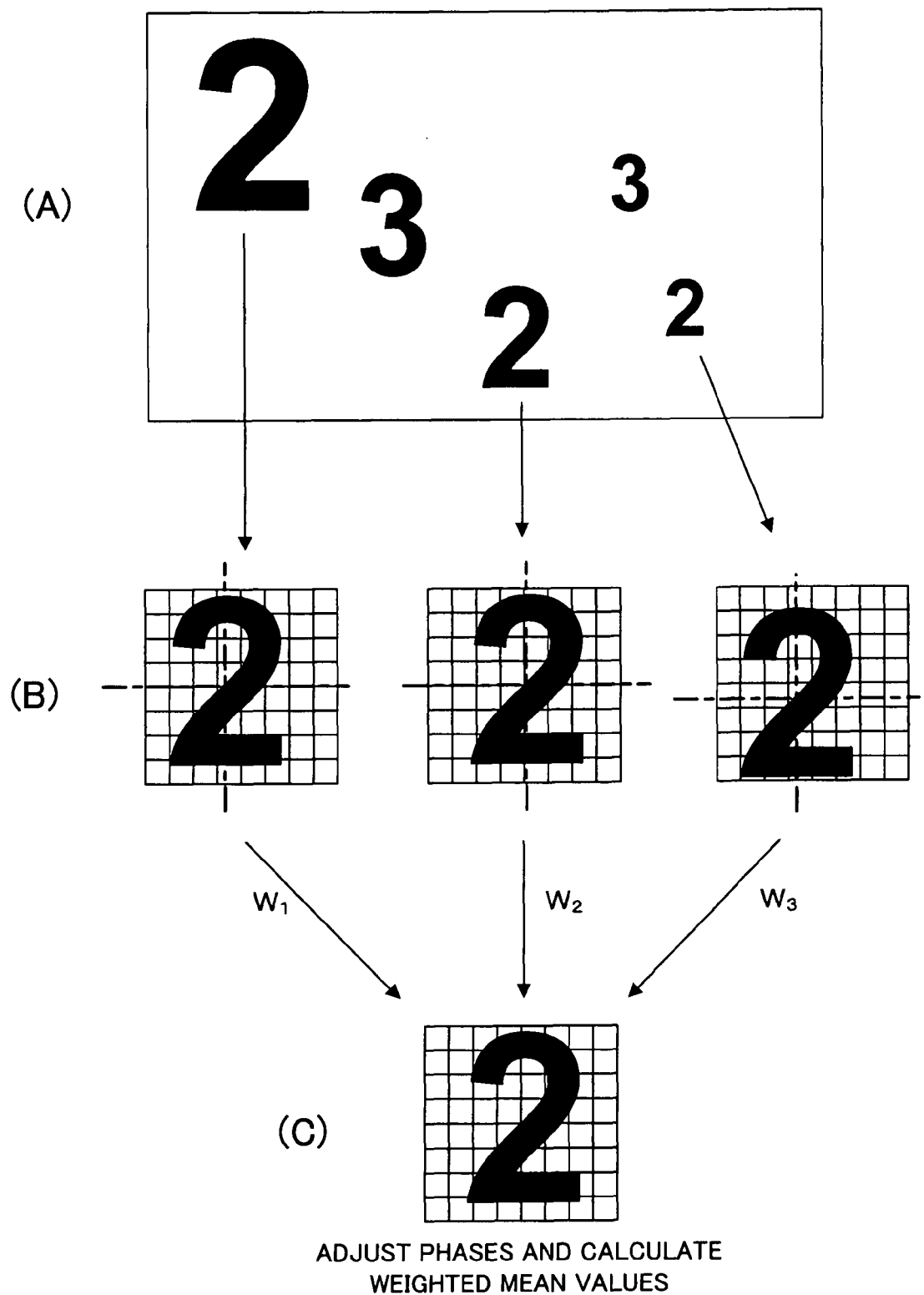
FIG. 46 is an explanatory view showing the outline of a third modification of the image processing performed on the same characters in different sizes.

FIG. 46 is an explanatory view showing the outline of a third modification of the image processing performed on the same characters in different sizes.

As shown in FIG. 46(A), when a character image appears in different sizes in an original image, as shown in FIG. 46(B), the image processing apparatus 2 adjusts the sizes of cut out character images to a predetermined size.

Further, as shown in FIG. 46(C), the image processing apparatus 2 performs weighting on the size-adjusted character images based on the sizes of the character images in the original image. In FIG. 46(C), numerals W1 to W3 denote weights. The image processing apparatus 2 overlaps the respective character images based on the phases of the respective character images, and generates a high resolution character image based on the calculated weights.

Figure 47:
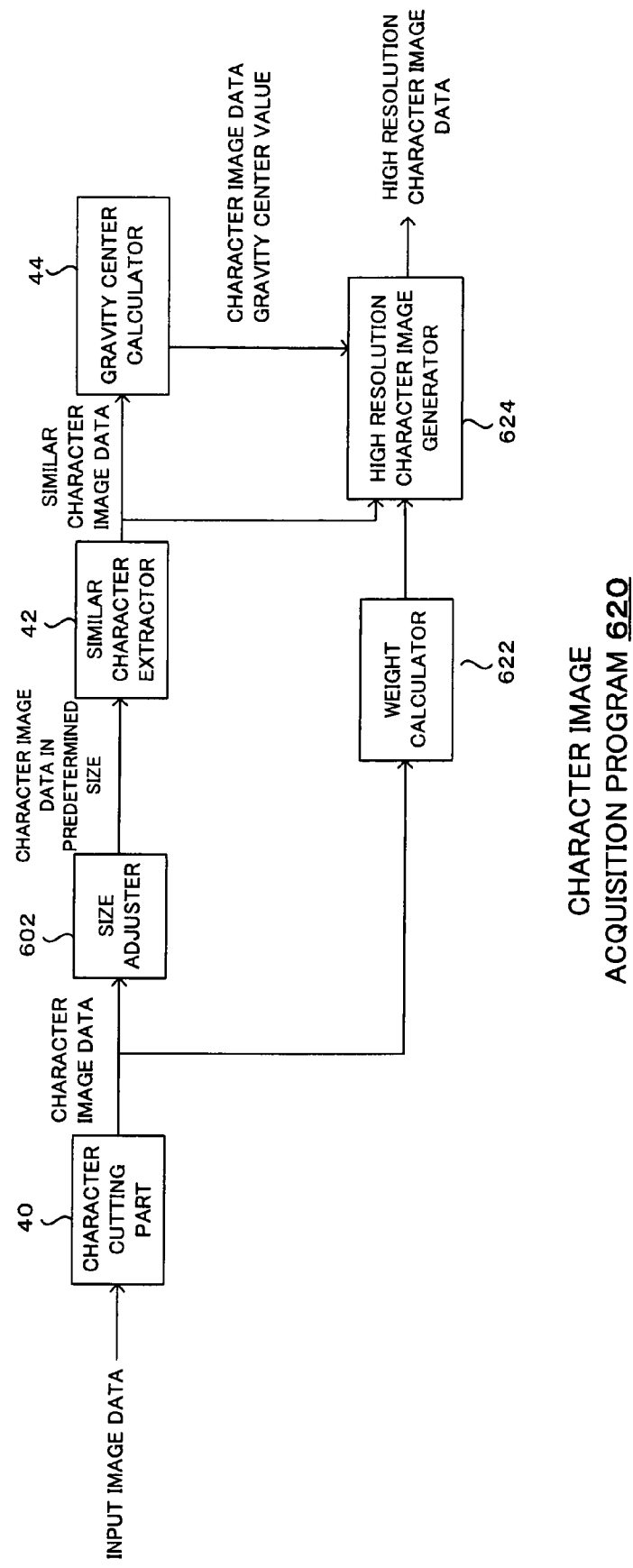
FIG. 47 is a block diagram showing the functional structure of a character image acquisition program 620 performed by the controller 20 of the image processing apparatus 2 according to a fourteenth exemplary embodiment of the present invention.

FIG. 47 is a block diagram showing the functional structure of a character image acquisition program 620 performed by the controller 20 of the image processing apparatus 2 according to a fourteenth exemplary embodiment of the present invention.

As shown in FIG. 47, the character image acquisition program 620 has a structure where a weight calculator 622 is added to the character image acquisition program 600 shown in FIG. 39, and the high resolution character image generator 46 is replaced with a high resolution character image generator 624. Note that among the constituent elements shown in FIG. 47, the elements substantially corresponding to those shown in FIG. 39 have the same reference numerals.

In the character image acquisition program 620, the weight calculator 622 calculates the weights of respective character images cut out by the character cutting part 40 based on the sizes of the character images. For example, as a character image is larger in an input original image, the weight calculator 622 increases the weight. The high resolution character image generator 624 calculates the phases of the respective character images based on relative positions between the centers of gravity of the character images calculated by the gravity center calculator 44 and sampling lattice points. Then the high resolution character image generator 624 overlaps the character images based on the calculated phases, and calculates weighted mean values of the character images.

Figure 48:
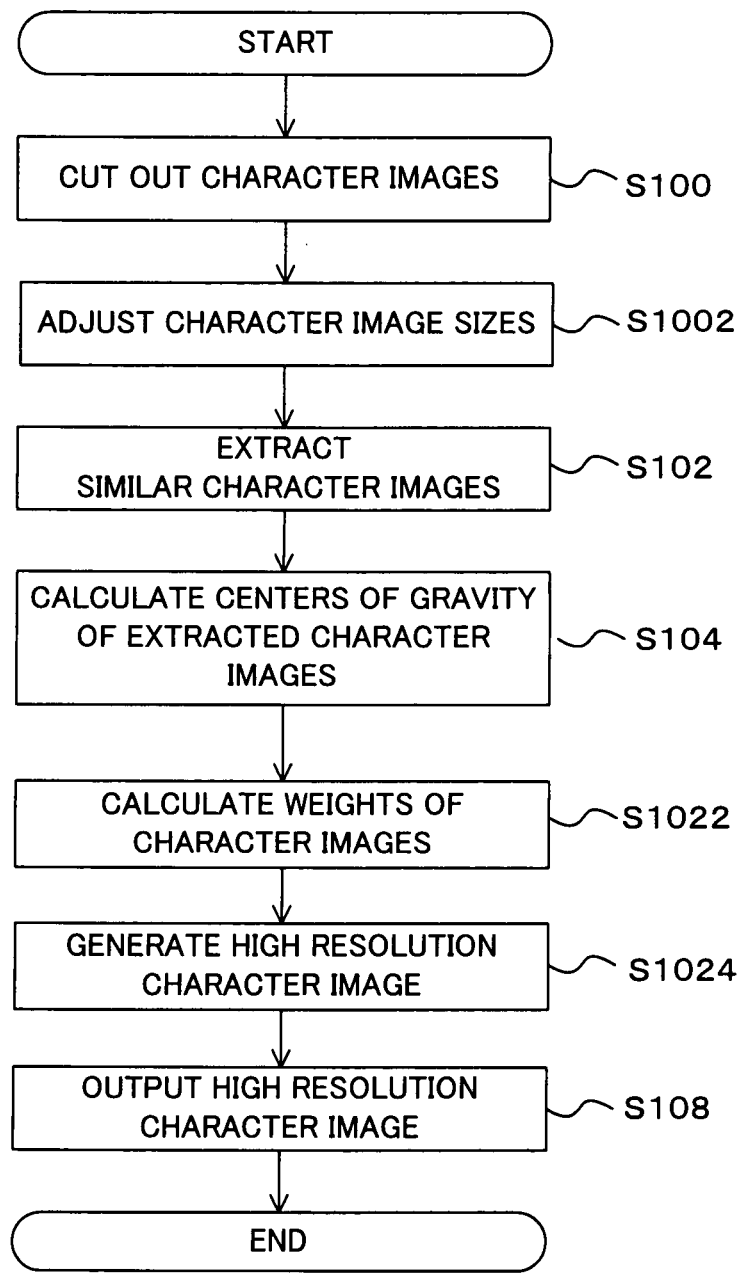
FIG. 48 is a flowchart showing high resolution character image acquisition processing with weighted mean value calculation (S1020) based on the character image acquisition program 620.

FIG. 48 is a flowchart showing high resolution character image acquisition processing with weighted mean value calculation (S1020) based on the character image acquisition program 620. Note that among the respective processing steps shown in FIG. 48, the processing steps substantially corresponding to those shown in FIG. 41 have the same reference numerals.

As shown in FIG. 48, character images are cut out from an input image, then the sizes of the character images are adjusted, then similar character images are extracted, and the centers of gravity of the extracted character images are calculated by processings at step S100 to S104.

At step S1022, the weight calculator 622 calculates the weights based on the sizes of the cut out character images.

At step S1024, the high resolution character image generator 624 calculates weighted mean values of the character images based on the calculated weights.

Thereafter, at step S108, a high resolution character image is outputted.

Figure 49:
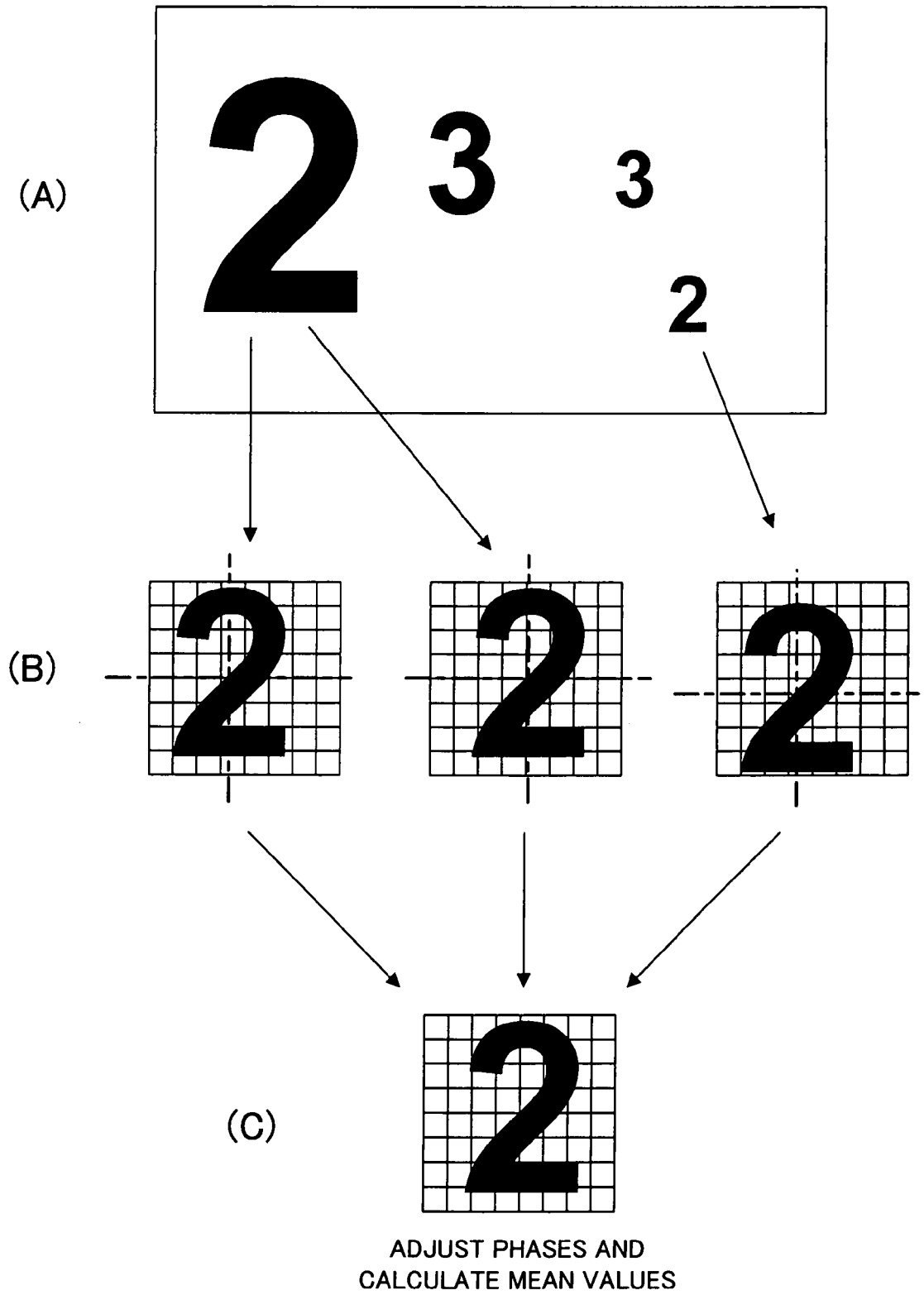
FIG. 49 is an explanatory view of the outline of a fourth modification of the image processing performed on the same characters in different sizes.

FIG. 49 is an explanatory view showing the outline of a fourth modification of the image processing performed on the same characters in different sizes.

As shown in FIG. 49(A), when a character image appears in different sizes in an original image, as shown in FIG. 49(B), the image processing apparatus 2 adjusts the sizes of cut out character images to a predetermined size. Note that when a character image is reduced, the image processing apparatus 2 generates plural reduced images in different phases. Then as shown in FIG. 49(C), the image processing apparatus 2 generates a high resolution character image based on the plural size-adjusted character images. Note that this image processing is performed based on a program having an equivalent structure to that of the character image acquisition program 600 shown in FIG. 39.

Figure 50:
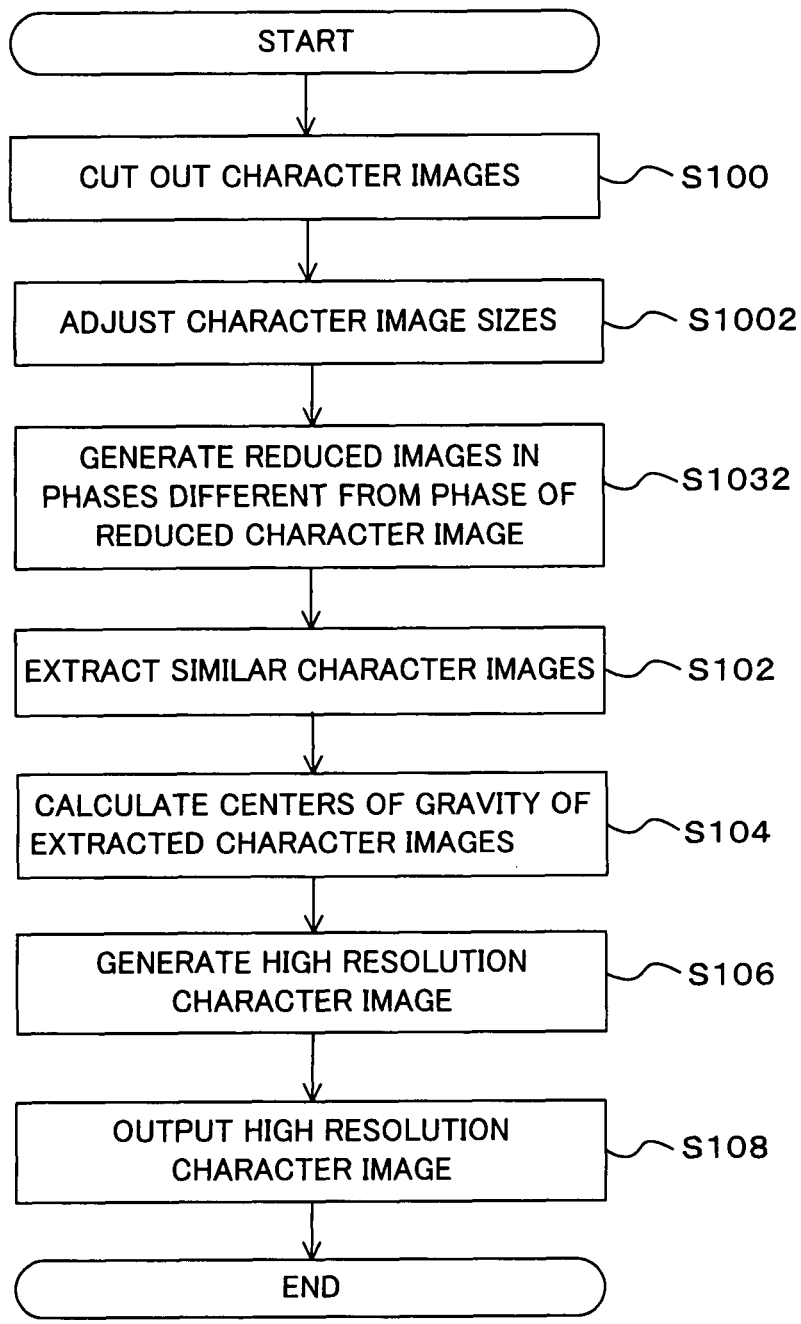
FIG. 50 is a flowchart showing high resolution character image acquisition processing with processing of generating reduced images in different phases (S1030)

FIG. 50 is a flowchart showing high resolution character image acquisition processing with processing of generating reduced images in different phases (S1030). Note that among the respective processing steps shown in FIG. 50, the processing steps substantially corresponding to those shown in FIG. 41 have the same reference numerals.

As shown in FIG. 50, character images are cut out from an input image, and the sizes of the character images are adjusted by the processings at steps S100 and S1002.

When a character image is reduced, at step S1032, plural reduced character images in different phases are generated. Then, the processings at steps S102 to S108 are performed, and a high resolution character image is generated.

Next, image coding processing and decoding processing performed using a generated high resolution character image will be described.

In a JBIG2 text region, processing of extracting a partial image such as a character or a figure (hereinbelow, also referred to as an input partial image) from binary image data, and comparing the extracted partial image data with partial image data already registered in a dictionary (hereinbelow, also referred to as a registered partial image) is performed. As a result of comparison, when no registered partial image similar to the input partial image has been found, the input partial image is registered into the dictionary. When a registered partial image similar to the input partial image has been found, the input partial image is encoded based on an index indicating the partial image in the dictionary and the position of the input partial image in the binary image data.

When plural identical partial images are read with a scanner or the like and encoded in a JBIG2 text region, phases of the plural partial images upon reading may be shifted from each other. In such case, it is necessary to consider a magnification ratio in the coding processing and the image quality of output image upon decoding.

Figure 51:
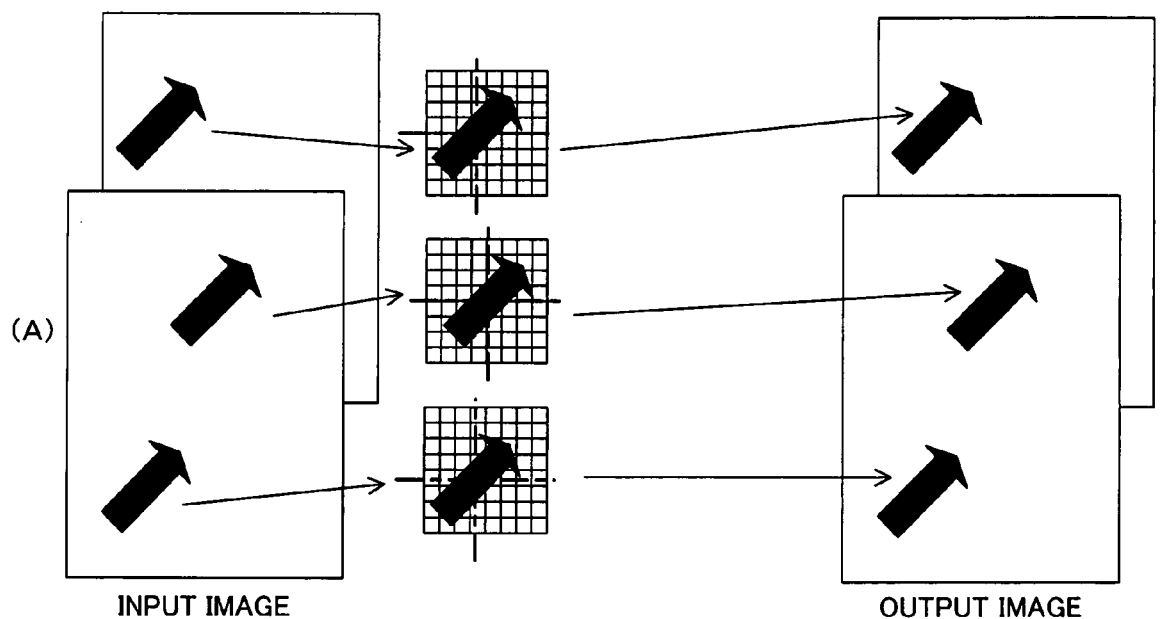
FIG. 51 is an explanatory view of coding processing and decoding processing in a JBIG2 text region.
Figure 51:
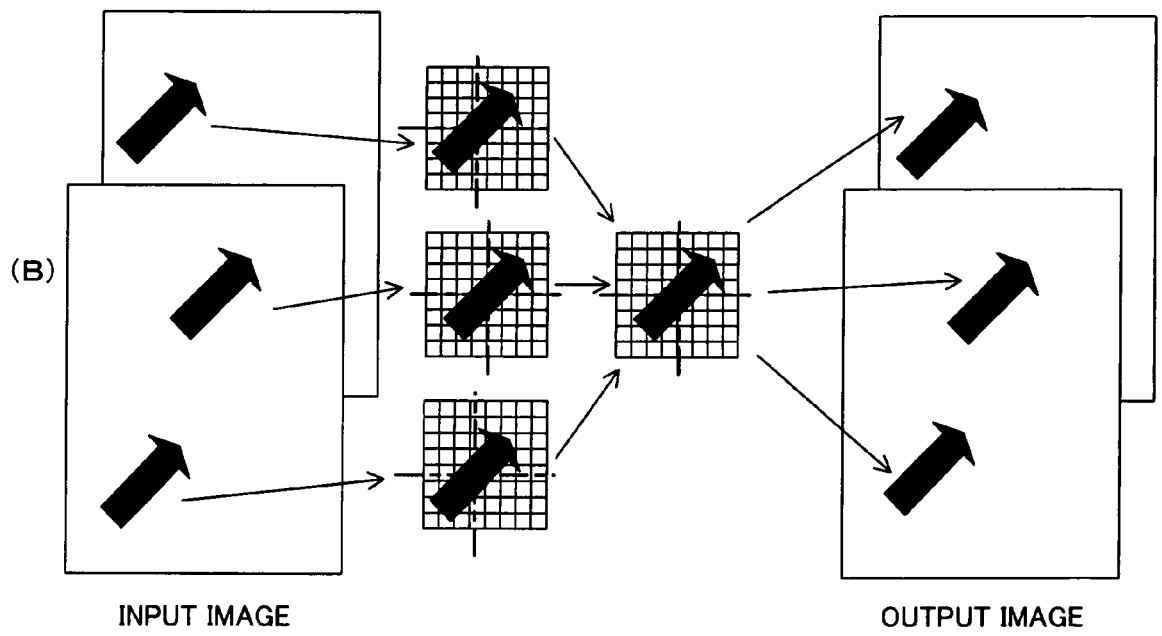

FIG. 51 is an explanatory view of the coding processing and the decoding processing in a JBIG2 text region. FIG. 51(A) shows a method of encoding plural partial images extracted from an input image; and FIG. 51(B), a method of encoding 1 partial image representing the plural partial images extracted from the input image.

In the method shown in FIG. 51(A), when the phases of the plural partial images are shifted from each other, the plural partial images are encoded as different partial image data. In this case, as the original partial image data are decoded without any change, the quality of a decoded output image is not degraded. However, the compression ratio in the coding processing is low and the amount of coded data is large.

In the method shown in FIG. 51(B), even when the phases of the plural partial images are shifted from each other, one of the plural partial images is encoded as a representative image. Accordingly, in this method, the compression ratio is high and the amount of coded data is small. However, in a decoded output image, as the partial images are respectively replaced with partial images in different phases, the image quality may be degraded. For example, the degradation of image quality appears as turbulence of character string.

An image coding apparatus according to an exemplary embodiment of the present invention encodes a high resolution partial image generated as described above as a representative image. Hereinbelow, the coding processing and the decoding processing will be described using a character image as an example of partial image.

Figure 52:
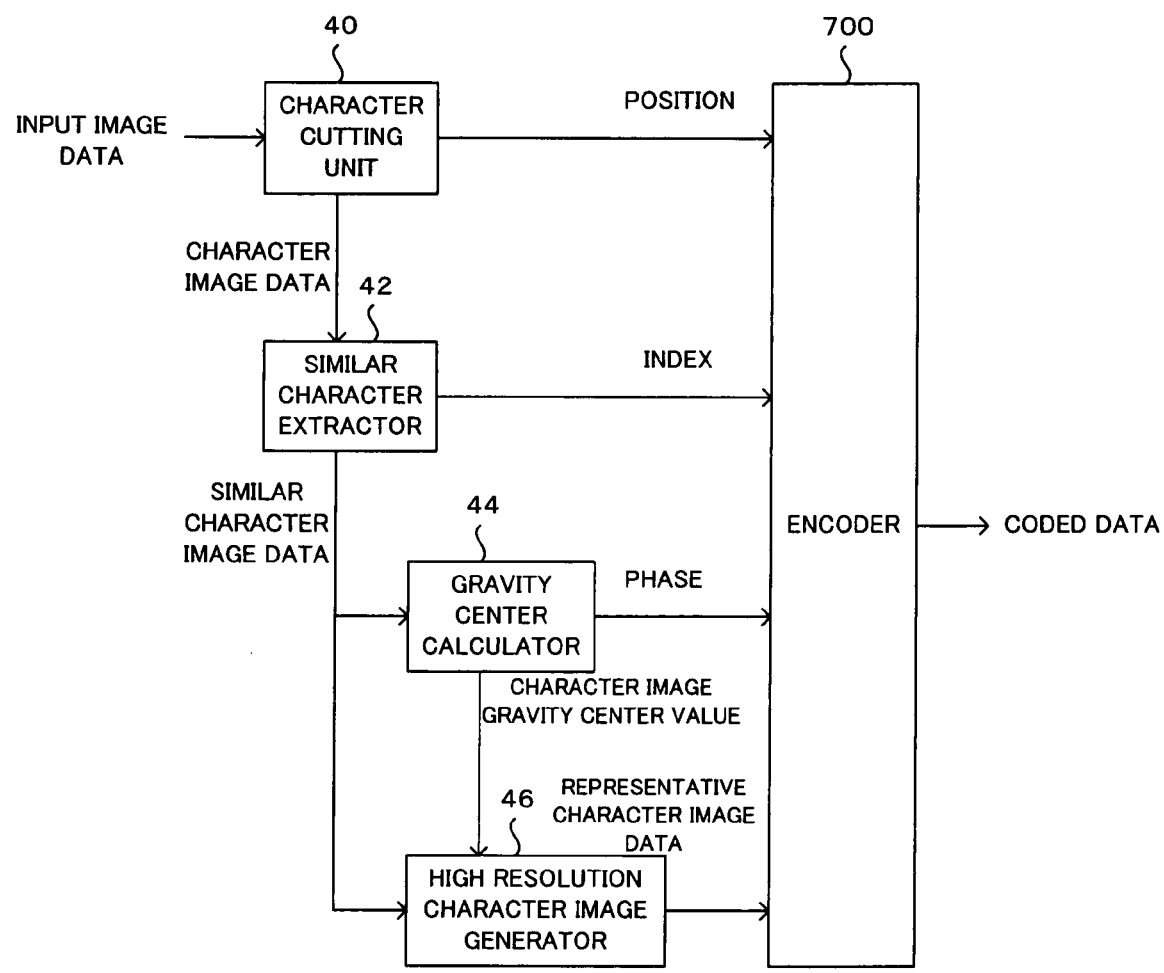
FIG. 52 is a block diagram showing the functional structure of an image coding program 70 performed by the controller 20 of an image coding apparatus 7 according to an exemplary embodiment of the present invention.

FIG. 52 is a block diagram showing the functional structure of an image coding program 70 performed by the controller 20 of an image coding apparatus 7 according to the exemplary embodiment of the present invention. Note that among the constituent elements shown in FIG. 52, the elements substantially corresponding to those shown in FIG. 5 have the same reference numerals. Further, the image coding apparatus 7 has the same hardware configuration as that of the image processing apparatus 2 in FIG. 4.

As shown in FIG. 52, the image coding program 70 shown in FIG. 5 has the character cutting unit 40, the similar character extractor 42, the gravity center calculator 44, the high resolution character image generator 46 and an encoder 700. In the image coding program 70, a high resolution character image generated by the high resolution character image generator 46 is also referred to as a representative image. Accordingly, the high resolution character image generator 46 functions as a representative image generation unit that generates a representative image in a second resolution based on respective partial images (character images in this example) extracted by the similar character extractor 42 and phases of the respective partial images calculated with precision higher than one pixel in a first resolution.

The encoder 700 encodes the representative image generated by the high resolution character image generator 46 and the phases and positions of the respective partial images extracted by the similar character extractor 42, thereby generates coded data. More particularly, the encoder 700 encodes the position of the character image inputted from the character cutting unit 40 in the input image, the phase of the character image estimated by the gravity center calculator 44, and the representative image data with an identifier (index) assigned by the similar character extractor 42, generated by the high resolution character image generator 46, by character image data cut out by the character cutting unit 40.

The encoder 700 may store the coded data into the storage unit 24. Otherwise, the encoder 700 may transmit the coded data to an external computer such as an image decoding apparatus 8 to be described later via the communication unit 22, or may store the coded data onto the storage medium 240 and supplied to the image decoding apparatus 8 or the like.

Figure 53:
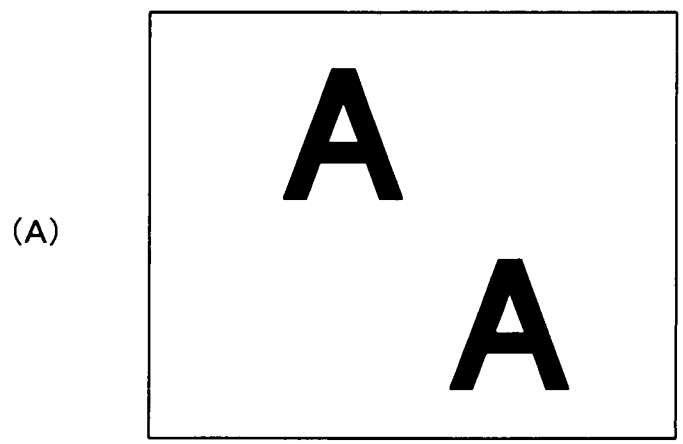
FIG. 53 is an explanatory view of coding processing on an input image by an encoder 700.
Figure 53:
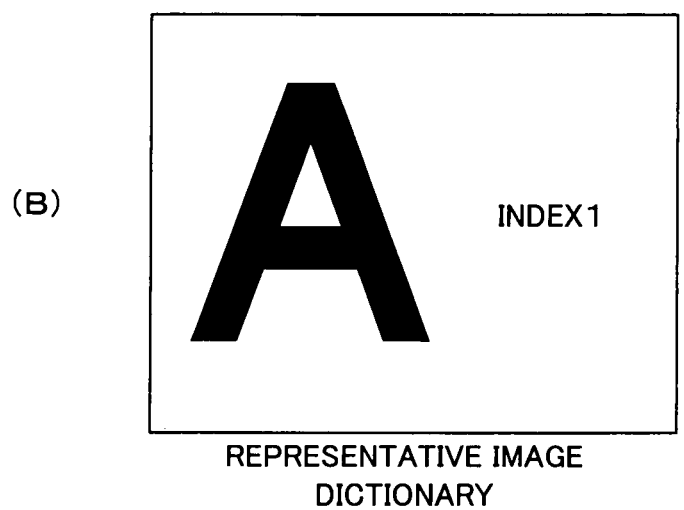
Figure 53:
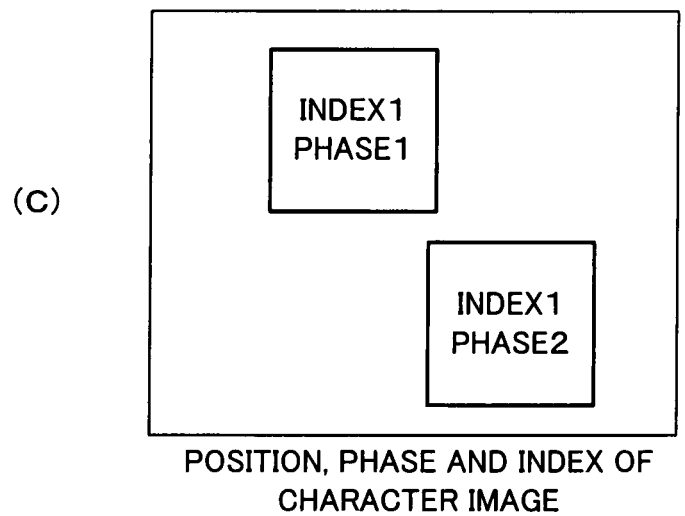

FIG. 53 is an explanatory view of the coding processing by the encoder 700. FIG. 53(A) shows an input image; FIG. 53(B), a representative image dictionary generated based on the input image; and FIG. 53(C), information (position and phase) related a partial image cut out from the input image.

As shown in FIGS. 53(A) and 53(B), the respective partial images (character images "A" in this example) included in the input image are extracted by the image coding program 70 and a representative image is generated. The representative image is registered into a representative image dictionary, and an index is assigned to the representative image. The shape and index of the representative image are encoded by the encoder 700 as information related to the representative image included in the representative image dictionary.

As shown in FIG. 53(C), the positions of the partial images in the input image, the phases upon cutting, and the index of the corresponding representative image are encoded by the encoder 700 as information related to the partial images cut out by the character cutting unit 40. In this manner, the encoder 700 encodes a representative image dictionary and information related to partial images cut out from an input image, thereby generates coded data.

Figure 54:
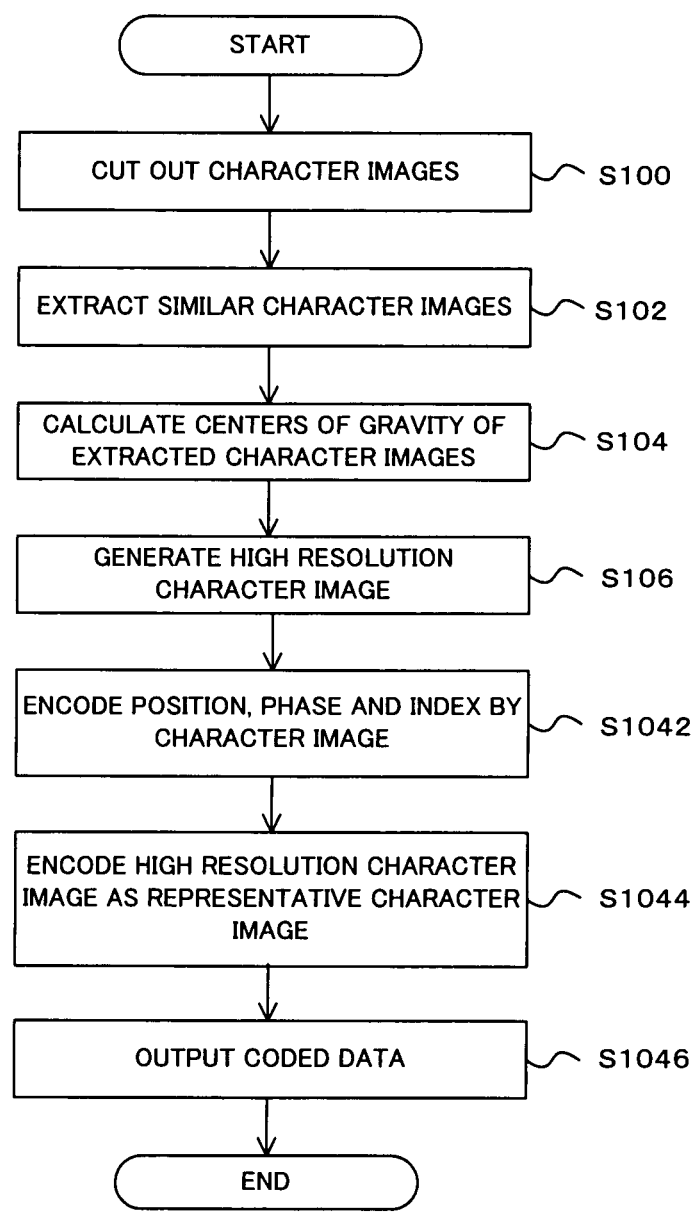
FIG. 54 is a flowchart showing image coding processing (S1040) based on the image coding program 70.

FIG. 54 is a flowchart showing image coding processing (S1040) based on the image coding program 70. Note that among the respective processing steps shown in FIG. 54, the processing steps substantially corresponding to those shown in FIG. 8 have the same reference numerals.

As shown in FIG. 54, by the processings at steps S100 to S106, character images are cut out from an input image, then similar character images are extracted, then the centers of gravity (phases) are calculated, and a high resolution character image (representative image) is generated.

At step S1042, the encoder 700 encodes information related to the cut out character image (position, phase and index).

At step S1044, the encoder 700 encodes the generated and index-assigned representative image. More particularly, the encoder 700 encodes a representative image dictionary.

At step S1046, the encoder 700 generates and outputs coded data.

Next, an image decoding apparatus 8 according to a first exemplary embodiment of the present invention will be described.

Figure 55:
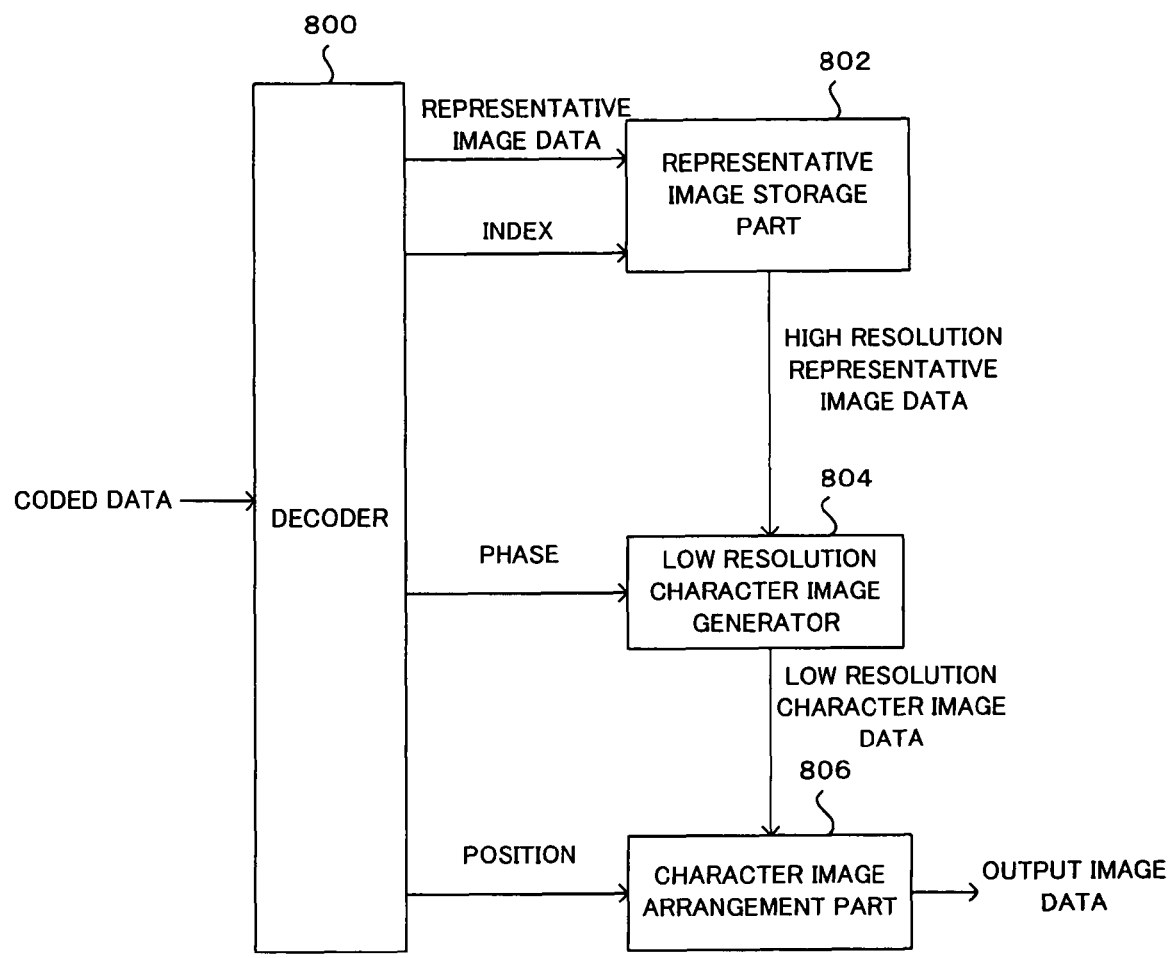
FIG. 55 is a block diagram showing the functional structure of an image decoding program 80 performed by the controller 20 of an image decoding apparatus 8.

FIG. 55 is a block diagram showing the functional structure of an image decoding program 80 performed by the controller 20 of the image decoding apparatus 8.

As shown in FIG. 55, the image decoding program 80 has a decoder 800, a representative image storage part 802, a low resolution character image generator 804 and a character image arrangement part 806. Note that hereinbelow, the image decoding program 80 will be described using a character image as an example of partial image.

In the image decoding program 80, the decoder 800 receives coded data generated by the image coding apparatus 7 and decodes the coded data. More particularly, the decoder 800 decodes a representative image dictionary including an index-assigned representative image and information related to a partial image (position, phase and index) based on the coded data. The decoder 800 outputs the representative image data and the index assigned to the representative image to the representative image storage part 802. Further, the decoder 800 outputs the phase of the character image to the low resolution character image generator 804, and the position of the character image to the character image arrangement part 806.

The representative image storage part 802 holds the decoded representative image dictionary. The representative image storage part 802 is realized with at least one of the memory 204 and the storage unit 24.

The low resolution character image generator 804 generates a partial image in a first resolution based on the representative image stored in the representative image storage part 802 and the decoded phase. More particularly, the low resolution character image generator 804 reads the stored representative image, reduces the representative image based on the phase thereby generates the low resolution character image data in the first resolution. In this manner, the low resolution character image generator 804 functions as a partial image generation unit.

The character image arrangement part 806 arranges the low resolution character image generated by the low resolution character image generator 804 in an output image based on the position of the partial image decoded by the decoder 800, thereby generates output image data. In this manner, the character image arrangement part 806 functions as a partial image arrangement unit.

Figure 56:
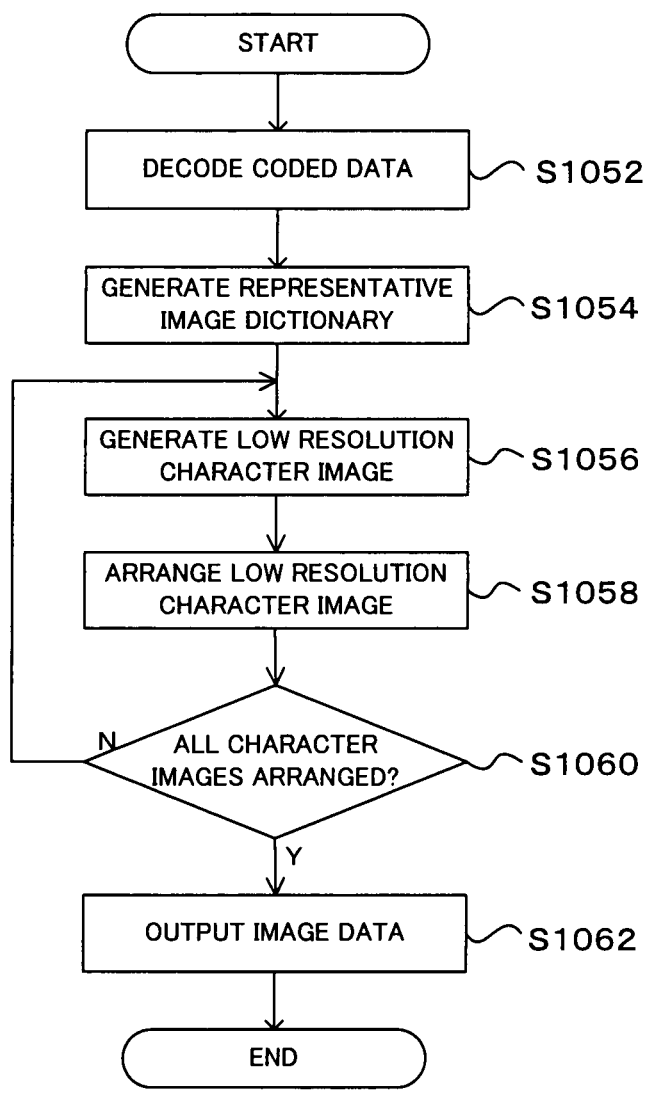
FIG. 56 is a flowchart showing image decoding processing (S1050) based on the image decoding program 80.

FIG. 56 is a flowchart showing image decoding processing (S1050) based on the image decoding program 80.

As shown in FIG. 56, at step S1052, the decoder 800 of the image decoding program 80 decodes coded data thereby obtains a representative image in a second resolution and phase and position of a partial image in a first resolution.

At step S1054, the decoder 800 stores the representative image data and the index assigned to the representative image into the representative image storage part 802, thereby generates a representative image dictionary.

At step S1056, the low resolution character image generator 804 generates a low resolution character image in the first resolution based on the representative image in the representative image dictionary and the phase of the decoded partial image.

At step S1058, the character image arrangement part 806 arranges the generated low resolution character image in an output image based on the decoded position.

At step S1060, the character image arrangement part 806 determines whether or not all the partial images have been arranged in the output image. When all the partial images have been arranged, the image decoding program 80 proceeds to step S1062, otherwise, returns to step S1056.

At step S1062, the character image arrangement part 806 generates and outputs output image data.

Next, the image decoding apparatus 8 according to the second exemplary embodiment of the present invention will be described.

Figure 57:
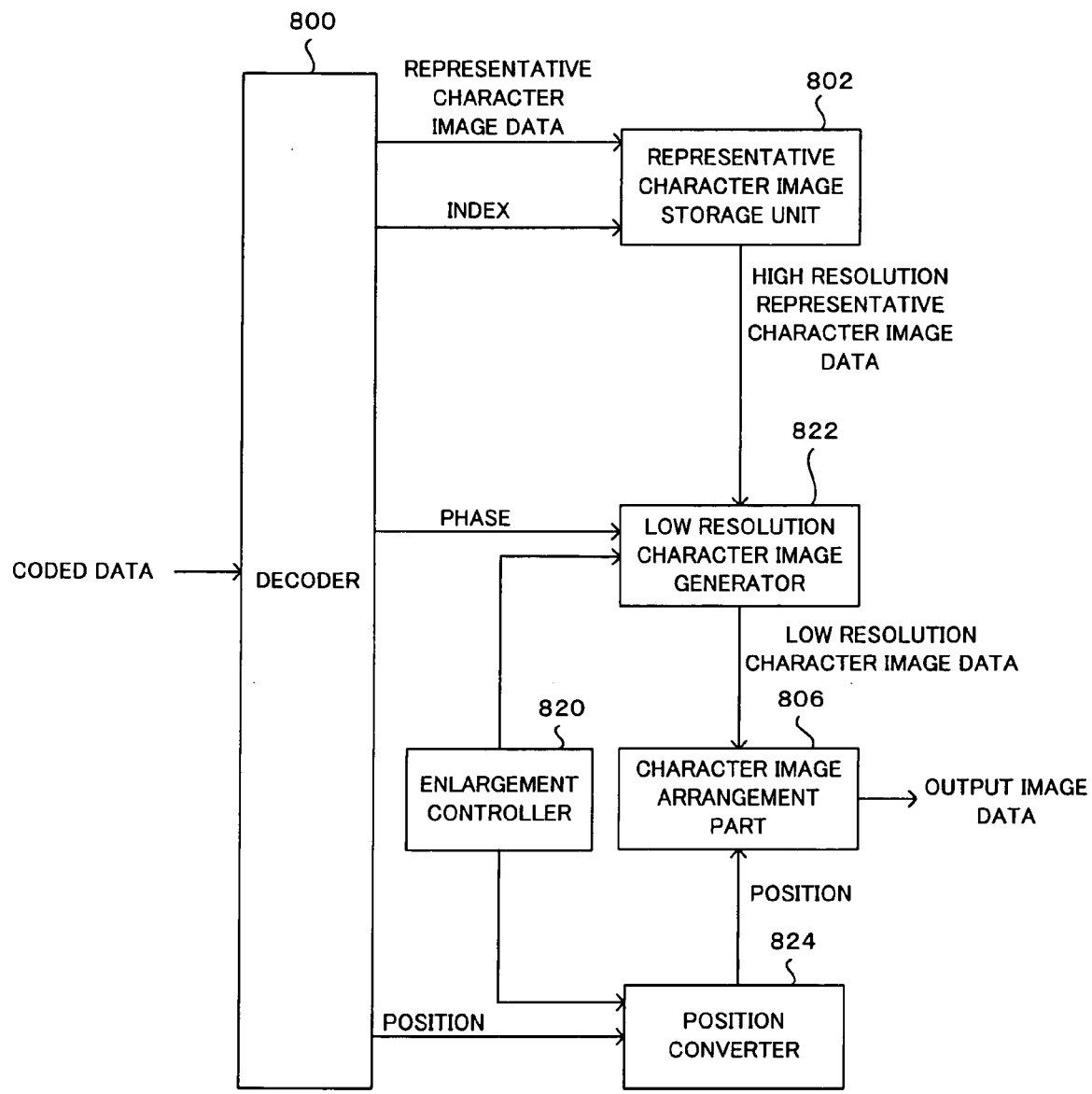
FIG. 57 is a block diagram showing the functional structure of an image decoding program 82 performed by the controller 20 of the image decoding apparatus 8.

FIG. 57 is a block diagram showing the functional structure of an image decoding program 82 performed by the controller 20 of the image decoding apparatus 8.

As shown in FIG. 57, the image decoding program 82 has a structure in which an enlargement controller 820 and a position converter 824 are added to the image decoding program 80 (FIG. 55), and the low resolution character image generator 804 is replaced with a low resolution character image generator 822.

In the image decoding program 82, the enlargement controller 820 controls the low resolution character image generator 822 and the position converter 824 based on a magnification. More particularly, the enlargement controller 820 reads a magnification previously stored in at least one of the memory 204 and the storage unit 24, and outputs the magnification to the low resolution character image generator 822 and the position converter 824. The enlargement controller 820 may output a magnification set via the UI unit 26 and the communication unit 22 to the low resolution character image generator 822 and the like.

The low resolution character image generator 822 generates a partial image in a first resolution further based on the magnification inputted from the enlargement controller 820. More particularly, the low resolution character image generator 822 changes the magnification upon generation of low resolution character image data based on the input magnification.

The position converter 824 converts the position of the partial image decoded by the decoder 800 based on the magnification inputted from the enlargement controller 820, and outputs the converted position to the character image arrangement part 806. The character image arrangement part 806 arranges the low resolution character image in an output image based on the position converted by the position converter 824.

Figure 58:
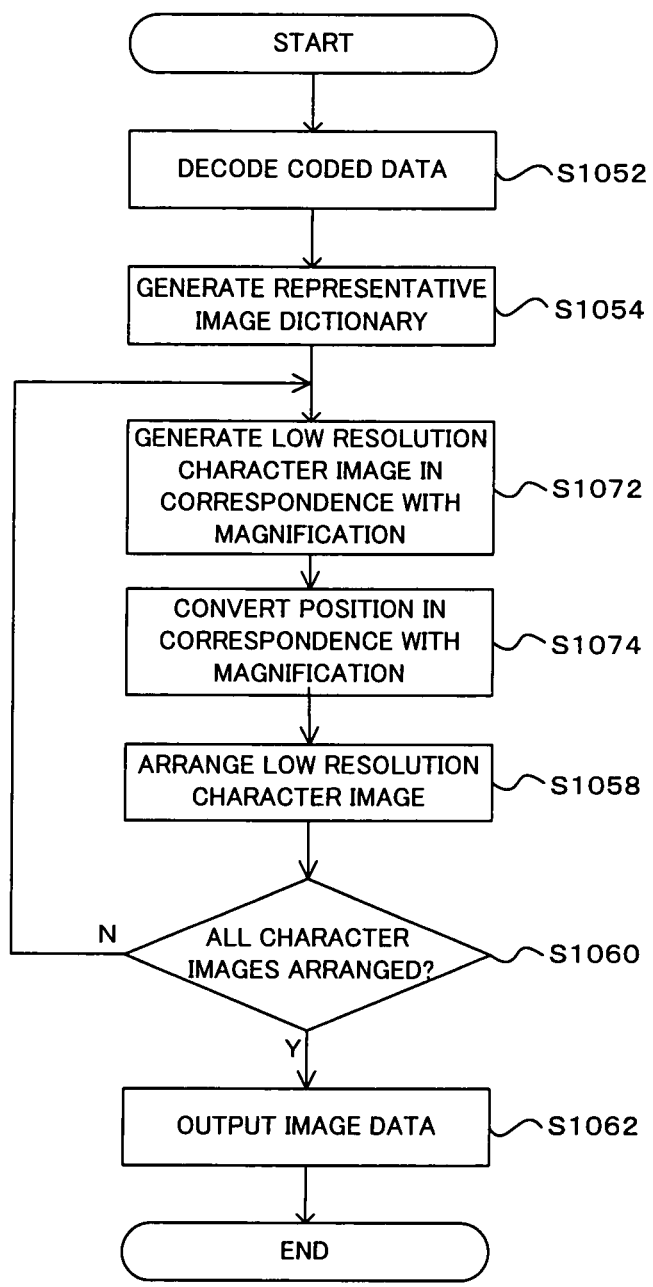
FIG. 58 is a flowchart showing image decoding processing (S1070) based on the image decoding program 82.

FIG. 58 is a flowchart showing image decoding processing (S1070) based on the image decoding program 82. Note that among the respective processing steps shown in FIG. 58, the processing steps substantially corresponding to those shown in FIG. 56 have the same reference numerals.

As shown in FIG. 58, coded data is decoded and a representative image dictionary is generated at steps S1052 to S1054.

At step S1072, the low resolution character image generator 822 generates a low resolution character image in a first resolution based on a representative image in the representative image dictionary, the phase of decoded partial image, and a magnification.

At step S1074, the position converter 824 converts the position of the partial image based on the magnification.

Further, in the processing at step S1058, the character image arrangement part 806 arranges the generated low resolution character image in an output image based on the converted position. Further, in the processing at step S1060, it is determined whether or not all the partial images have been arranged, and in the processing at step S1062, output image data is generated.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
an extraction unit that extracts a first image and a second image similar to the first image, in a first resolution;
a calculation unit that calculates a center of gravity of the respective images extracted by the extraction unit in a resolution higher than the first resolution by at least one pixel, and calculates phases of images extracted by the extraction unit in the resolution higher than the first resolution by at least one pixel using the centers of gravity; and
a generation unit that generates an image in a second resolution from the respective images extracted by the extraction unit using the phases calculated by the calculation unit,
wherein the calculation unit moves a phase of a first sampling lattice in the first resolution based on the centers of gravity and moves a phase of a second sampling lattice in the second resolution based on the centers of gravity.

2. The image processing apparatus according to claim 1, further comprising a multivalue processing unit that converts a binary image to a multivalued image,
wherein the extraction unit extracts the first image and the second image similar to the first image in the first resolution from a binary input image, and
the generation unit generates the image in the second resolution based on the respective images extracted by the extraction unit and multivalue-converted by the multivalue processing unit and the phases of the respective images calculated with precision higher than one pixel in the first resolution.

3. The image processing apparatus according to claim 2, wherein the multivalue processing unit performs multivalue processing by applying a low-pass filter to the images.

4. The image processing apparatus according to claim 2, wherein the multivalue processing unit converts the respective images to multivalued images by applying an enlargement method.

5. The image processing apparatus according to claim 2, further comprising a multivalue processing unit that converts a binary image to a multivalued image,
wherein the extraction unit extracts the first image and the second image similar to the first image from a multivalued image converted by the multivalue processing unit, in the first resolution.

6. The image processing apparatus according to claim 1, further comprising an enlarging unit that enlarges the respective images extracted by the extraction unit to images in the second resolution higher than the first resolution,
wherein the generation unit generates the image in the second resolution based on the respective images extracted by the extraction unit and enlarged by the enlarging unit and the phases of the respective images calculated with precision higher than one pixel in the first resolution.

7. The image processing apparatus according to claim 1, further comprising a character group image storage unit that holds a character group image including a plurality of character images,
wherein, the extraction unit extracts a first character image and a second character image similar to the first character image, in the first resolution,
when a number of the second character images extracted by the extraction unit is equal to or greater than a predetermined number, the generation unit generates a character image in the second resolution based on the respective character images extracted by the extraction unit and the phases of the respective character images calculated with precision higher than one pixel in the first resolution, and
when the number of the second character images extracted by the extraction unit is less than the predetermined number, the generation unit generates the character image in the second resolution further based on a character image extracted from the character group image stored in the character group image storage unit and similar to the first character image.

8. The image processing apparatus according to claim 1, further comprising a character group image storage unit that holds a character group image including a plurality of character images,
wherein, the extraction unit extracts a first character image and a second character image similar to the first character image, in the first resolution,
when a number of the second character images extracted by the extraction unit is equal to or greater than a predetermined number, the generation unit generates a character image in the second resolution based on the respective character images extracted by the extraction unit and the phases of the respective character images calculated with precision higher than one pixel in the first resolution, and
when the number of the second character images extracted by the extraction unit is less than the predetermined number, the generation unit replaces the first character image with a character image extracted from the character group image stored in the character group image storage unit and similar to the first character image.

9. The image processing apparatus according to claim 1, further comprising a character group image acquisition unit that acquires a character group image including a plurality of character images based on the size of the first character image extracted by the extraction unit,
  wherein, the extraction unit extracts a first character image and a second character image similar to the first character image, in the first resolution,
  when a number of the second character images extracted by the extraction unit is equal to or greater than a predetermined number, the generation unit generates a character image in the second resolution based on the respective character images extracted by the extraction unit and the phases of the respective character images calculated with precision higher than one pixel in the first resolution, and
  when the number of the second character images extracted by the extraction unit is less than the predetermined number, the generation unit generates the character image in the second resolution further based on a character image extracted from the character group image acquired by the character group image acquisition unit and similar to the first character image.

10. The image processing apparatus according to claim 9, wherein the character group image acquisition unit acquires a plurality of character group images in different phases.

11. The image processing apparatus according to claim 1, further comprising a corresponding character image generation unit that generates a character image corresponding to the size of the first character image extracted by the extraction unit,
  wherein, the extraction unit extracts a first character image and a second character image similar to the first character image, in the first resolution,
  when a number of the second character images extracted by the extraction unit is equal to or greater than a predetermined number, the generation unit generates a character image in the second resolution based on the respective character images extracted by the extraction unit and the phases of the respective character images calculated with precision higher than one pixel in the first resolution, and
  when the number of the second character images extracted by the extraction unit is less than the predetermined number, the generation unit generates the character image in the second resolution further based on the character image generated by the corresponding character image generation unit.

12. An image processing apparatus comprising:
  an extraction unit that extracts a first image and a second image similar to the first image in a first resolution;
  a calculation unit that calculates a center of gravity of the respective images extracted by the extraction unit in a resolution higher than the first resolution by at least one pixel and calculates phases of images extracted by the extraction unit in the resolution higher than the first resolution by at least one pixel using the centers of gravity;
  a size adjustment unit that adjusts sizes of the respective images extracted by the extraction unit; and
  a generation unit that generates an image in a second resolution based on the respective images extracted by the extraction unit, and adjusted by the size adjustment unit using the phases of the respective images calculated with precision higher than one pixel in the first resolution by the calculation unit,
  wherein the calculation unit moves a phase of a first sampling lattice in the first resolution based on the centers of gravity and moves a phase of a second sampling lattice in the second resolution based on the centers of gravity.

13. An image processing apparatus comprising:
  an extraction unit that extracts a first character image and a second character image similar to the first character image, in a first resolution;
  a calculation unit that calculates a center of gravity of the respective images extracted by the extraction unit in a resolution higher than the first resolution by at least one pixel and calculates phases of images extracted by the extraction unit in the resolution higher than the first resolution by at least one pixel using the centers of gravity; and
  a generation unit that generates a character image in a second resolution higher than the first resolution based on the respective character images extracted by the extraction unit using the phases of the respective character images calculated with precision higher than one pixel in the first resolution by the calculation unit,
  wherein the calculation unit moves a phase of a first sampling lattice in the first resolution based on the centers of gravity and moves a phase of a second sampling lattice in the second resolution based on the centers of gravity.

14. The image processing apparatus according to claim 13, wherein the generation unit interpolates a pixel value of the character image in the second resolution from pixel values of the respective character images based on the phases of the respective character images in the first resolution.

15. An image processing apparatus comprising:
  an extraction unit that extracts a first character image and a second character image similar to the first character image in a first resolution;
  a calculation unit that calculates a center of gravity of the respective images extracted by the extraction unit in a resolution higher than the first resolution by at least one pixel and calculates phases of images extracted by the extraction unit in the resolution higher than the first resolution by at least one pixel using the centers of gravity;
  an elimination unit that eliminates noise of a character image based on the respective character images extracted by the extraction unit and phases of the respective character images calculated with precision higher than one pixel in the first resolution; and
  a generation unit that generates a character image in a second resolution higher than the first resolution based on the respective character images extracted by the extraction unit and that have had the noise-eliminated by the elimination unit using the phases of the respective character images calculated by the calculation unit,
  wherein the calculation unit moves a phase of a first sampling lattice in the first resolution based on the centers of gravity and moves a phase of a second sampling lattice in the second resolution based on the centers of gravity.

16. An image enlarging apparatus comprising:
  an extraction unit that extracts a first character image and a second character image similar to the first character image in a first resolution;
  a calculation unit that calculates a center of gravity of the respective images extracted by the extraction unit in a resolution higher than the first resolution by at least one pixel and calculates phases of images extracted by the extraction unit in the resolution higher than the first resolution by at least one pixel using the centers of gravity;
  a generation unit that generates a character image in a second resolution higher than the first resolution based on the respective character images extracted by the extraction unit using the phases of the respective character images calculated with precision higher than one pixel in the first resolution by the calculation unit; and an arrangement unit that arranges the character image in the second resolution generated by the generation unit in a position in an image in the second resolution calculated based on the position of the character image extracted by the extraction unit, wherein the calculation unit moves a phase of a first sampling lattice in the first resolution based on the centers of gravity and moves a phase of a second sampling lattice in the second resolution based on the centers of gravity.

17. An image coding apparatus comprising:
a partial image extraction unit that extracts a first partial image and a second partial image similar to the first partial image in a first resolution;
a calculation unit that calculates a center of gravity of the respective images extracted by the partial image extraction unit in a resolution higher than the first resolution by at least one pixel and calculates phases of images extracted by the partial image extraction unit in the resolution higher than the first resolution by at least one pixel using the centers of gravity;
a representative image generation unit that generates a representative image in a second resolution based on the respective partial images extracted by the partial image extraction unit using the phases of the respective partial images calculated with precision higher than one pixel in the first resolution by the calculation unit; and
a coding unit that encodes the representative image generated by the representative image generation unit and the phases and positions of the respective partial images extracted by the partial image extraction unit,
wherein the calculation unit moves a phase of a first sampling lattice in the first resolution based on the centers of gravity and moves a phase of a second sampling lattice in the second resolution based on the centers of gravity.

18. An image decoding apparatus comprising:
a decoding unit that decodes coded data, obtained by encoding a representative image in a second resolution and a phase and a position of a partial image in a first resolution;
a partial image generation unit that generates the partial image in the first resolution based on the representative image in the second resolution and the phase of the partial image in the first resolution decoded by the decoding unit; and
a partial image arrangement unit that arranges the partial image generated by the partial image generation unit in an output image based on the position decoded by the decoding unit, wherein
the representative image is created by:
a partial image extraction unit that extracts a first partial image and a second partial image similar to the first partial image in a first resolution,
a calculation unit that calculates a center of gravity of the respective images extracted by the partial image extraction unit in a resolution higher than the first resolution by at least one pixel and calculates phases of images extracted by the partial image extraction unit in the resolution higher than the first resolution by at least one pixel using the centers of gravity, and
a representative image generation unit that generates a representative image in a second resolution based on the respective partial images extracted by the partial image extraction unit using the phases of the respective partial images calculated with precision higher than one pixel in the first resolution by the calculation unit,
wherein the calculation unit moves a phase of a first sampling lattice in the first resolution based on the centers of gravity and moves a phase of a second sampling lattice in the second resolution based on the centers of gravity.

19. The image decoding apparatus according to claim 18, further comprising a magnification and position controller that controls a magnification of the partial image generated by the partial image generation unit and a position in which the partial image is arranged by the partial image arrangement unit.

20. An image processing system comprising:
a partial image extraction unit that extracts a first partial image and a second partial image similar to the first partial image in a first resolution;
a calculation unit that calculates a center of gravity of the respective images extracted by the partial image extraction unit in a resolution higher than the first resolution by at least one pixel calculates phases of images extracted by the partial image extraction unit in the resolution higher than the first resolution by at least one pixel using the centers of gravity;
a representative image generation unit that generates a representative image in a second resolution based on the respective partial images extracted by the partial image extraction unit and phases of the respective partial images calculated with precision higher than one pixel in the first resolution;
a coding unit that encodes the representative image generated by the representative image generation unit and the phases and positions of the respective partial images extracted by the partial image extraction unit;
a decoding unit that decodes coded data encoded by the coding unit;
a partial image generation unit that generates the partial image in the first resolution based on the representative image extracted from partial image extraction unit using the phase of the partial image decoded by the decoding unit and the phase of calculated by the calculation unit; and
a partial image arrangement unit that arranges the partial image generated by the partial image generation unit in an output image based on the position decoded by the decoding unit,
wherein the calculation unit moves a phase of a first sampling lattice in the first resolution based on the centers of gravity and moves a phase of a second sampling lattice in the second resolution based on the centers of gravity.

21. A non-transitory computer readable medium storing a program causing a computer to execute a process for image processing, the process comprising:
extracting a first image and a second image similar to the first image, in a first resolution; and
calculating a center of gravity of the respective images extracted in a resolution higher than the first resolution by at least one pixel and calculating phases of images extracted in the resolution higher than the first resolution by at least one pixel using the centers of gravity; and
generating an image in a second resolution based on the respective extracted images using the phases of the respective images calculated with precision higher than one pixel in the first resolution,
wherein the calculating includes moving a phase of a first sampling lattice in the first resolution based on the centers of gravity and moving a phase of a second sampling lattice in the second resolution based on the centers of gravity.

22. A non-transitory computer readable medium storing a program causing a computer to execute a process for image processing, the process comprising:
- extracting a first image and a second image similar to the first image in a first resolution;
- calculating a center of gravity of the respective images extracted in a resolution higher than the first resolution by at least one pixel and calculating phases of images extracted in the resolution higher than the first resolution by at least one pixel using the centers of gravity;
- adjusting sizes of the respective extracted images; and
- generating an image in a second resolution based on the respective adjusted images using the phases of the respective images calculated with precision higher than one pixel in the first resolution,
- wherein the calculating includes moving a phase of a first sampling lattice in the first resolution based on the centers of gravity and moving a phase of a second sampling lattice in the second resolution based on the centers of gravity.

23. A non-transitory computer readable medium storing a program causing a computer to execute a process for image processing, the process comprising:
- extracting a first character image and a second character image similar to the first character image, in a first resolution;
- calculating a center of gravity of the respective images extracted in a resolution higher than the first resolution by at least one pixel and calculating phases of images extracted in the resolution higher than the first resolution by at least one pixel using the centers of gravity; and
- generating a character image in a second resolution higher than the first resolution based on the extracted respective character images using the phases of the respective character images calculated with precision higher than one pixel in the first resolution,
- wherein the calculating includes moving a phase of a first sampling lattice in the first resolution based on the centers of gravity and moving a phase of a second sampling lattice in the second resolution based on the centers of gravity.

24. A non-transitory computer readable medium storing a program causing a computer to execute a process for image processing, the process comprising:
- extracting a first character image and a second character image similar to the first character image, in a first resolution;
- calculating a center of gravity of the respective images extracted in a resolution higher than the first resolution by at least one pixel and calculating phases of images extracted in the resolution higher than the first resolution by at least one pixel using the centers of gravity;
- eliminating noise of a character image based on the extracted respective character images and phases of the respective character images calculated with precision higher than one pixel in the first resolution; and
- generating a character image in a second resolution higher than the first resolution based on the respective extracted character images that have had the noise eliminated using the phases of the respective character images,
- wherein the calculating includes moving a phase of a first sampling lattice in the first resolution based on the centers of gravity and moving a phase of a second sampling lattice in the second resolution based on the centers of gravity.

25. A non-transitory computer readable medium storing a program causing a computer to execute a process for image enlarging, the process comprising:
- extracting a first character image and a second character image similar to the first character image in a first resolution;
- calculating a center of gravity of the respective images extracted in a resolution higher than the first resolution by at least one pixel and calculating phases of images extracted in the resolution higher than the first resolution by at least one pixel using the centers of gravity;
- generating a character image in a second resolution higher than the first resolution based on the extracted respective character images using the phases of the respective character images calculated with precision higher than one pixel in the first resolution; and
- arranging the generated character image in the second resolution in a position in an image in the second resolution calculated based on the position of the extracted character image,
- wherein the calculating includes moving a phase of a first sampling lattice in the first resolution based on the centers of gravity and moving a phase of a second sampling lattice in the second resolution based on the centers of gravity.

26. A non-transitory computer readable medium storing a program causing a computer in an image coding apparatus to execute a process for image coding, the process comprising:
- extracting a first partial image and a second partial image similar to the first partial image in a first resolution;
- calculating a center of gravity of the respective partial images extracted in a resolution higher than the first resolution by at least one pixel and calculating phases of images extracted in the resolution higher than the first resolution by at least one pixel using the centers of gravity;
- generating a representative image in a second resolution based on the extracted respective partial images using the phases of the respective partial images calculated with precision higher than one pixel in the first resolution; and
- encoding the generated representative image and the extracted phases and positions of the respective partial images,
- wherein the calculating includes moving a phase of a first sampling lattice in the first resolution based on the centers of gravity and moving a phase of a second sampling lattice in the second resolution based on the centers of gravity.

27. A non-transitory computer readable medium storing a program causing a computer in an image decoding apparatus to execute a process for image decoding, the process comprising:
- decoding coded data, obtained by encoding a representative image in a second resolution and a phase and a position of a partial image in a first resolution;
- generating the partial image in the first resolution based on the decoded representative image in the second resolution and the phase of the partial image in the first resolution; and
- arranging the generated partial image in an output image based on the decoded position, wherein
- the representative image is created by:
- extracting a first partial image and a second partial image similar to the first partial image in a first resolution,
- calculating a center of gravity of the respective partial images extracted in a resolution higher than the first resolution by at least one pixel and calculating phases of images extracted in the resolution higher than the first resolution by at least one pixel using the centers of gravity, and generating a representative image in a second resolution based on the extracted respective partial images using the phases of the respective partial images calculated with precision higher than one pixel in the first resolution, wherein the calculating includes moving a phase of a first sampling lattice in the first resolution based on the centers of gravity and moving a phase of a second sampling lattice in the second resolution based on the centers of gravity.

* * * * *